(12) United States Patent
Golden

(10) Patent No.: US 11,039,599 B2
(45) Date of Patent: Jun. 22, 2021

(54) FREEZE RESISTANT WATERING DEVICE

(71) Applicant: Jeffry Golden, Creve Coeur, MO (US)

(72) Inventor: Jeffry Golden, Creve Coeur, MO (US)

(*) Notice: Subject to any disclaimer, the term of this patent is extended or adjusted under 35 U.S.C. 154(b) by 154 days.

(21) Appl. No.: 16/511,172

(22) Filed: Jul. 15, 2019

(65) Prior Publication Data

US 2019/0335709 A1 Nov. 7, 2019

Related U.S. Application Data

(63) Continuation-in-part of application No. 15/115,599, filed as application No. PCT/US2015/015060 on Feb. 9, 2015, now Pat. No. 10,349,635.

(60) Provisional application No. 61/965,917, filed on Feb. 10, 2014.

(51) Int. Cl.
*A01K 7/02* (2006.01)
*A01K 7/06* (2006.01)
*A01K 39/02* (2006.01)

(52) U.S. Cl.
CPC ............... *A01K 7/027* (2013.01); *A01K 7/06* (2013.01); *A01K 39/0213* (2013.01)

(58) Field of Classification Search
CPC ...... A01K 7/027; A01K 7/06; A01K 39/0213; A01K 39/02; F16K 21/04; F16K 49/005; E03B 7/12
See application file for complete search history.

(56) References Cited

U.S. PATENT DOCUMENTS

| | | | | |
|---|---|---|---|---|
| 3,008,451 A | * | 11/1961 | Curry | A01K 39/0213 119/72.5 |
| 3,691,997 A | * | 9/1972 | Hatch | A01K 7/02 119/71 |
| 4,091,261 A | * | 5/1978 | Noland | A01K 7/027 392/468 |
| 4,185,589 A | * | 1/1980 | Peterson | A01K 7/027 119/73 |
| 4,338,884 A | * | 7/1982 | Atchley | A01K 7/06 119/72.5 |
| 4,397,266 A | * | 8/1983 | Noland | A01K 7/06 119/73 |
| 4,416,221 A | * | 11/1983 | Novey | A01K 7/06 119/72.5 |
| 4,465,020 A | * | 8/1984 | Schafer | A01K 7/027 119/73 |
| 4,524,724 A | * | 6/1985 | Steadier, Jr. | A01K 39/0213 119/72.5 |

(Continued)

*Primary Examiner* — Trinh T Nguyen
(74) *Attorney, Agent, or Firm* — Charles McCloskey

(57) ABSTRACT

A freeze-resistant watering device has a nipple or ball valve, a heat pipe, a sleeve in tight thermal contact with the nipple, a water-tight connection to a liquid containing container or supply pipe, and an outer shield enclosing an insulating space or insulation material. This device thermally couples a watering nipple or ball valve to a container or supply pipe via a thermal conduction path including bends so that the nipple or ball valve maintains at a temperature that is near the temperature of the liquid in the container or supply pipe. Further, the use of one or more freeze-resistant watering devices with a thermally insulated container in a watering unit with an insulated container or supply pipe provides drinking water to animals, and in particular, birds in sub-freezing and in hot weather.

10 Claims, 18 Drawing Sheets

(56) References Cited

U.S. PATENT DOCUMENTS

| | | | | |
|---|---|---|---|---|
| 4,819,585 A * | 4/1989 | Dolan | ............... | A01K 7/06 |
| | | | | 119/72.5 |
| 4,890,578 A * | 1/1990 | Rader | ............... | A01K 39/0213 |
| | | | | 119/72.5 |
| 5,074,250 A * | 12/1991 | Clark, IV | ............... | A01K 39/0213 |
| | | | | 119/72.5 |
| 5,289,797 A * | 3/1994 | Steadier, Jr. | ............... | A01K 39/0213 |
| | | | | 119/72 |
| 6,058,881 A * | 5/2000 | Thompson | ............... | A01K 39/0213 |
| | | | | 119/72.5 |
| 2008/0190374 A1* | 8/2008 | Farris | ............... | A01K 7/027 |
| | | | | 119/74 |
| 2008/0196670 A1* | 8/2008 | Clark | ............... | A01K 7/06 |
| | | | | 119/73 |
| 2014/0158059 A1* | 6/2014 | Hasbrouck | ............... | A01K 39/0213 |
| | | | | 119/73 |

\* cited by examiner

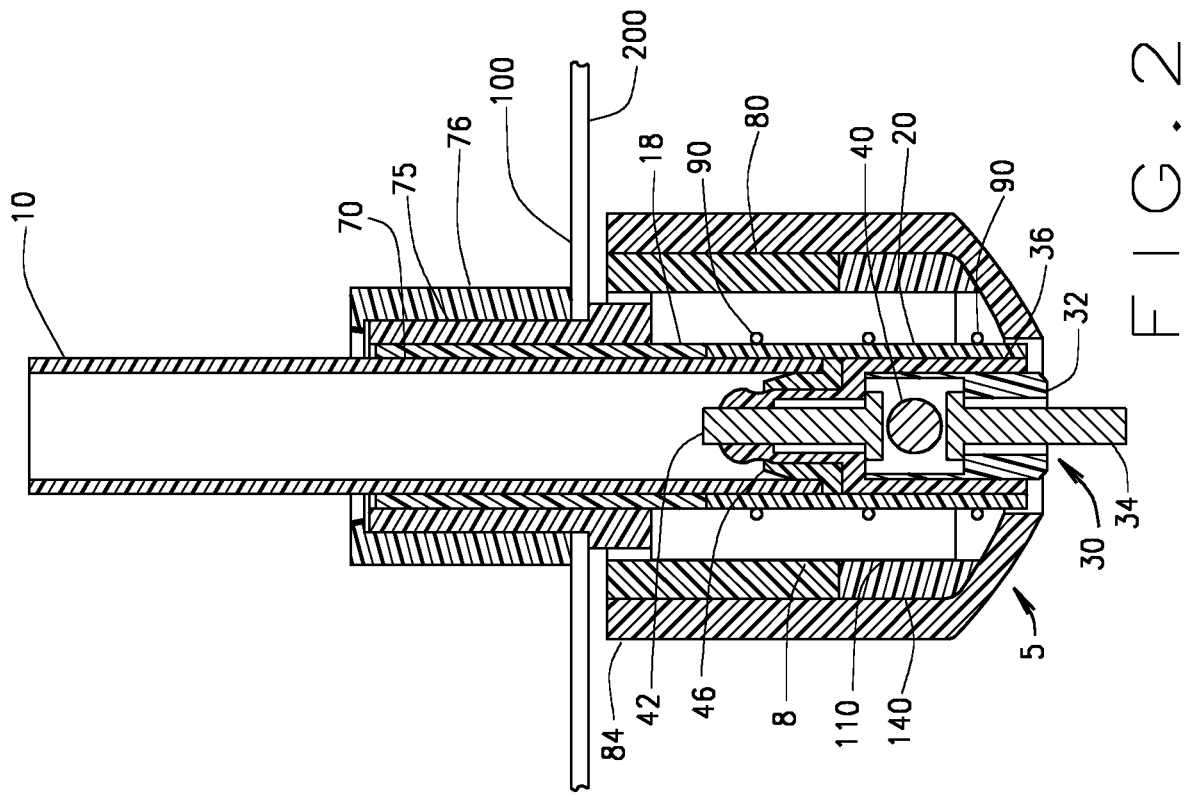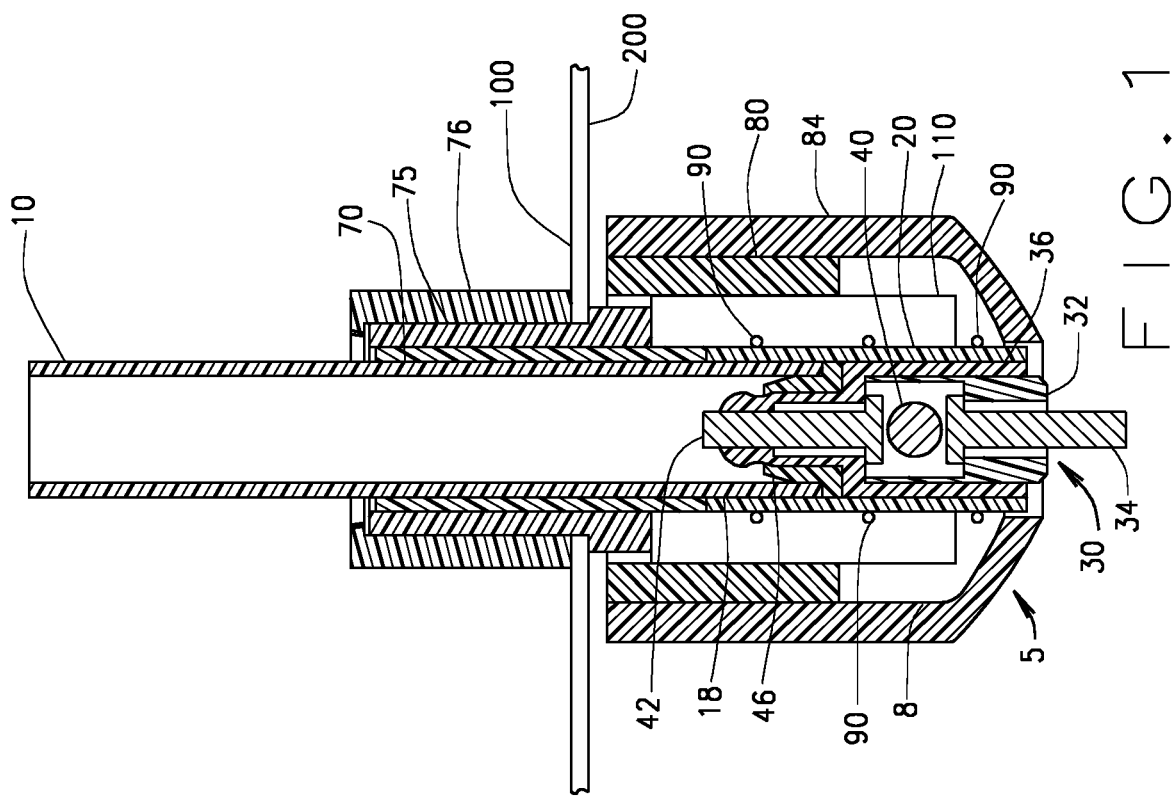

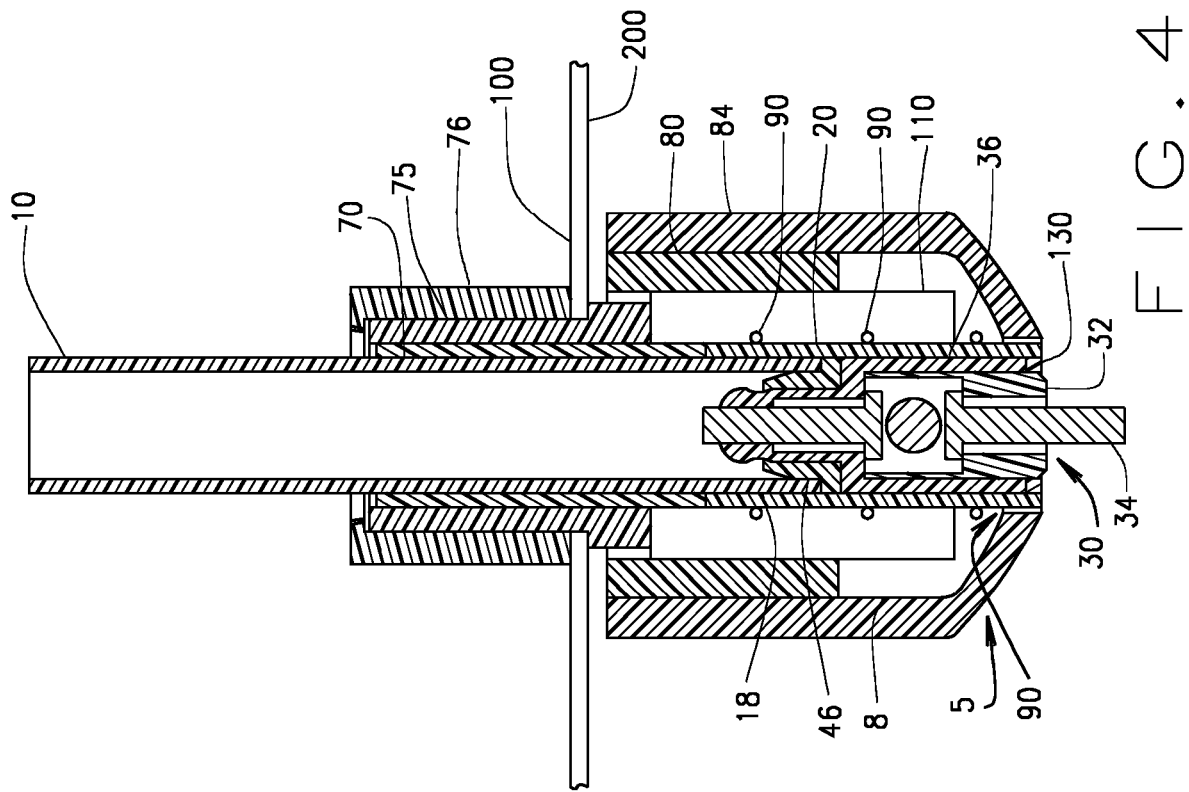
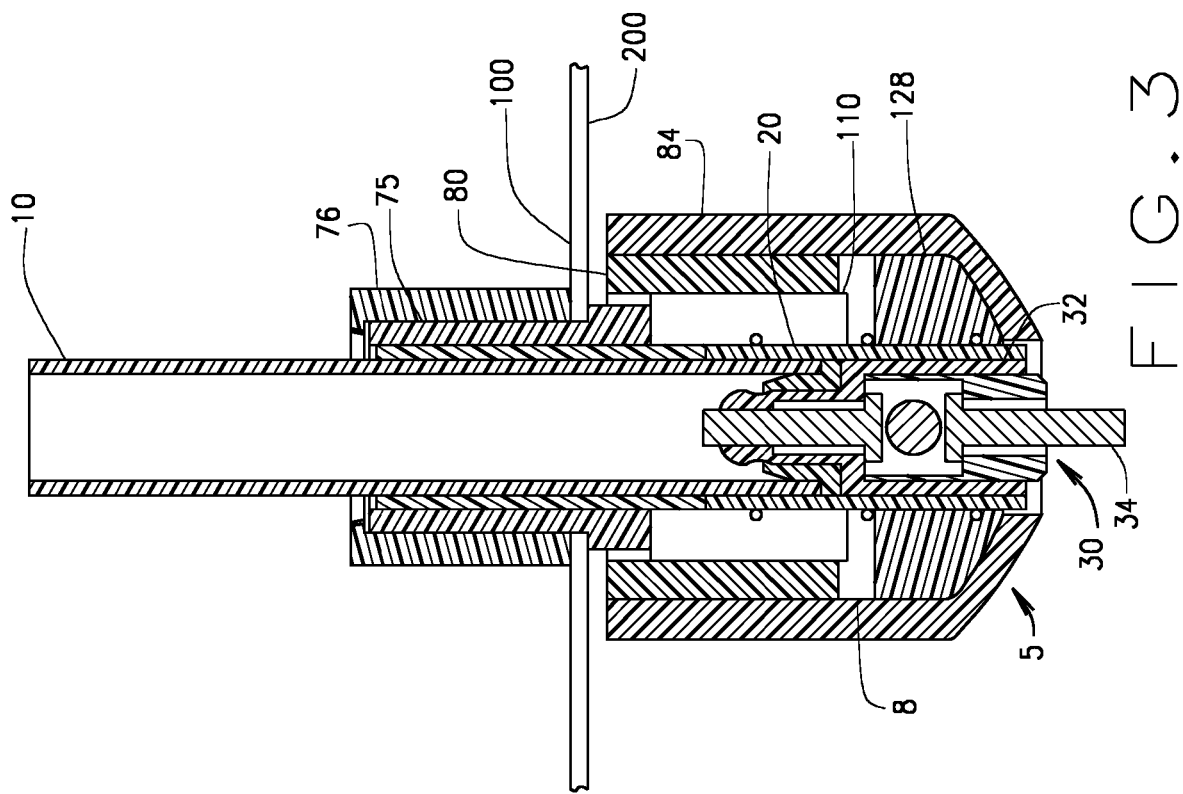

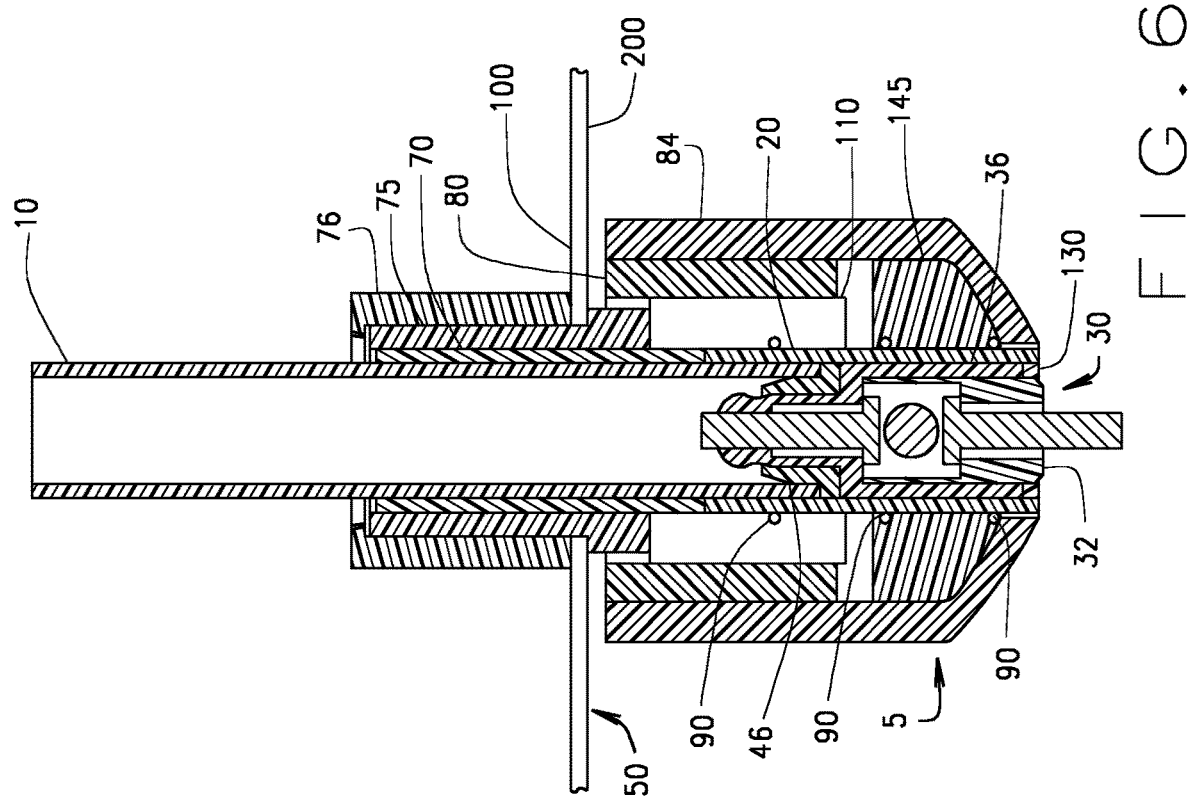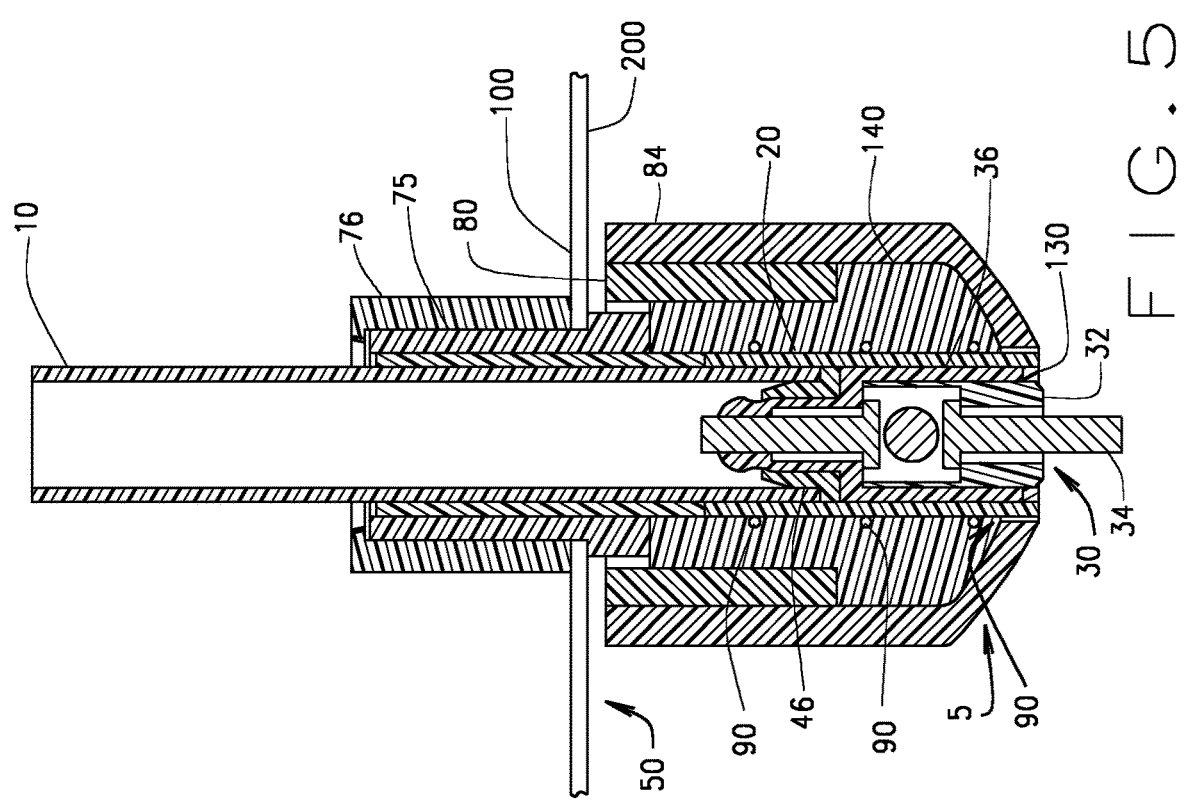

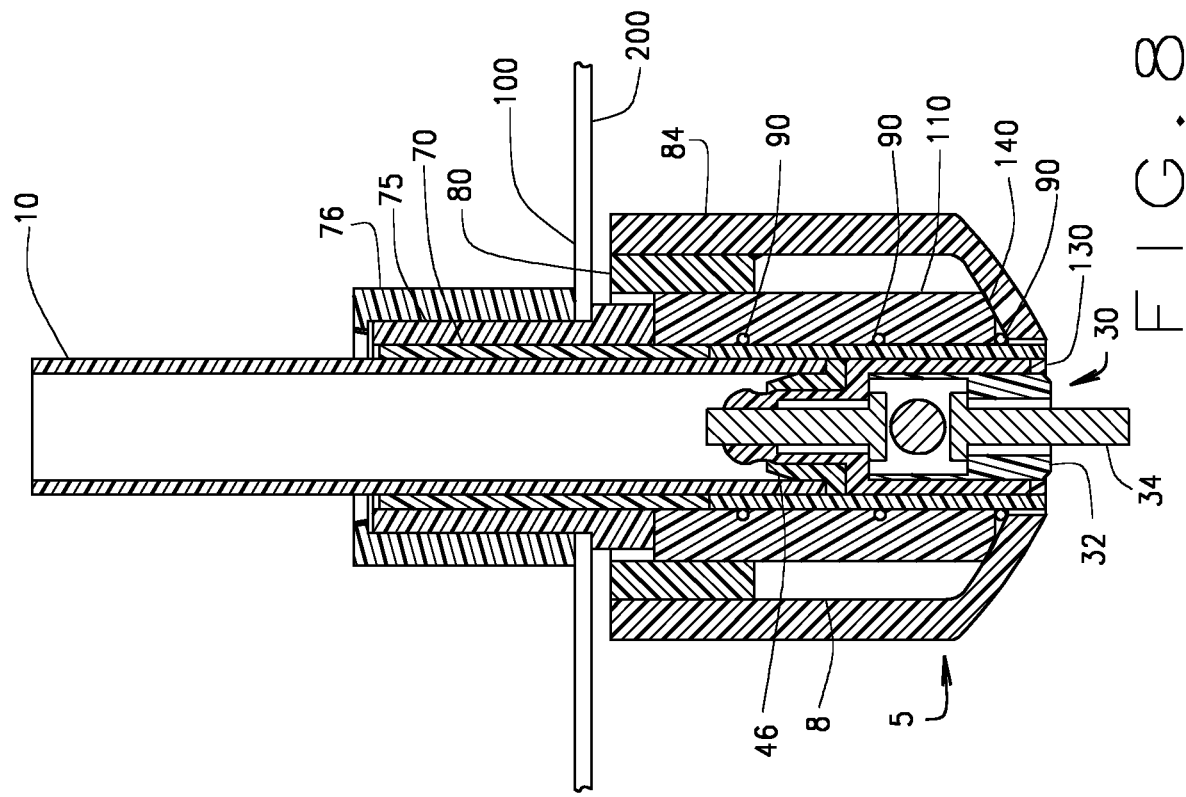
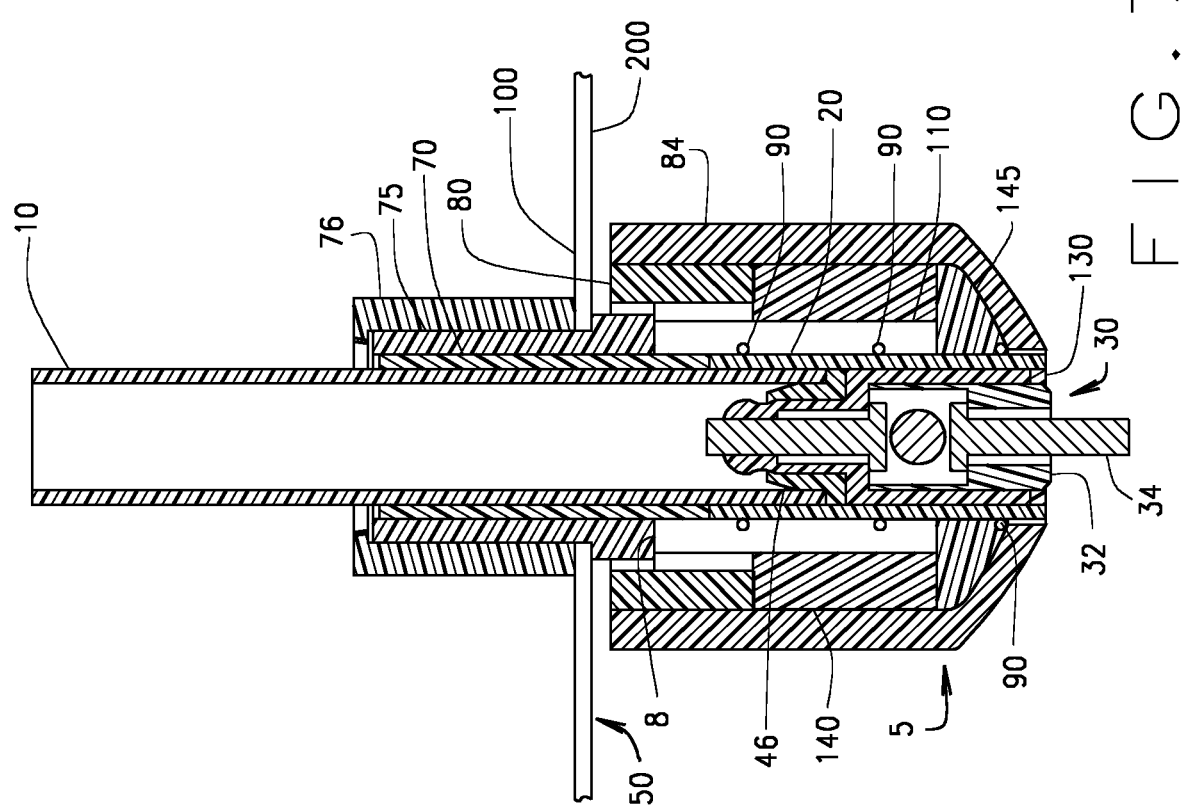

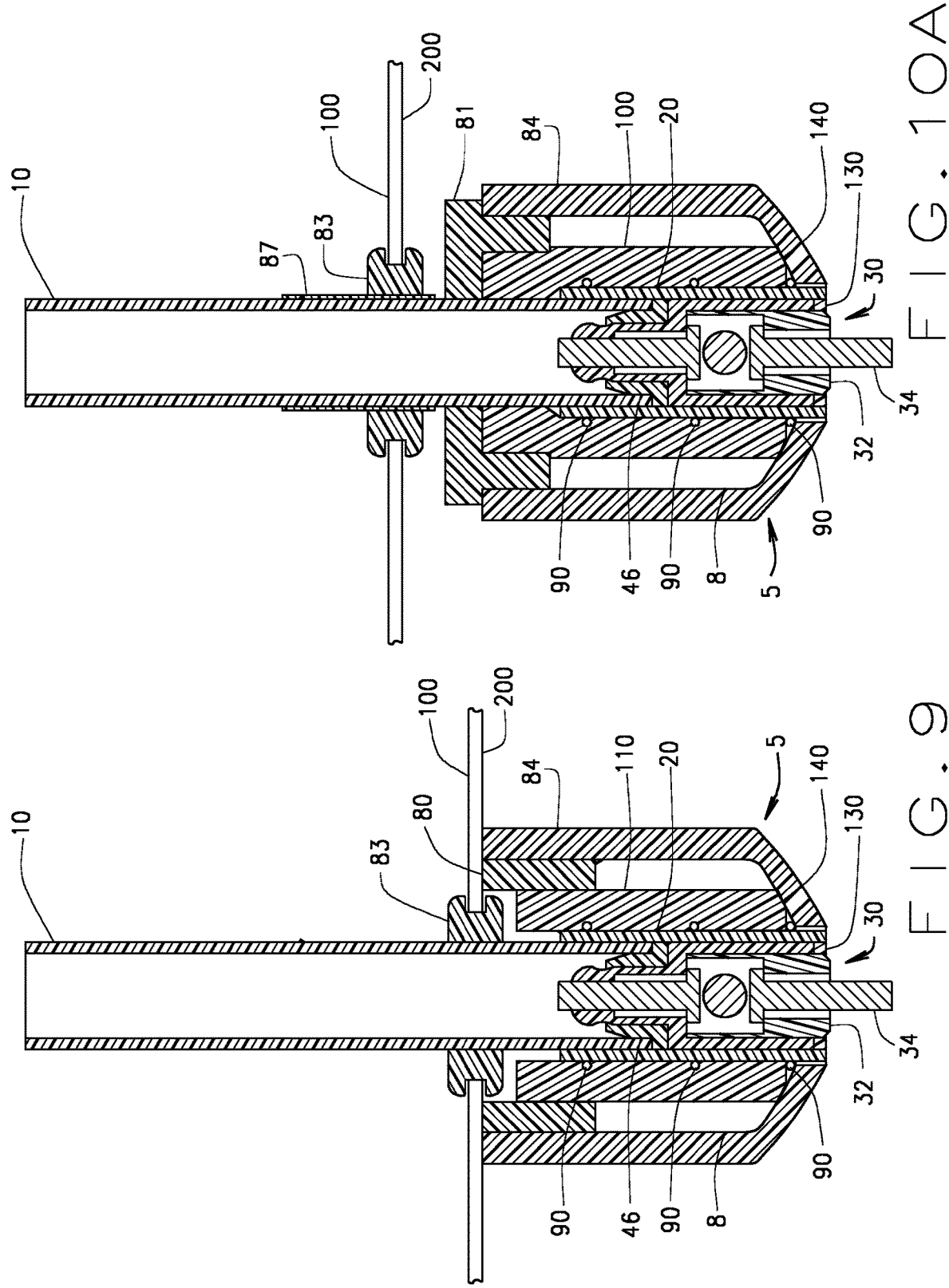

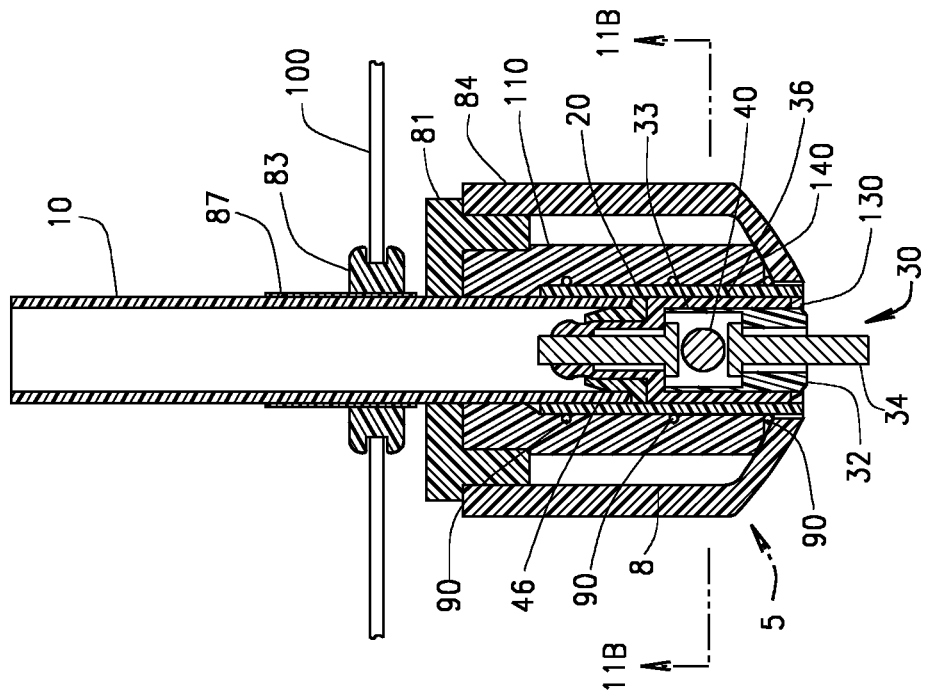
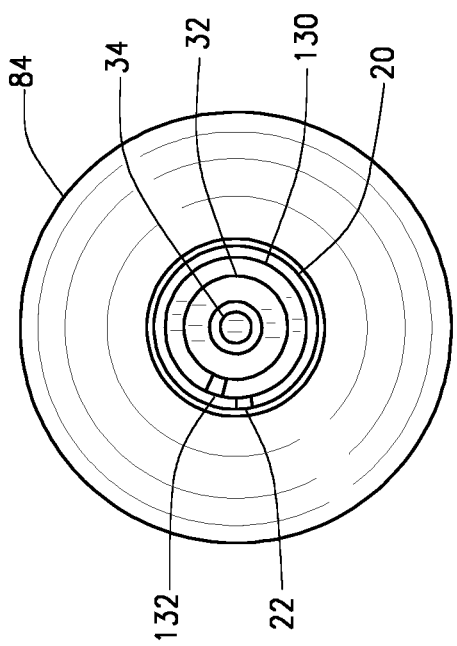
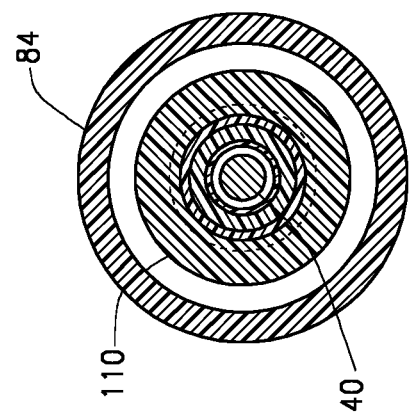

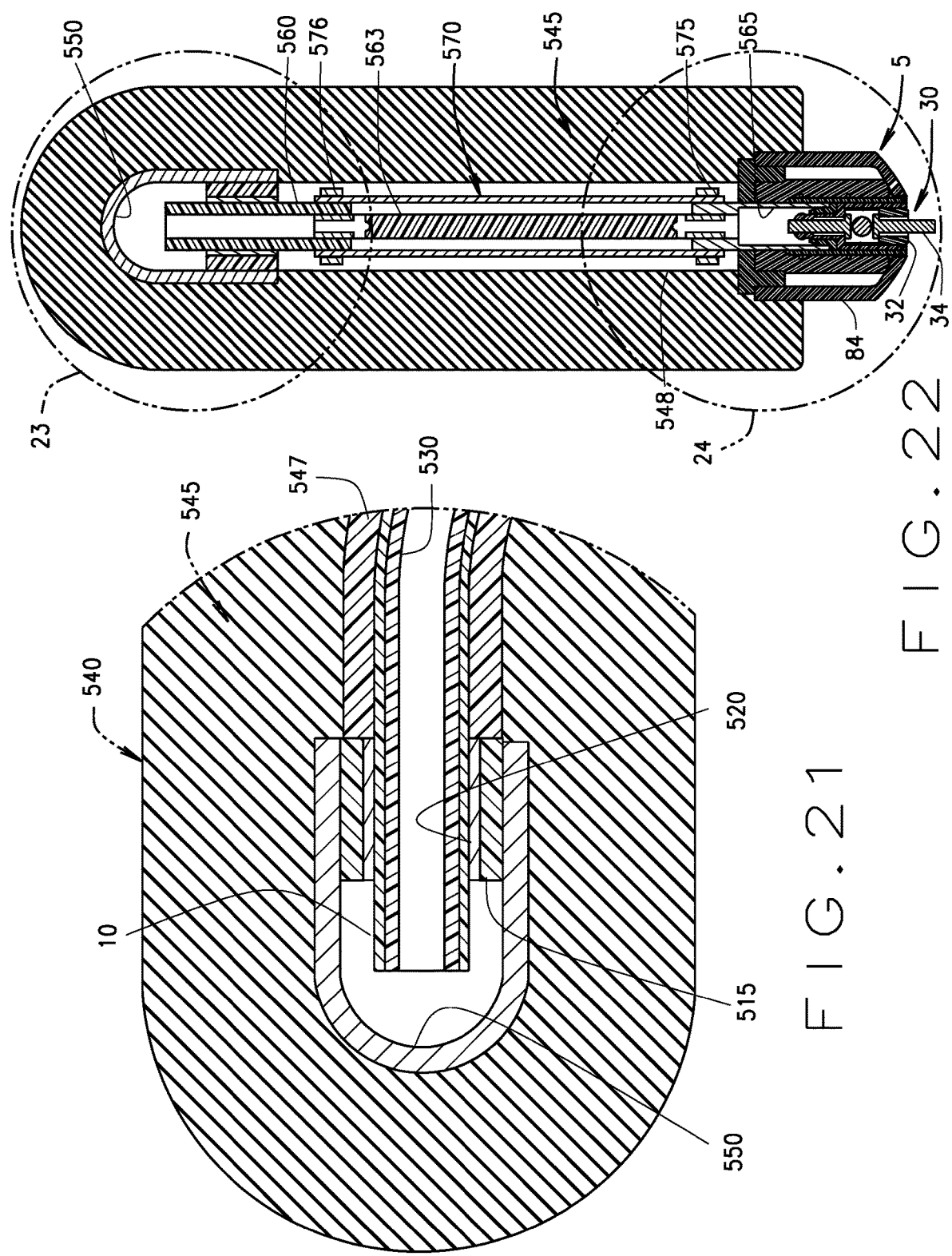

FREEZE RESISTANT WATERING DEVICE

CROSS-REFERENCE TO RELATED APPLICATIONS

This continuation in part application claims priority to the pending non-provisional application Ser. No. 15/115,599 filed on Jul. 29, 2016 which claims priority to the expired Patent Cooperation Treaty (PCT) application PCT/US2015/015060 filed on Feb. 9, 2015 which claims priority to the expired provisional application 61/965,917 filed on Feb. 10, 2014 and all of which have a common inventor.

TECHNICAL FIELD

The freeze-resistant watering nipple device generally relates to waterers for providing liquids and especially drinking water to animals, and especially birds including poultry, and more specifically to a waterer providing liquid water when the ambient temperature of the environment is below freezing, and water that is cooler than the environment during warmer weather.

BACKGROUND OF THE INVENTION

Poultry and other animal waterers are used in ambient outdoor temperatures or in coops, sheds, shelters, or barns in which the ambient temperature may be near or below the freezing point of water (i.e., in sub-freezing conditions) or be above a desirable temperature in hot conditions. In cold weather, some watering dishes or troughs are provided with external heaters (e.g., an electrical resistance heater) or immersion heaters. Such waterers are susceptible to fouling by animal wastes, and in sub-freezing temperatures, may consume substantial and costly power to prevent the water from freezing.

DESCRIPTION OF THE PRIOR ART

There are other watering and liquid dispensing devices that address the need to provide liquid water or liquid nourishment to animals. Hereinafter, such devices are referred to as "watering devices", and the dispensed liquid is referred to as "water", although it is to be understood that they may dispense liquids other than water or water-based solutions. Watering devices include pans, troughs, dishes, and cups. A freeze resistant bird watering device is described by Hollyday's U.S. Pat. No. 5,002,017 that comprises a covered shallow tray which fits within an enclosing dish with a closed air space between the tray and the dish to provide an insulating effect. The cover has an aperture to permit birds to access the water.

Watering and liquid dispensing devices also include nozzles, and so-called nipple valves. Many of these devices are animal activated. Some nipple valves comprise a hollow cylindrical body that contains an actuating pin, a valve seat, a first weight, which in some embodiments is a spherical ball, and one or more weights or cylindrical pins above the first weight. Examples are Steudler, Jr.'s U.S. Pat. No. 4,524,724, Rader's U.S. Pat. No. 4,890,578, Clark's U.S. Pat. No. 5,074,250, and Schumacher's U.S. Pat. No. 6,073,584. Some of these devices are intended to provide a predetermined flow rate of liquid when actuated, i.e., when the valve is "open" to allow flow, and they are described to exhibit little or no leakage and dripping when not actuated and are "closed" to flow. Such devices can be mounted on a pipe, a bucket, or other container that supplies the water or liquid. In one arrangement, the nipple valve is oriented so that the actuating pin is approximately downward pointing so that poultry, game birds, small animals, farm animals, and the like (hereinafter referred to as "animals") may actuate the valve and obtain water and thereby drink the water.

When animals are kept in temperate and cold climates, cold weather may comprise freezing temperatures or near-freezing temperatures with wind, whereby the water in a waterer exposed to such cold temperatures may freeze. (Such cold conditions are referred to herein as "freezing conditions" even though the ambient temperature may be above the freezing point of water, nominally 0° C., i.e., approximately 32.0° F. at normal pressure.) When freezing occurs, not only are the animals deprived of drinking water, but the animal keeper or farmer may be inconvenienced by the need to thaw the waterer. Consequently, there are some watering devices that provide heat to the waterer as means to avoid or resist freezing of the water or to make easy the thawing of a frozen waterer.

Hatch's U.S. Pat. No. 3,691,997 describes a temperature controlled water dispensing device for animals in which warm water is circulated directly into and out of the nipples.

Another heating means is an electrical resistance heater that is in close proximity to the water. An example is Noland's U.S. Pat. No. 4,091,261. Another example is a "hotplate" on which is placed a pan or trough containing the water. Another example is a watering cup with an integral electrical resistance heater with electrical insulation. Another example is a bucket around which an electrical heating "tape" is wrapped. An example is Noland's U.S. Pat. No. 4,397,266. Such a bucket may also be wrapped in thermal insulation and/or placed in another bucket. Yet another example is a water container in which a submersible heater is immersed.

Such a heated container may supply heated water via a conduit or pipe to a nipple valve or other dispenser means. Gravity feed or a pump providing circulation may be used to bring the heated water to the dispenser. Steudler Jr.'s U.S. Pat. No. 5,289,797 describes such a pumped system in which the conduit is thermally insulated so that the water temperature is in a range that is not too hot or too cold.

Peterson's U.S. Pat. No. 4,185,589 describes an apparatus for heating a nipple valve livestock waterer that has a heat sink coupling, preferably of brass, that is disposed interiorly of the waterer housing and is connected to a water supply line at one end and a nipple valve at the opposite end. An electrical heater contacts the coupling that brings the heat to the valve. The nipple valve has a stainless steel metal body and is mounted on the housing of the waterer. Peterson teaches that the valve seat must be in close proximity to the housing and the valve is connected to the brass coupling so that the valve seat is in close proximity to the brass coupling that connects to a galvanized steel water supply line.

Peterson's U.S. Pat. No. 4,248,177 describes an animal waterer with a re-circulating water system that circulates warm water to a plurality of nipples.

Dolan's U.S. Pat. No. 4,819,585 describes a freeze resistant adjustable flow rate animal nipple waterer in which thermally conductive materials are selected for the nipple construction so that heat from a relatively warm water source is conducted to the valve seat of the nipple valve in the case where the nipple comprises a metal body and is mounted so that the valve seat is in close proximity to the water container. Such watering systems may serve a few animals, e.g., a handful of birds, or may be scaled to serve large industrial farm operations.

Other animal waterers appear in the prior art without, an actuator such as a pin or lever, shown in Atchely and Hui. Atchley shows an Avian Water Bottle Assembly in his U.S. Pat. No. 4,821,678 that has a bracket suitable for mounting upon a cage that receives an inverted bottle. The inverted bottle includes a dispensing spout closed by a red ball.

Then Hui has a Water Drinking Device for Pets in his U.S. Pat. No. 5,549,074 that describes a vessel with a slanted bottom. The slanted bottom locates an outlet above the bottom end of the vessel where impurities settle.

Another approach to avoid or resist freezing of the water is to supply the water via a pipe or conduit that is located underground and below the frost line, so the water is warmer than the freezing point when it is supplied to the waterer, Ahrens' U.S. Pat. No. 4,922,858. Such an approach may be useful to a medium or large scale farm or poultry operation, but it is generally not practical for the small operation or "backyard" farmer. In Ahrens' U.S. Pat. No. 4,559,905, a livestock watering tank is described that comprises an insulated tank with a water access opening at the top in which is situated an insulating buoyant spherical float that closes the opening except when depressed by a drinking animal. By closing the tank opening, the float reduces heat loss by evaporative cooling and by conduction and convection.

Bird and animal watering nipple valves are commercially available. These nipple valves are generally of stainless steel or stainless steel and plastic construction. Some have brass and/or elastomeric parts as well. Such nipple valves are used in commercial scale poultry operations where the valves are not subject to freezing temperatures because of the heat generated by a large number of birds and/or industrial scale building heating, ventilation and air conditioning (HVAC) equipment. Such nipple valves are also used by small scale operations and in the backyard chicken coop as such nipple valves are highly evolved and engineered to provide a desired water flow rate when actuated by a bird, are resistant to leaking, are easy to install, and are durable.

For many poultry operations, which include the small farm and the hobbyist or "backyard" poultry coop, the waterer may be exposed to the ambient outdoor temperature, and an elaborate heated watering system may be impractical or too expensive. Moreover, the availability of electricity may be limited or none, and the cost of electrically heating the waterer may be high in regions that have prolonged and frequent freezing conditions. For example, in much of the northern half of the United States, winter temperatures are frequently colder than freezing. The cost of energy to heat the water may be a significant part of the budget of a small poultry operation.

An approach that can be practical to the small farm and "backyard" farmer is to use a sufficiently large supply volume of warm water in a container as a heat reservoir so that the heat content of such a volume is sufficiently large that the time for the volume of water to cool and freeze is long compared with the duration of the cycle for replenishing or replacing the water as desired by the farmer. For example, with a sufficient water volume, the farmer can fill the container with warm water in the morning, and the water heat content is sufficient so that at nightfall, or even after one day, the temperature of the water in the container is above freezing, or at least the majority of the water in the container has not frozen.

However, even in the case in which the water in the container, or a supply line (or supply pipe) is heated or has sufficient heat content so that the water temperature is above freezing, a conventional bird watering nipple valve that is attached to the container or supply pipe but exposed to sub-freezing ambient temperature is susceptible to freezing. This is because many such bird watering nipple valves are constructed mainly of stainless steel or stainless steel and plastic, which have relatively low thermal conductivity. Many bird watering nipple valves are mounted so that the actuating pin of the valve points downward and the valve seat is at the end of the nipple away from the attachment to the container or supply line, which attachment is made at the top end of the nipple valve. Such valves have relatively low thermal conductance that is insufficient to convey sufficient heat from the heat reservoir, i.e., from the container or supply line, to the valve seat to prevent or significantly resist freezing of the water in the valve. Use of a heat pipe, i.e., a heat sink coupling, (e.g., as taught by Peterson's U.S. Pat. No. 4,185,589 or Dolan's U.S. Pat. No. 4,819,585) and atta37ched to the top end of the valve is ineffectual to provide heat to the vicinity of the valve seat of the nipple valve when the valve seat is not proximate to where the coupling and valve are attached because of the insufficient thermal conductance of the water-filled nipple valve.

The present invention overcomes the difficulties of the prior art. The present invention includes an effective and inexpensive means for providing a high thermal conductance connection between a reservoir container or supply pipe and the vicinity of the valve seat of a commercially available nipple valve wherein the valve seat is not proximate with the wall of the reservoir container or wall of the supply pipe is not described in the prior art.

SUMMARY OF INVENTION

The present invention provides a freeze-resistant watering device comprising an outer shield, a heat pipe, a sleeve in tight thermal contact with a nipple valve, for example, a commercially available nipple valve, and a feed-through connection for attachment to a heat reservoir in a thermally insulated container or a supply pipe so that the temperature gradients and the free and forced convective flow geometries provide an acceptably small heat loss so that the nipple valve is adequately warmed by conduction from the heat reservoir to resist the freezing of the water in the nipple valve. Low cost of the freeze-resistant nipple valve device is preferred for its economical use in "backyard" and small-scale chicken farms. The present invention allows the use of inexpensive nipple valves.

A freeze-resistant watering nipple device comprises a watering nipple valve, a heat pipe, a sleeve in tight thermal contact with the nipple valve, a water-tight connection, i.e., a feed-through connection, to a container or supply pipe, and a low thermal loss outer shield enclosing the sleeve and most of the nipple valve. Further, the use of one or more freeze-resistant watering nipple devices with an insulated container comprises a waterer to provide drinking water or liquids to animals, and especially birds including poultry, in sub-freezing weather and in hot weather.

The heat pipe comprises a heat conducting member between the water or liquid in a reservoir container or supply pipe and the sleeve in tight thermal contact with the nipple valve that is a heat conducting member between the heat pipe and the body of the nipple valve and in particular, in the vicinity of the valve seat. The heat pipe is constructed of high heat conductivity material; examples of which are aluminum (plain, anodized, epoxy coated, or plastic coated), copper (plain or coated), silver (plain or coated), gold, or metals of the platinum group, and alloys of any of the aforementioned. The heat pipe may be attached to the top of the nipple body directly or via an intermediate bushing or gasket, and then thermally coupled via a high thermal conductivity sleeve in tight thermal contact with the nipple valve, the sleeve being held by a clamping means onto the nipple valve, or may be press-fitted onto the nipple valve, or screwed onto the nipple valve, or joined to the nipple valve by a thin layer of injected molded polymer or adhesive, or other means of joining, so that the clamping force, contact force, or adhesion force is sufficient to obtain good thermal conduction. An example, but not as a limitation, is an aluminum or copper clamped sleeve that is in thermal contact with the plastic covered nipple body or stainless steel nipple body. Optionally, a heat conducting ring may be situated around at least a portion of the nipple valve part comprising a metal annulus with exposed lower surface and within the sleeve to transmit heat to the nipple valve seat. In another embodiment, the sleeve may be an integral part of the heat pipe. In yet another embodiment, the nipple valve is attached to the sleeve in a water-tight fashion by any of the several sealing means known in the art.

The heat pipe is held in a feed-through connection that comprises a watertight seal between the heat pipe and the reservoir container or supply pipe. Examples of the feed-through connection, but not as limitation, are an elastomer compression seal (such as a plastic bushing, sleeve, O-ring, or grommet), a glued joint, a screw-threaded joint, or a metal compression seal. The feed-through connection may also include low thermal conductivity parts. It may also comprise mating parts, such as a male part and a female part so that the wall of the reservoir container or supply pipe is held between the male and female parts.

Surrounding at least a portion of the heat pipe and the sleeve surrounded nipple valve is an outer shield that encloses an insulating volume comprising low thermal conductivity insulating material and/or an air gap space that has a reflective heat shield on at least one of its defining surfaces so that the surrounding enclosure insulates the enclosed portion of the heat pipe and the sleeve surrounded nipple valve from the ambient exterior air. The enclosed portion of the heat pipe, the sleeve surrounded nipple valve, the air space and reflective heat shield, and/or the thermally insulating material between the sleeve surrounded nipple valve and the surrounding enclosure have sufficiently low heat loss, and the heat pipe, sleeve, contact interfaces, and path through the body of the nipple valve have sufficiently high thermal conductance, so that the nipple valve seat and animal-actuated end of the nipple housing or actuator pin, lever, or ball at the valve seat are maintained within a few degrees C. of the temperature of the water or liquid in the reservoir container or supply pipe.

One or more freeze-resistant watering nipple devices attached to a reservoir container that is sufficiently insulated from ambient temperature by enclosure within a plastic outer container separated from the reservoir container by an air gap and a reflective heat shield, and/or insulating material comprises a waterer that provides drinking water or liquid to animals, especially birds including poultry, in sub-freezing ambient temperature, so long as the temperature in the reservoir is sufficiently above the freezing temperature, i.e., the reservoir temperature is greater than or equal to a critical reservoir temperature $T_{crit}$, and the temperature differential between the reservoir and the nipple valve seat is sufficiently small so that the water in the vicinity of the nipple valve seat does not freeze.

For a waterer of the present invention without supplemental heating, so long as the time-integrated heat energy lost from the reservoir, which amounts to the sum of the heat lost through the surface of the reservoir container enclosed by the outer container, the heat lost by water that leaves the reservoir container, and the heat lost via the freeze-resistant watering nipple device is less than the initial thermal energy content of the reservoir corresponding to the temperature difference between the initial reservoir temperature $T_{init}$ and $T_{crit}$, then liquid or drinking water is supplied. The time interval for an initial fill of warm water to cool to $T_{crit}$ is the freezing time $t_f$. It is desirable that $t_f$ be sufficiently long so that a single load of warm reservoir water or liquid will provide drinking water to the animals, especially birds including poultry, for the majority or all of the daylight hours of a day during cold weather months. It is also desirable that the same waterer, when initially loaded with ice and water, provides cool water to animals or poultry for the majority or all of the daylight hours of a day during hot weather.

It is an object of the present invention to provide an inexpensive, low-heat-loss means for conducting the heat from a thermal reservoir or supply pipe to the valve seat of a commercially available plastic covered stainless steel or stainless steel bodied nipple valve so that sufficient heat is conveyed to the valve seat to resist freezing in ambient temperature that is substantially below 0° C. Ambient temperature is the air temperature at the exposed drinking end of the nipple valve housing and/or actuation pin of the animal or poultry actuated nipple-valve.

A further object of the present invention is to provide a means of mounting and integrating a heat pipe warmed nipple valve compatible with common commercially available watering nipple valves with no, or modest and inexpensive, modification of the nipple valve housing.

Another object of the present invention is a freeze-resistant watering nipple device that has simple installation, low cost, construction that avoids significant corrosion or leaching of metallic ions into the water container or supply pipe and into the drinking water, that is comprised of materials that are compatible with potable water, and that resists cracking and breakage in the event of freezing of the reservoir container or supply pipe.

Another object of the present invention is a freeze-resistant watering nipple device that effectively delivers liquid water to animals, especially birds including poultry, when the ambient temperature is below −10° C., preferably, down to 0° F. (−18° C.), and more preferably, down to −10° F. (−24° C.).

Another object of the present invention to provide drinking water or liquids to animals, especially birds including poultry, by means of a low thermal loss reservoir and one or more integrated freeze-resistant watering nipple devices, which enables use of a practically-sized reservoir at an animal, bird, or poultry tolerable initial temperature to provide sufficient heat to avoid freezing for a time $t_f$, which is at least $t_f \geq 8$ hours when the ambient temperature is about 0° F. and when the wind speed may be as great as about 8 miles per hour (mph) without the use of an electrical heater, for at least $t_f \geq 24$ hours with the use of a relatively low power electrical or other heat source, and to asymptote to a relatively warm water temperature with the use of a low or medium power heat source.

Another object to provide relatively cool (i.e., substantially less than ambient outdoor temperature, for example, <90° F. when ambient outdoor temperature is up to 115° F.) drinking water or liquids to animals and poultry for at least 24 hours by means of a low thermal loss waterer that has one or more integrated freeze-resistant watering nipple devices by use of an initial fill of ice and water in a reservoir container and without additional cooling means.

Another object is to provide such a freeze-resistant watering nipple device that has a low cost of manufacturing so the purchasing public, backyard farmers, ranchers, farmers, feedlots, coop operators, landowners, and organizations can readily buy the invented freeze-resistant watering nipple device through supply sources.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings,

FIG. 1 shows a sectional view on a vertical plane of an embodiment of a freeze-resistant nipple valve device with a heat pipe, sleeve, mounting and feed-through connection to a container or supply pipe;

FIG. 2 shows a sectional view on a vertical plane of an embodiment of a freeze-resistant nipple valve device with a heat pipe, sleeve, mounting and feed-through connection to a container or supply pipe;

FIG. 3 shows a sectional view on a vertical plane of an embodiment of a freeze-resistant nipple valve device with a heat pipe, sleeve, mounting and feed-through FIG. 4 shows a sectional view on a vertical plane of an embodiment of a freeze-resistant nipple valve device with a heat pipe, sleeve, mounting and feed-through connection to a container or supply pipe;

FIG. 5 shows a sectional view on a vertical plane of an embodiment of a freeze-resistant nipple valve device with a heat pipe, sleeve, mounting and feed-through connection to a container or supply pipe;

FIG. 6 provides a sectional view on a vertical plane of an embodiment of a freeze-resistant nipple valve device with a heat pipe, sleeve, mounting and feed-through connection to a container or supply pipe;

FIG. 7 provides a sectional view on a vertical plane of an embodiment of a freeze-resistant nipple valve device with a heat pipe, sleeve, mounting and feed-through connection to a container or supply pipe;

FIG. 8 provides a sectional view on a vertical plane of an embodiment of a freeze-resistant nipple valve device with a heat pipe, sleeve, mounting and feed-through connection to a container or supply pipe;

FIG. 9 provides a sectional view on a vertical plane of an embodiment of a freeze-resistant nipple valve device with a heat pipe, sleeve, mounting and feed-through connection to a container or supply pipe wherein the feed-through connection has a rubber or elastomer grommet;

FIG. 10a provides a sectional view on a vertical plane of an embodiment of a freeze-resistant nipple valve device with a heat pipe, sleeve, mounting and feed-through connection to a container or supply pipe wherein the feed-through connection has a rubber or elastomer grommet, and FIG. 10b provides an end view of the bottom of the freeze-resistant nipple assembly 5;

FIG. 11a describes as a sectional view on a vertical plane of the embodiment shown in FIG. 10 including two detail views of a horizontal cross-section, the detail view on the lower left, FIG. 11b is shown in the same scale as the vertical plane cross-section view in the upper left, and the view to the right.

FIG. 21 shows a detail on a cut plane of bilateral symmetry of the invention of the upper portion of the embodiment shown in FIG. 20 with a compressed elastomer sleeve making a water-tight seal between the outer surface of the heat pipe and the inner surface of a tubular sleeve that is joined to the tee of the manifold supply pipe;

FIG. 22 provides a sectional view on a cut plane of bilateral symmetry of the invention of an embodiment wherein the heat pipe comprises a tube that protrudes into a manifold supply pipe tee and attaches to a rod and then attaches to a tube to which attach the heat conducting sleeve and nipple or ball valve of the invention and the rod segment of the heat pipe is situated within an elastomer tube that comprises a conduit for the water or liquid to be delivered to the nipple or ball valve;

The same reference numerals refer to the same parts throughout the various figures.

DESCRIPTION OF THE PREFERRED EMBODIMENT

Figure 11C:
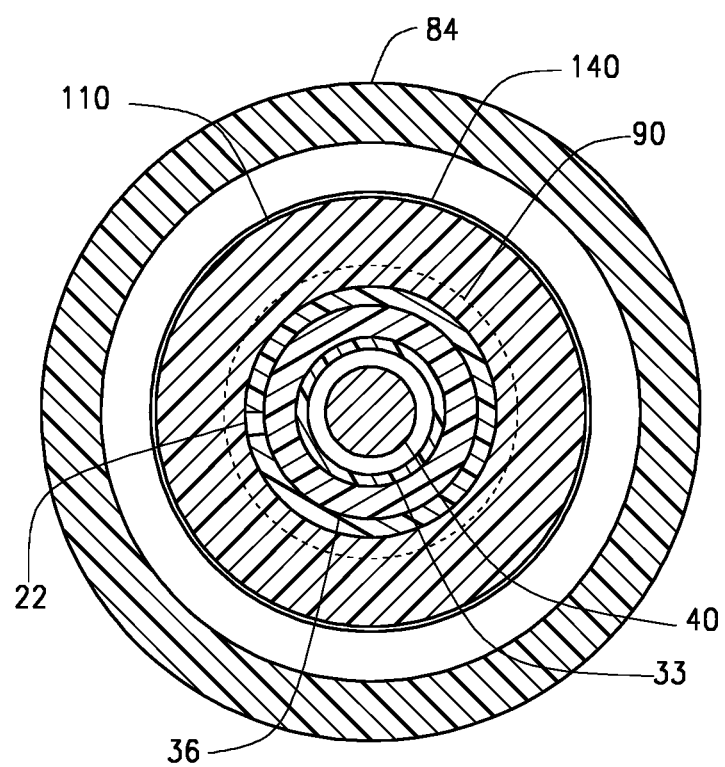
FIG. 11c is the horizontal plane cross-section view magnified two fold.

A freeze-resistant nipple valve device 5 of the present invention as shown as various embodiments in FIGS. 1-16, comprises a heat pipe 10, a sleeve 20 in tight thermal contact with a nipple valve 30, a water-tight connection to a container or supply pipe, which may comprise a feed-through of two joined parts being a male part 75 and a female part 76 or of a rubber or elastomer grommet 83, and an outer shield 84 enclosing an insulating air gap space 8 with a reflective heat shield 110 on one of the surfaces defining the air gap space, and/or on or incorporated into insulation material 140 between the said nipple valve 30 and the outer shield 84. The heat conductive sleeve surrounds and is in tight thermal contact with at least a portion of the body of the nipple valve. The outer shield provides protection from exterior ambient cold or hot air.

In one preferred embodiment, the sleeve 20 is a clamped sleeve that has an axial slot 22 to allow radial compression of the sleeve onto the body 36 of the nipple valve 30. In another preferred embodiment, a heat conducting ring 130 having an axial slot 132 may be situated around the nipple valve part comprising a metal annulus with exposed lower surface 32 and within the clamped sleeve 20 to transmit heat to the nipple valve seat. A thermal joint enhancement foil 18 may be used to fill a gap between the heat pipe 10 and the clamped sleeve 20. A thermal joint enhancement foil may also be used to fill a gap between conductive metal ring 130 and clamped heat shield 20. In one preferred embodiment, the joint enhancement foil is a good conducting metal. In one more-preferred embodiment, the good conducting material is aluminum, aluminum alloy, or gold. In another more preferred embodiment, the outer diameter of the heat pipe 10 and the outer diameter of the nipple valve body 36 are matched so that the clamped sleeve 20 can be easily made to conform to both. In one preferred embodiment, the nipple valve body 36 outer diameter, if larger than the outer diameter of the heat pipe 10, is machined as a minor modification to obtain a match. The machining may be by turning, grinding, sanding, filing, or any common method or combination thereof as known in the art. The nipple valve 30 is mounted into the heat pipe 10 and sealed by a polymer or elastomer annular gasket 46, or the nipple valve is screwed into a threaded hole at the lower end of the heat pipe and optionally sealed with threaded joint sealing tape such as Teflon tape, so that the entrance orifice of the nipple is in contact with the liquid, e.g., water, in the interior of the heat pipe 10, and the internal parts of the nipple, for example, an upper stage headed pin 42 or a valve seat weight comprising a sphere 40 or cylindrical disk, are free to move. In the figures, the wall 350 of a reservoir container 50 or a supply pipe wall is represented as the interior surface 100 and an exterior surface 200 that may be enclosed in an outer enclosure 300 that may be a bucket.

The heat pipe 10, the interface 18 between the heat pipe 10 and the clamped sleeve 20, which interface 18 may comprise an optional shim sleeve or wrapping of malleable heat conducting material, the clamped sleeve 20, and the wall of the nipple valve housing 36 in the vicinity of the nipple valve seat comprise a series connected thermal path between the reservoir and the nipple valve 30. Accordingly, the thermal resistance of this path is the sum of the resistance of the heat pipe $\mathcal{R}_p$, the resistance of the interface $\mathcal{R}_{psc}$ comprising contact resistance(s) and resistance of the optional shim sleeve or wrapping, the resistance of the clamped sleeve $\mathcal{R}_{sl}$, the resistance of the contact interface $\mathcal{R}_{c1}$ between the clamped sleeve and the body 36 of the nipple valve housing, the resistance of the nipple valve housing $\mathcal{R}_w \approx [k_w \pi D_w l]^{-1} \delta$, and the resistance of the contact interface $\mathcal{R}_{c2}$ between the housing of the nipple valve housing 36 and the lower metal part with exposed surface 32 and orifice through which an actuator 34 protrudes, here shown as a pin. The Applicants foresee alternate forms of the actuator including a pin, lever, ball, knob, and the like. The body 36 of the nipple valve has thermal conductivity $k_w$, mean diameter $D_w$, and thickness $\delta$, l is the height of the principal part of the metal annulus with exposed surface 32, which is in contact with or is part of the $\mathcal{R}_p + \mathcal{R}_{psc} + \mathcal{R}_{sl} + \mathcal{R}_{c1} + \mathcal{R}_w + \mathcal{R}_{c2}$.

When the heat pipe 10 or clamped sleeve 20 comprises an annular circular cylinder, the thermal resistance can be calculated by substitution of the appropriate values of the annular cylinder of length L, outer diameter $D_2$, and inner diameter $D_1$, and made of material with thermal conductivity k, into Eqn. (1) given as $$\mathcal{R} = 4L[k\pi(D_2^2 - D_1^2)]^{-1} \qquad (1)$$

The temperature difference between the reservoir temperature $T_r$ and the nipple valve seat temperature $T_{ns}$ is $\Delta T_{ms} = T_r - T_{ns}$. As a 'lumped-circuit' estimate, for a given radial heat loss along the heat pipe $Q_{hp}$, the radial heat loss along the clamped sleeve $Q_s$, and a heat loss at the exposed lower surface 32 of the nipple valve $Q_n$, the temperature difference $\Delta T_{rns}$ is the sum of the temperature differences between the reservoir and lower end of the heat pipe $\Delta T_{rp}$, the temperature difference between the lower end of the heat pipe and the lower end of the clamped sleeve $\Delta T_{ps}$, and the temperature difference between the lower end of the clamped sleeve and the exposed lower surface of the nipple valve $\Delta T_{sn}$. Thus, $\Delta T_{rns}$ given by:

$$\Delta T_{rns} \lesssim \Delta T_{rp} + \Delta T_{ps} + \Delta T_{sn} = Q_{hp}\mathcal{R}_p + Q_s\mathcal{R}_s + Q_n\mathcal{R}_{sn} \quad (2)$$

where $\mathcal{R}_p$ is the thermal resistance of the heat pipe, $\mathcal{R}_s = \mathcal{R}_{psc} + \mathcal{R}_{sl}$ is the thermal resistance of the clamped sleeve, and $\mathcal{R}_{sn} = \mathcal{R}_{c1} + \mathcal{R}_w\mathcal{R}_{c2}$ is the thermal resistance of the thermal path via the clamped sleeve 20 to the exposed lower surface 32 of the nipple valve 30.

When the series resistance and the losses are sufficiently small, then, by Eqn. 2, $\Delta T_{rns}$ will be sufficiently small so that the nipple valve seat temperature will be within a few degrees of the reservoir temperature.

The thermal losses from the exposed lower surface 32 of the nipple valve 30 and actuator pin 34 principally are the radiated loss and the convection loss. For machined stainless steel surfaces, the emissivity is approximately $\varepsilon \sim 0.5$. The radiation loss is approximately $$P_{rn} \sim \varepsilon \sigma_B (T_{ns}^4 - T_0^4) A_n, \quad (3)$$

where $\sigma_B$ is the Stefan-Boltzmann constant. For a typical nipple valve, $A_n \sim 1.8 \times 10^{-4}$ m². Accordingly, $P_{rn} \sim 0.007$ W, when $T_{ns} \sim 0°$ C., and $T_0 \sim -18°$ C.

The convection loss at the exposed nipple valve exposed lower surface 32 can be estimated in the free convection case where there is no wind blowing across the exposed nipple surfaces, and also in the forced convection case where there is a wind of speed $v_w$. The convective heat transfer coefficient is estimated as $$h = Nu\, L_c^{-1} k_a \lesssim 0.66 Re1/2 Pr1/3 k_a L_c^{-1}, \text{ (laminar flow)} \quad (4a)$$

$$h = Nu\, L_c^{-1} k_a \lesssim 0.037 Re4/5 Pr1/3 k_a L_c^{-1}, \text{ (turbulent flow)} \quad (4b)$$

where $k_a$ is the thermal conductivity of air $k_a \sim 0.024$ and the Prandtl number is $Pr \sim 0.715$ at $0°$ C., $L_c$ is a characteristic length ($L_c \approx 0.25\, D_{shield}$ for laminar flow, $D_{shield}$ being the outer diameter of the outer shield 84) and $Re = v_w L_c v^{-1}$, and $v$ is the kinematic viscosity $\sim 1.33 \times 10^{-5}$ m²/s at $0°$ C. When $v_w \sim 5$ mph ($\sim 2.24$ m/s), and $L_c \sim 0.01$ m, $Re \sim 1684$, and the flow is laminar. In this case and by Eqn. (4a), $h \sim 17.6$ W/m²K, and $Q_n \sim hA_n(T_{ns} - T_0) + P_{rn} \sim 0.1$ W. If a discontinuity induces a sudden transition to turbulence, then $h$ is given by Eqn. (4b), $h \approx 9$, and $Q_n \sim 0.05$ W.

In contrast is the heat loss for free convection from a downward facing disk for which $$h = Nu\, L_c^{-1} k_a \lesssim 0.27 (GrPr)^{1/4} L_c^{-1} k_a, \quad (5)$$

where $Gr$ is the Grashoff number. For the conditions in the above described example, $h \sim 12.1$ W/m²k for free convection versus $\sim 17.6$ for forced convection. Thus, the heat loss by forced convection because of wind generally is substantially greater than by free convection.

The radial conduction and/or convection loss via the insulation, mounting sleeve 80 or outer shield 84 and/or annular space 8 surrounding the heat pipe 10 and clamped sleeve 20 can be estimated as $$Q_{hp} = Q_{cond-hp}, \quad (6)$$

$$Q_s = Q_{ins-sleeve} + P_{r-sleeve}, \quad (7)$$

where $Q_{cond-hp}$ is the conduction heat loss of the heat pipe 10 in the vicinity of the feed-through (male part 75 and female part 76 or grommet 83 as later shown in FIG. 9) where the heat pipe 10 passes from the interior 100 of the reservoir container or supply pipe to the exterior 200 of said container or pipe, $Q_{ins-sleeve}$ is the radial conduction and/or the convection heat loss from the clamped sleeve 20, and $P_{r-sleeve}$ is the radial radiation heat loss from the clamped sleeve 20 in the case where there is an air gap 8 surrounding the clamped sleeve 20.

The conduction heat loss of the heat pipe 10 in the vicinity of the feed-through (parts 75 and 76 or grommet 83 is small because the temperature difference $\Delta T_{ft}$ between the heat pipe 10 and the walls of the feed through is small. As an estimate, $Q_{cond-hp} \sim k_p A_{feed-through} \Delta T_{ft}/\delta_{ft}$, and $k_p \sim 0.19$ is a typical value of thermal conductivity for plastic feed-through parts 75 and 76, gasket 70, or grommet 83, or wall material (for example polyvinyl chloride, PVC), $A_{feed-through} \sim 1 \times 10^{-3}$ m² is a typical surface area, and $\delta_{ft} \sim 0.006$ m is a typical radial gasket 70 and wall thickness of parts 75 and 76 or grommet 83, it is seen that $Q_{cond-hp} \sim 0.03 \Delta T_{ft}$. When $\Delta T_{ft} \lesssim 5°$ C., $Q_{cond-hp} \sim 0.15$ W.

Figure 12:
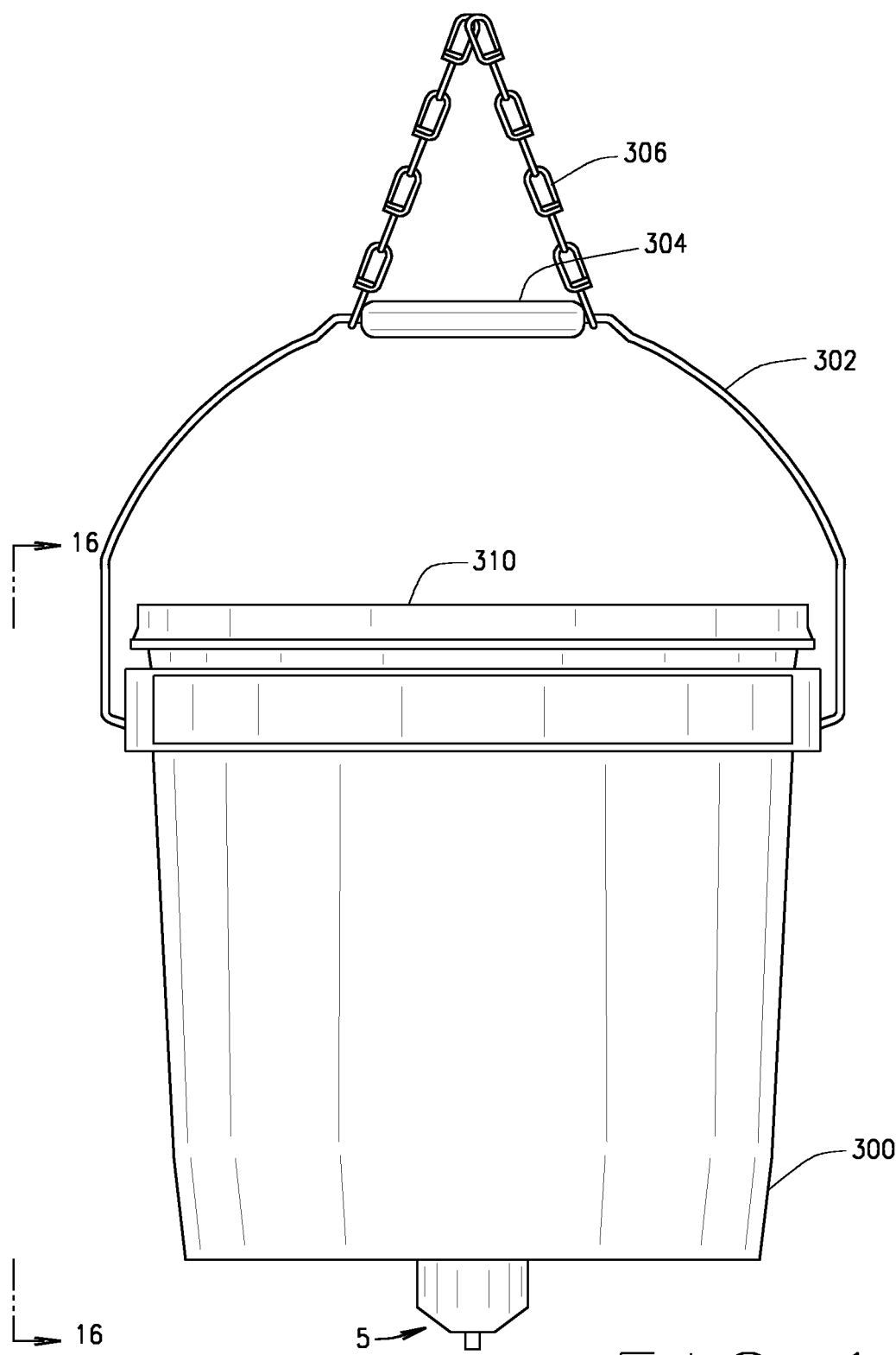
FIG. 12 describes a side view of an embodiment of a low heat-loss rate waterer with an integrated, shielded, freeze-resistant nipple valve device with a heat pipe, a sleeve, a mounting and feed-through connection, and an outer shield.

The radial conduction heat loss from a clamped sleeve 20 surrounded by optional insulation 140 and/or 128 is estimated as $$Q_{ins-sleeve} \lesssim 2\pi k_{ins} L_{sleeve} \Delta T_s \left[\ln\left(\frac{d_2}{d_1}\right)\right]^{-1}, \quad (8)$$

where the thermal conductivity of the insulation 140 surrounding the clamped sleeve $k_{ins}$, may have a typical value $\sim 0.06$ W/m-K (for example, polyethylene small cell foam), $L_{sleeve}$ is the length of the clamped sleeve (a typical value being about 0.03 m), $\Delta T_s \sim 18°$ C. for $T_{ns} \sim 0°$ C. and $T_0 \sim -18°$ C., and $d_2$ and $d_1$ are the outer diameter and inner diameter of the insulation, respectively. When $d_1 \cdot 0.015$ m and $d_2 \sim 0.033$, $Q_{ins-sleeve} \sim 0.26$ W. This is an overestimate when the reservoir container is surrounded by an outer container 300 (as shown in FIG. 12), as only part of the nipple assembly outer shield 84 may be exposed to ambient temperature where the nipple device 5 protrudes outside of the outer container.

Radiation heat loss across the air gap 8 is effectively reduced by use of a reflective heat shield 110 such as may be formed by a cylinder of aluminized polyester (e.g., aluminized Mylar®) film. In this case, the emissivity is $\varepsilon \sim 0.04$, the clamped sleeve area is $A_{sleeve} 1.4 \times 10^{-3}$ m², and the outer surface of the air gap is at a temperature $>T_0$. In this case, Eqn. (3) may be used with the substitution of $A_{sleeve}$ for $A_n$ to estimate the radiation heat loss from the clamped sleeve. For the typical values given, $P_{r-sleeve} \sim 0.004$ W. Without the reflective heat shield, this loss would be 25 times greater, i.e., 0.1 W.

The sleeve 20 may be surrounded by both an insulating air gap 8 and an annulus of insulating material 140 in addition to the outer shield 84 as shown in FIGS. 2, and 7-11. In this case, the temperature of the interface at the air gap 8 and insulating material 140 depends on the relative radial thickness of the air gap 8 and insulation 140, and the values of convection heat transfer coefficient in the air gap and the thermal conductivity of the insulation material.

As the annulus of insulation material 140 and the annular air gap 8 are series resistances, the heat flux through the insulation material 140 may be equated with the heat flux across the air gap 8, which is the sum of convective flux and radiative flux. With a reflecting heat shield 110 on one of the surfaces defining the air gap 8, and, for the purposes of estimation, assuming that the reflective heat shield 110 is on the surface interface between the air-gap 8 and the insulating material 140, or the heat shield is incorporated into insulation material 140, and that the outer surface of the sleeve 20 is at temperature $T_{sl}=T_r-\Delta T_{rs}$, and the ambient exterior temperature is $T_0$, then, the temperature $T_i$ on the surface interface between the air-gap 8 and the insulating material 140 is estimated as $$T_i = \left[\frac{C_0 T_0 + (p_r + h_i A_{sl}) T_{sl}}{C_0 + p_r + h_i A_{sl}}\right] \quad (9)$$

where $$C_0 = 2\pi k_{ins} L_{sleeve} \left[\ln\left(\frac{d_0}{d_1}\right)\right]^{-1}, \quad (10)$$

$$p_r \sim 4\varepsilon\sigma_B (T_{sl}^3) A_{sl}, \quad (11)$$

$$h_i = Nu L_c^{-1} k_a \lesssim 0.53 (GrPr)^{\frac{1}{4}} L_c^{-1} k_a, \quad (12)$$

and, in the case where the insulating material 140 surrounds the air gap 8, $d_0$ is the outer diameter of the insulation annulus, $d_1$ is the diameter of the interface surface (and the diameter of the annular reflective heat shield 110), and the Grashoff number Gr in Eqn. (12) is estimated for a temperature difference $T_{sl}-T_0$. By Eqns. (9-12), the interface temperature can be calculated, and the radial heat flux estimated as $$Q_{radial} \approx 2\pi k_{ins} L_{sleeve}(T_{sl}-T_0)\left[\ln\left(\frac{d_0}{d_1}\right)\right]^{-1}. \quad (13)$$

One embodiment of an insulated, shielded, nipple valve device 5 with a heat pipe 10, mounting and feed-through connection to a container or supply pipe, a heat conductive clamped sleeve 20 surrounding the body of a nipple valve 30, an air-gap 8 and reflective heat shield 110 surrounding the nipple valve 30 and sleeve 20, an outer shield 84 that provides protection from exterior ambient cold or hot air is shown in FIG. 1. In one preferred embodiment, the heat pipe 10 is made of good conducting metal that has low susceptibility to corrosion in water or whatever fluids will be put into the reservoir or supply line. Examples of good conducting metal include aluminum and alloys thereof, copper and alloys thereof, brass alloys, noble metals, platinum group metals, and metals and alloys having a thermal conductivity greater than about 90 W/m-K at 0° C. Copper and several copper alloys have thermal conductivity greater than 250 W/m-K at 0° C. Some metals may undergo chemical reactions and release undesirable compounds into the reservoir unless coated or treated to reduce or prevent corrosion. Aluminum has good corrosion resistance in aqueous solutions and water when the pH is between 6 and 8. Outside of this range or to further reduce corrosion, it may be desirable to coat or treat the aluminum, for example with plastic coatings, plating with corrosion resistant metals, or anodization to resist corrosion, and/or other treatments that are known in the art. Similarly, other good conducting metals can be used provided the surfaces are treated to resist corrosion. Other noble metals, e.g., gold and silver, and platinum group metals also can be used for the heat pipe or for plating, but they are generally expensive.

When it is desired to use a 'push-in' type commercially available nipple valve 30 that typically has a gasket 46 to obtain a watertight seal, the inner diameter of the heat pipe may be selected and enlarged or reduced at the lower end of the heat pipe to accommodate gasket 46. When it is desired to use a threaded type commercially available nipple valve 30 the inner diameter of the heat pipe may be selected and enlarged or reduced at the lower end of the heat pipe to accommodate threads for a sealed threaded joint. In one preferred embodiment, the inner diameter of the heat pipe is in the range of about ¼ to about ⅝ inches, and the length L is in the range of 0.5 to about 5 inches. In one more-preferred embodiment, the inner diameter is in the range of 5/16 to about 7/16 inches, and the length is in the range of about 1 to about 4 inches. The annular thickness of the heat pipe is selected so that the thermal resistance $\mathcal{R}_p$ as given by Eqn. (1) is sufficiently small that $\Delta T_{rp}$ is a small fraction of the temperature differential between the reservoir and the exposed surface 32 of the nipple. The length may be selected so that the top of the heat pipe protrudes sufficiently into the reservoir above surface 100 so that a heater, e.g., an electric heater, an example of which is an electric aquarium heater, can be placed between the lower surface of the reservoir and the top of the heat pipe. Such placement may ensure that the heat pipe inlet will be proximate to the warmest water in the reservoir. Similarly, when the present invention is mounted in a supply pipe, the length of the heat pipe may be selected so that the inlet of the heat pipe is proximate to the warmest water in the pipe, and further, the length may be selected to not unacceptably impede the flow of water in the pipe.

The sleeve 20 is made of good conducting metal such as the examples given for the heat pipe 10. In one preferred embodiment, the sleeve is made of aluminum, brass, copper, or alloys thereof. In one more-preferred embodiment, it is made of copper or alloys thereof. The sleeve must make sufficiently close contact with the body of the nipple valve 36, and/or with a good conducting metal ring 130 (shown in FIGS. 4-11) that makes sufficiently close contact with the metal annular cylinder comprising the lower member 32 of the nipple valve seat where the actuator pin 34 makes contact.

In one preferred embodiment, the sleeve 20 is a clamped sleeve comprising an annular cylinder with an axial slot 22 so that it can be more easily compressed radially when clamped to obtain a sufficient contact pressure. With sufficient clamping pressure $P_c$, it is found that the thermal contact resistance $\mathcal{R}_c$ can be made sufficiently small, so that an acceptable temperature difference results. The clamped sleeve 20 should be sufficiently malleable so that it can conform to the body of the nipple valve 36 with minimal clamping force. Such malleability can be obtained by selection of material and/or alloy and by softening the material, e.g., by heat treatment. In one more-preferred embodiment, the clamped sleeve 20 is of copper and has an annular thickness of about 1 to 3 mm (0.04 to 0.12 inches) and a length $L_{sleeve}$ that is comparable to the length of the principal body of the nipple valve 36 plus an additional length so that the upper portion can be clamped onto the lower portion of the heat pipe 10. For example, when the nipple valve 20 is an Impex 420011 nipple valve, for which the lower principal portion of the nipple valve is about ¾ inch, in one preferred embodiment, the length of the clamped sleeve $L_{sleeve}$ is about 2.5 to 3.5 cm, i.e., about 1.0 to 1.4 inches, so that the clamped sleeve overlaps the heat pipe by about 5-10 mm or about 0.2 to about 0.4 inch.

There are a variety of elastic/plastic models of thermal contact between a plastic and a metal; examples are Greenwood and Williamson (1966), Cooper, Mikic, and Yovanovich (CMY model, 1969), Persson (2006), Jackson and Streator (2006), Bahrami, Yovanovich, and Marotta (2006), Carbone (2009), Jackson and Green (201), and Tian, Zhao, Zhu, and Qin (2012). These models predict a thermal conductance at the plastic-metal joint that depends on the joint contact surface area and the distribution of size, geometry, and density of asperities and features (collectively, the "surface parameters") that behave elastically and/or plastically under clamping load pressure between the plastic and metal. At low loading pressure, the joint is in the microscopic resistance regime, and the low conductance of the joint in comparison with the bulk conductance of the plastic material results in the joint contact resistance $\mathcal{R}_c$ being much larger than the bulk polymer layer resistance $\mathcal{R}_{bulk}$. However, at high loading pressure, the joint is in the bulk polymer resistance regime, and $\mathcal{R}_c$ becomes comparable to or smaller than $\mathcal{R}_{bulk}$.

Use of the cited models to predict $\mathcal{R}_c$ is difficult without knowledge of the actual apparent contact area, the surface roughness and surface finish, and the surface parameters. Many of the models are based on highly polished surfaces or on 'optically flat' mating surfaces. While the 'computational' simulation models can account in principle for imprecise shapes and deformation of the mating objects that comprise the joint, in practice, such knowledge is not readily available. Some models allow a 'corrective factor' that is the ratio of actual to apparent geometrical surface area, however, even knowledge of this factor may be difficult to ascertain. Further, measurement or detailed knowledge of the surface parameters that may vary from piece to piece in a production of inexpensive parts is impractical. Thus, it was not a priori obvious that $\mathcal{R}_c$ can be made small enough at practical clamping force for the purposes of the instant invention.

The pressure exerted by the clamped sleeve 20 on the heat pipe, the body of the nipple valve, or the optional conducting metal ring 130 is approximately given by $$P_c = 2F/(D_{sl} L_{sleeve}), \quad (14)$$

where $D_{sl}$ is the inner diameter of the clamped sleeve 20, and F is the tensile force exerted by the clamping means. This is a macroscopic average pressure.

As reported by Fuller and Marotta, in the microscopic resistance regime, $$\log\left(\frac{h_c \sigma}{k_s m_{ab}}\right) \propto \log\left(\frac{2.3 P_c}{E_p m_{ab}}\right), \quad (15)$$

where $h_c$ is the contact heat transfer coefficient, $\sigma$ is the mean surface roughness, $k_s$ is the mean bulk conductivity of the metal and plastic, $m_{ab}$ is the mean surface slope of asperities, and $E_p$ is the elastic modulus of the plastic. Implicit in this model is the assumption that the pressure is applied over the mating pieces and that the surfaces are in proximate or sufficiently close contact. Generally, this assumption is only approximate for a metal clamped sleeve on a plastic nipple body unless fabrication processes are used to obtain good macroscopic feature and part conformance, relatively smooth surface finish and surface roughness. Nonetheless, an illustrative estimate of combined joint contact conductance and bulk conductance can be obtained with the parameter values of $k_s \approx 2k_p$, i.e., twice the conductivity of the plastic, $m_{ab} \approx 0.21$, typical surface roughness $\sigma = 5$ μm, and $E_p \approx 3.6 \times 10^9$ Pa. The data of Marotta and Fletcher and Fuller and Marotta show that when $2.3 P_c/(E_p m_{ab}) \approx 0.001$, then, $h_c \sigma/(k_s m_{ab}) \approx 2 \times 10^3$, and for greater values of $P_c$, the joint conductance increases relatively slowly as a function of $P_c$, and the joint conductance is in the bulk polymer resistance region and $\mathcal{R}_c \lesssim \mathcal{R}_{bulk}$. For the parameter values given above, this critical value $P_{crit}$ occurs at about $P_{crit} \approx 50\text{-}100$ psi applied pressure.

Comparison with the data of Fuller and Marotta can be made although the actual surface conditions and actual values or $\sigma$, $m_{ab}$, $P_c$, and joint surface area are not readily determined or known for the components of the freeze-resistant nipple valve device. For an applied $P_c \approx 150$ psi on acetal homopolymer (e.g., Delrin® by DuPont) plastic, with the parameter values of $k_s \approx 2k_p \approx 0.76$ W/m-K, i.e., twice the conductivity of the plastic, $m_{ab} \approx 0.57$, typical surface roughness $\sigma \approx 2.2$ μm, and $E_p \approx 3.6 \times 10^9$ Pa. their results correspond to $1/h_c \approx 0.0056$ m$^2$-K/W. The contact conductance $h_\mu$ and $h_{bulk}$ are related to $h_c$ by the following relation, $$\frac{1}{h_c} = \frac{1}{h_\mu} + \frac{1}{h_{bulk}} = \frac{1}{h_\mu} + \frac{\delta}{k_p}\left(1 - \frac{P_c}{E_p}\right), \quad (16)$$

where $\delta$ is the thickness of the plastic. From the experimental parameters and data of Fuller and Marotta, $1/h_{bulk} \approx 0.0035$, and $1/h_\mu \approx 0.0021$, i.e., $h_{bulk} \approx 287$ W/m$^2$-K and $h_\mu \approx 482$ W/m$^2$-K, so, the interface contact resistance is about 1.7 times the bulk polymer resistance.

In an experimental test, a one gallon reservoir container was filled with warm water, $T_{init} \approx 112°$ F. (44° C.), and the temperature of the reservoir $T_r$ and the temperature $T_n$ at the exposed surface at the end of the nipple 32 were measured as a function of time. Temperatures were measured with type K thermocouples comprising welded 0.25 mm diameter wire chromel-alumel junctions and where the measuring thermocouple was in series with a reference junction thermocouple that was immersed in a glass container of ice water at $T_{ref} \approx 40°$ F. The thermocouple junction that measured $T_n$ was spot welded onto the exposed surface of the nipple 32. Because of the small distance between the exposed face 32 and the nipple valve seat, it is assumed that $T_n \approx T_{ns}$ within about a degree C. With an ambient temperature $T_a \approx 21°$ C., the initial temperature differential between the reservoir and the ambient air was 23° C., which is comparable to the difference between a reservoir temperature just above the freezing point of water and an ambient temperature of approximately 0° F.

For a nipple mounted by a rubber bushing 46 on a heat pipe held in a feed-through comprising a rubber grommet 83, but with no outer shield or clamped sleeve, the temperature $T_n \approx T_a + \delta T \approx T_r - 23(°$ C.$) + \delta T$ with $\delta T \leq 5°$ C. after about 6 minutes. When the unshielded nipple is exposed to an approximately 9 mph wind, $T_n \approx T_a + \delta T$, and $\delta T \leq 2.5°$ C. at quasi-equilibrium within less than 6 minutes. In a controlled experimental comparison, a freeze-resistant nipple valve device 5 with a clamped-sleeve, outer shield, and reflective heat shield is found to have a quasi-equilibrium $T_n \approx T_r - \delta T$, where $\delta T \leq 7.5°$ C. after about 10 minutes with a wind of approximately 9 mph. In another controlled experimental comparison, a freeze-resistant nipple valve device 5 with a clamped-sleeve, a conducting metal ring 130, outer shield, and reflective heat shield is found to have a quasi-equilibrium $T_n \approx T_r - \delta T$, where $\delta T \leq 5°$ C. after about 10-15 minutes.

For the insulated, shielded, nipple valve device 5 used in the above experimental example, when $\Delta T_{sn} \leq 5 \pm 3°$ C., and $Q_n \approx 0.1$ W (laminar flow case), then $\mathcal{R}_{sn} \approx 50$ K/W. As the overlap area is $A_c \approx 4$ cm$^2$ for the overlap of the clamped sleeve 20 in the vicinity of the metal annulus comprising the lower portion of the nipple valve seat and the exposed lower surface 32 of the nipple valve, the corresponding value based on the Fuller and Marotta results is $\mathcal{R}_{sn} \approx 14$ K/W. By comparison, the bulk thermal resistance of a Delrin® plastic body of a nipple valve at the overlap area is $\mathcal{R}_{bulk} \approx 9.9$ K/W. Thus, the combination of effective contact area and surface parameters appears to result in our experimentally realized $\mathcal{R}_{c1} + \mathcal{R}_{c2} \approx 40$ K/W, which is about a factor of 3 greater than would be predicted from the data of Fuller and Marotta. Nonetheless, $\mathcal{R}_{sn}$ is sufficiently small for the objective of the present invention.

It is found that any of several conventional means for clamping cylindrical objects can be used to apply adequate force F. Such means include plastic cable ties, metal wire wrapped circumferentially around the clamped sleeve with the ends of the wire twisted to generate the clamping force, and common 'hose clamps', either of plastic or metal. In one preferred embodiment, the clamping means should be small in size and of small mass, and it should provide stable applied force in spite of temperature changes that cause expansion and contraction; and further, it should be stable for long time duration such as a year or more. In one more-preferred embodiment, the clamping means comprises one or more metal wires 90 wrapped around the clamped sleeve 20 and with the wire ends twisted. In one still more-preferred embodiment, at least two wires are used, one of which provides clamping force in the vicinity of the overlap of the clamped sleeve 20 and the heat pipe 10, and the wire is of stainless steel or other corrosion resistant metal. In such an embodiment, it is found that a 1 mm diameter stainless steel wire of 300 series (Ausinitic) alloy with ends twisted can apply about 12 pounds of tensile force or more. Thus, for a clamped sleeve inner diameter of $D_{sl}$=0.25 inches and $L_{sleeve}$=1.0 inches, and an applied force of 12 pounds with a single clamp wire 90, a clamping pressure of $P_c$=48 psi (3.3×10$^5$ Pa) is generated. With three clamp wires, the clamping pressure is about 150 psi. In a preferred embodiment, the clamp wire has diameter in the range of 0.5 mm to about 2 mm.

The mounting and feed-through connection to a reservoir container 50 may comprise a tubulation with a flange that is attached to the wall of the reservoir container 50 by any of several means known in the art and sealed by a gasket, grommet, bushing, O-ring, waterproof sealant, room-temperature-vulcanizing rubber (RTV) such as a silicone glue, or other means known in the art. In one preferred embodiment, the mounting and feed-through connection comprises a male part 75 and a female part 76, either of which may have a flange so that when the parts are assembled, the wall of the reservoir container is held between the parts 75 and 76, and a gasket, waterproof sealant, or silicone glue seals the joint between the reservoir container and the feed-through. In one preferred embodiment, the male part 75 is a Schedule 40 PVC pipe plug that is drilled with a through hole to accept the heat pipe and sealing means, and example of which is a tubular gasket comprising a short length of polymer tubing 70 such as vinyl tubing, and the female part 76 is one-half of a Schedule 40 PVC pipe coupling, said pipe coupling and pipe plug being either of the slip fit type or threaded type. In one more-preferred embodiment, the said pipe coupling and pipe plug are of the slip fit type. In another preferred embodiment, the male part 75 of the feed-through may comprise a threaded tubulation that is screwed into the wall of the reservoir container 50 and sealed by any of several methods known in the art. Such a feed-through connection is one preferred embodiment for mounting the nipple valve assembly 5 into a supply pipe. In a preferred embodiment, the heat pipe 10 protrudes through the feed-through and may be sealed by compression of a gasket, or a cylinder of polymer tubing, for example 70 (as shown in the figures), or sealant, or an O-ring. In one more-preferred embodiment, the feed-through is a rubber or elastomer grommet 83 made of 50-60 Durometer FDA listed material for food or potable water contact such as silicone, Buna-N nitrile, EPDM, or neoprene. To increase the compression of the grommet, one or more potable water compatible plastic or rubber sleeves 87 may be situated on the heat pipe 10 within the inner diameter hole in the grommet 83. Examples of such a sleeve 87 is a length of cylindrical PVC or Teflon heat-shrinkable tubing that is heat treated to tightly shrink fit onto the heat pipe 10 to form a watertight seal.

The reflective heat shield 110 surrounding the nipple valve 30 and sleeve 20, and forming one surface of the air gap may comprise any of several low emissivity materials such as a foil or metalized film. In one preferred embodiment, the foil or film is aluminum with an emissivity less than 0.10, i.e., $\varepsilon \leq 0.10$. In one preferred embodiment, the aluminum foil has a thickness in the range of 0.0005 to 0.003 inches (about 12 to 75 micrometers). In one more-preferred embodiment, the reflective heat shield 110 comprises aluminized polyester, such as aluminized Mylar®, in which the plastic film has a thickness in the range of 0.001 to 0.010 inches (about 25 to 250 micrometers), and the metallization on the plastic film has a thickness in the range of about 0.3 to 25 micrometers. In one preferred embodiment, the reflective heat shield 110 is attached to a plastic material neighboring the air gap 8 such as the interior wall of the outer bucket, or the insulation 140, or the outer shield mounting sleeve 80, or it is attached to the outer surface of the sleeve 20. The means of attachment may be any of several known in the art. In one preferred embodiment, the attachment is by adhesive, an example of which is a spray applied adhesive such as 3M's 777® spray adhesive. In another preferred embodiment wherein the air gap 8 surrounds the thermal insulation 140, the reflective heat shield 110, and the sleeve 20, the insulation 140 and reflective heat shield 110 are held against the sleeve 20 by one or more of the following, a plastic cable tie, a tie wire, adhesive, adhesive tape, heat shrinkable tubing, an elastic band, or any commonly used means of fastening.

The outer shield 84 that provides protection from exterior ambient cold or hot air also provides protection from pecking by birds and from damage to the nipple valve device 5 in case the assembly comes in contact with the ground or is bumped into another object. Accordingly, the outer shield 84 and its mounting that may be via a sleeve 80 attached to part 75 must be sturdy and easily cleaned. In one preferred embodiment, it is also made of thermal insulating material such as plastic, an example of which is PVC. In one more-preferred embodiment, the outer shield 84 comprises a Schedule 40 PVC pipe cap in which an orifice is made so that the nipple valve 30 can protrude. In one still more-preferred embodiment, the Schedule 40 PVC pipe cap is mounted on a PVC pipe adapter that comprises an outer shield mounting sleeve 80 that is mounted onto the feed-through part 75 and may be optionally attached by one or more screws. In one preferred embodiment, the exposed lower surface 32 of the nipple valve is approximately flush with the outer surface of the outer shield 84 at the orifice in the outer shield. In an alternate embodiment, the outer shield includes an air gap, air spaces within its construction, a low thermally conductive material, and the like.

An embodiment of an insulated, shielded, nipple valve device 5 with a heat pipe 10, mounting and feed-through connection (75-76) to a reservoir container 50 or supply pipe is shown in FIG. 2. A heat conductive clamped sleeve 20 surrounds the body of the nipple valve 30. An air-gap 8 and reflective heat shield 110 surround the nipple valve 30 and clamped sleeve 20. An outer shield 84 provides protection from exterior ambient cold or hot air. Insulating material 140 such as polyethylene foam insulation within the outer shield surrounds the air-gap.

An embodiment of an insulated, shielded, nipple valve device 5 with a heat pipe 10, mounting and feed-through (75-76) connection to a container 50 or supply pipe is shown in FIG. 3. A heat conductive clamped sleeve 20 surrounds the body 36 of the nipple valve 30. An air-gap 8 and reflective heat shield 110 surround the nipple valve 30 and clamped sleeve 20. An outer shield 84 provides protection from exterior ambient cold or hot air. An annular insulating washer 128 made of cork or other insulating material with good durability in a moist environment centers the clamped sleeve 20 and nipple valve 30 in the opening, i.e., orifice, of the outer shield 84; it also reduces infiltration of ambient exterior air into the space between the clamped sleeve and the outer shield. In one preferred embodiment, the said orifice has a diameter that is at least one-half millimeter larger than the outer diameter of the clamped sleeve 20 so that the clamped sleeve and nipple valve are not in good thermal contact with the outer shield 84.

One preferred embodiment of an insulated, shielded, nipple valve device 5 with a heat pipe 20, mounting and feed-through connection (75-76) to a reservoir container 50 or supply pipe is shown in FIG. 4. A heat conductive clamped sleeve 20 surrounds the body 36 of the nipple valve 30 and also clamps a heat conductive ring 130 that makes good thermal contact with the metal annulus with exposed surface 32 at the lower end of the nipple valve seat. In one preferred embodiment, the heat conductive ring is an annulus with an axial slit and outer and inner diameters selected so that when the said ring is held by the clamped sleeve, the applied pressure is transmitted from clamped sleeve 20 to conductive ring 130 to the metal annulus with exposed surface 32. In one preferred embodiment, the heat conductive ring 130 is made of any or a combination of the following or their alloys, or other heat conductive materials known in the art, good conducting metal, aluminum, copper, brass, bronze, silver, stainless steel, a platinum group metal, combinations thereof, or alloys thereof. In one more-preferred embodiment, the material of the heat conductive ring 130 is selected for low susceptibility to corrosion in a wet or weather-exposed environment or for low toxicity. An air-gap 8 and reflective heat shield 110 surround the nipple valve 30 and clamped sleeve 20. The clamped sleeve is clamped by three wire rings 90, each with ends twisted to apply a force of approximately 10 pounds or more. An outer shield 84 provides protection from exterior ambient cold or hot air.

As the heat conducting ring 130 described above may contact only an axial portion of the metal annulus with exposed surface 32, it is necessary that the applied clamping pressure in the vicinity of the said heat conducting ring 130 be sufficient so that the heat resistance that is the sum of the heat resistance of the contact interface between the clamped sleeve 20 and the heat conducting ring 130, the heat resistance of the conducting ring, and the heat resistance of the contact interface between the conducting ring 130 and the metal annulus with exposed surface 32 is sufficiently small so that the temperature difference between the metal annulus and the clamped sleeve is acceptably small. As with the plastic-metal thermal contact conductance phenomenology described above, the metal-metal thermal contact conductance depends on the surface parameters and surface finish, as well as the effective contact area and elastoplastic properties of the materials. Generally, it is known in the art (see, for example, Yovanovich 2005) that in metal-metal joints with surface finishes obtained by common machining and common fabrication methods, and with applied pressure greater than about ⅓ MPa (i.e., about 50 psi), that joint thermal resistance of the order of $10^4$ K-m$^2$/W or less can be obtained. As the apparent contact surface area for conducting ring 130 may be about 0.1 cm$^2$ or greater, then, the bulk resistance of the conducting ring 130 is about 10 K/W when the annular thickness of the conducting ring is about 1.5 mm, and, then, the joint contact resistances are comparable to the bulk resistance of the conducting ring. With greater clamping pressure, the contact resistance will be less. Thus, when the heat loss at the metal annulus exposed surface 32 is about 0.1 W and the clamping pressure is $\geq P_{crit}$, a temperature difference of about one degree or less may be expected, and the heat conducting ring 130 may significantly aid the heat transfer between the clamped sleeve and the nipple valve metal annulus with exposed surface 32.

An embodiment of an insulated, shielded, nipple valve device 5 with a heat pipe 10, mounting and feed-through connection (parts 75 and 76) to a reservoir container 50 or supply pipe is shown in FIG. 5. A heat conductive clamped sleeve 20 clamped by wire rings with twisted ends 90 surrounds the body 36 of the nipple valve 30. In one more-preferred embodiment, the clamped sleeve 20 also clamps a heat conductive ring 130 that makes good thermal contact with the metal annulus with exposed surface 32 at the lower end of the nipple valve seat. In one preferred embodiment, an insulation filled space 140 surrounds the nipple valve 30 and clamped sleeve 20. An outer shield 84 attached to mounting sleeve 80 provides protection from exterior ambient cold or hot air. In one preferred embodiment, the insulation has thermal conductivity less than 0.07 W/m-K, examples of such are polyethylene foam sheet, cork, other foamed plastics, aerogel, Perlite® (expanded volcanic glass), and fiber insulation materials.

An embodiment of an insulated, shielded, nipple valve device 5 with a heat pipe 10, mounting and feed-through connection (75-76) to a reservoir container 50 or supply pipe is shown in FIG. 6. A heat conductive clamped sleeve 20 surrounds the body 36 of the nipple valve 30. In one more-preferred embodiment, the clamped sleeve 20 also clamps a heat conductive ring 130 that makes good thermal contact with the metal annulus with exposed surface 32 at the lower end of the nipple valve seat. An air-gap 8 and reflective heat shield 110 surround the nipple valve 30 and clamped sleeve 20. An outer shield 84 attached to mounting sleeve 80 provides protection from exterior ambient cold or hot air. An annular insulating washer 128 made of cork or other insulating material with good durability in a moist environment centers the clamped sleeve 20 and nipple valve 30 in the opening, i.e., orifice, of the outer shield 84; it also reduces infiltration of ambient exterior air into the space between the clamped sleeve and the outer shield. In one preferred embodiment, the said orifice has a diameter that is at least one-half millimeter larger than the outer diameter of the clamped sleeve 20 so that the clamped sleeve and nipple valve are not in good thermal contact with the outer shield 84.

An embodiment of an insulated, shielded, nipple valve device 5 with a heat pipe 10, mounting and feed-through connection (75- 6) to a reservoir container 50 or supply pipe is shown in FIG. 7. A heat conductive clamped sleeve 20 surrounds the body 36 of the nipple valve 30. In one more-preferred embodiment, the clamped sleeve 20 also clamps a heat conductive ring 130 that makes good thermal contact with the metal annulus with exposed surface 32 at the lower end of the nipple valve seat. An air-gap 8 and reflective heat shield 110 surround the nipple valve 30 and clamped sleeve 20. An outer shield 84, attached to mounting sleeve 80, provides protection from exterior ambient cold or hot air. An annular insulating washer 128 made of cork or other insulating material with good durability in a moist environment centers the clamped sleeve 20 and nipple valve 30 in the opening, i.e., orifice, of the outer shield 84; it also reduces infiltration of ambient exterior air into the space between the clamped sleeve and the outer shield. In one preferred embodiment, the insulation has thermal conductivity less than 0.07 W/m-K, examples of such are polyethylene foam sheet, cork, other foamed plastics, aerogel, Perlite® (expanded volcanic glass), and fiber insulation materials. In one preferred embodiment, the said orifice has a diameter that is at least one-half millimeter larger than the outer diameter of the clamped sleeve 20 so that the clamped sleeve and nipple valve are not in good thermal contact with the outer shield 84.

Additionally, insulating material 140 such as polyethylene foam or the examples of such insulation listed above surrounds the reflective heat shield 110 and air-gap 8 within the outer shield 84.

An embodiment of an insulated, shielded, nipple valve device 5 with a heat pipe 20, mounting and feed-through connection (75-76) to a reservoir container 50 or supply pipe is shown in FIG. 8. A heat conductive clamped sleeve 20 surrounds the body 36 of the nipple valve 30. In one more-preferred embodiment, the clamped sleeve 20 also clamps a heat conductive ring 130 that makes good thermal contact with the metal annulus with exposed surface 32 at the lower end of the nipple valve seat. Insulating material such as polyethylene foam surrounds the clamped-sleeve and nipple valve. A reflective heat shield 110 surrounds the insulating material 140 or is incorporated into the insulating material and the heat shield or insulating material with incorporated heat shield defines the inner surface of an air-gap 8 within an outer shield 84, attached to mounting sleeve 80, which provides protection from exterior ambient cold or hot air. In one preferred embodiment, the insulation has thermal conductivity less than 0.07 W/m-K, examples of such are polyethylene foam sheet, cork, other foamed plastics, aerogel, Perlite® (expanded volcanic glass), and fiber insulation materials. Optionally, the insulating material 140 extends downward to the inner surface of the outer shield 84 to center the clamped sleeve 20 and nipple valve 30 in the opening of the outer shield, and to reduce infiltration of ambient exterior air into the space between the clamped sleeve and the outer shield. In one preferred embodiment, the said orifice has a diameter that is at least one-half millimeter larger than the outer diameter of the clamped sleeve 20 so that the clamped sleeve and nipple valve are not in good thermal contact with the outer shield 84.

An embodiment of a freeze-resistant nipple valve device 5 with a heat pipe 10, clamped sleeve 20, mounting and feed-through connection to a container or supply pipe wherein the feed-through comprises a rubber or elastomer grommet 83 is shown in FIG. 9. The heat conductive clamped sleeve surrounds the body of the nipple valve 36 and also clamps a heat conductive ring 130 that makes good thermal contact with the metal annulus with exposed surface 32 at the lower end of the nipple valve seat. Insulating material 140 such as polyethylene foam surrounds the clamped-sleeve and nipple valve. A reflective heat shield 110 surrounds the insulating material or is incorporated into the insulating material and the heat shield or insulating material with incorporated heat shield defines the inner surface of an air-gap 8 within an outer shield 84 that provides protection from exterior ambient cold or hot air. The outer shield is slipped onto a mounting sleeve 80 that surrounds the heat pipe 10. In the embodiment shown in the figure, the mounting sleeve 80 surrounds a portion of the insulating material 140. In one preferred embodiment, the outer shield 84 is made from a PVC pipe cap, and the mounting sleeve 81 is made from a PVC pipe plug. The mounting sleeve may be held onto the heat pipe 10 or insulating material 140 by adhesive or glue or one or more fastening devices, e.g., a screw, a spring, a clip, threads, etc. The outer shield may be fixed onto the mounting sleeve by a screw or set screw, which may be made of plastic or metal. Optionally, the insulating material extends downward to the inner surface of the outer shield to center the clamped sleeve and nipple valve in the opening of the outer shield, and to reduce infiltration of ambient exterior air into the space between the clamped sleeve and the outer shield. In the embodiment shown, the outer shield and/or mounting sleeve are in contact with the outer surface 200 of the reservoir container 50. Optionally, the spacing between the grommet 83 and the mounting sleeve 81 may be minimized or filled with insulation material to reduce heat loss from the heat pipe 10.

An embodiment of a freeze-resistant nipple valve device 5 with a heat pipe 10, clamped sleeve 20, mounting and feed-through connection to a container or supply pipe wherein the feed-through comprises a rubber or elastomer grommet 83 is shown in FIG. 10 as a vertical plane cross-section view. The heat conductive clamped sleeve 20 surrounds the body 36 of the nipple valve 30 and also clamps a heat conductive ring 130 that makes good thermal contact with the metal annulus with exposed surface 32 at the lower end of the nipple valve seat. Insulating material 140 such as polyethylene foam surrounds the clamped-sleeve and nipple valve. A reflective heat shield 110 surrounds the insulating material or is incorporated into the insulating material and the heat shield or insulating material with incorporated heat shield defines the inner surface of an air-gap 8 within an outer shield 84 that provides protection from exterior ambient cold or hot air. The outer shield is mounted on an annular part 81 that is affixed to the heat pipe. Optionally, the insulating material extends downward to the inner surface of the outer shield to center the clamped sleeve and nipple valve in the opening of the outer shield, and to reduce infiltration of ambient exterior air into the space between the clamped sleeve and the outer shield. Also optionally, a thin-walled tubular sleeve 87 surrounds the heat pipe 10 in the vicinity of the grommet so that additional radial compression of the grommet 83 results to improve the sealing of the grommet. In one preferred embodiment, the tubular sleeve comprises heat shrinkable tubing made of potable water compatible material, examples of which are PVC and Teflon®, and wherein the tubing is heat shrink fitted onto the heat pipe 10 for a water tight seal.

Also shown in FIG. 10 is an end view of the bottom of the freeze-resistance nipple device 5 to reveal the relation between the clamped sleeve 20, the conductive metal annulus 130, and the body of the nipple valve 36. In one preferred embodiment, the clamped sleeve has an axial 22 slot so that the clamping means 90 can compress the sleeve, and the conductive metal annulus 130 has an axial slot 132 so that it can be compressed by the clamped sleeve 20 onto the annular metal part at the end of the nipple valve 30. In one preferred embodiment, the two slots 22 and 132 are oriented so that they are not at the same azimuthal position relative to the axis of the nipple valve 30.

The embodiment shown in FIG. 10 as a vertical plane cross-section view is also shown in FIG. 11 with two views of a horizontal cross-section. The cross-section view on the lower left is shown in the same scale as the vertical plane cross-section view in the upper left. The view to the right is the horizontal plane cross-section view magnified 2×. In this view, the internal 'weight', e.g., a stainless steel sphere, which is found in some nipple valves, is seen. Surrounding this is an annular space within the stainless steel wall 33 of annular part with exposed face 32 that is within the nipple valve body 36. The clamped sleeve 20 surrounds the nipple valve body. A vertical slot 22 in the clamped sleeve 20 is seen. In one preferred embodiment, the width of this slot after compression of the clamped sleeve 20 by the clamping means, e.g., one or more wire loops with twisted ends 90 (shown as a dashed hidden line in the horizontal plane cross-section views), is between 0.005 inches and about 0.1 inches. In another preferred embodiment, the clamped sleeve is a continuous thin-walled cylinder with an axially oriented boss or folds that allow the clamped sleeve to be compressed to make a good thermal conductance contact with the nipple valve body.

It is to be understood, that the configuration of the thermal insulation and reflective heat shield(s) in the freeze-resistance nipple device 5 may be any of those shown in FIGS. 1-11 or such as may be derivative to the teachings herein where the feed-through comprises two parts, a grommet, a half-grommet, a compression sleeve, a threaded-joint seal, or other means known in the art. Further, the thermal insulation may comprise plastic foam, bubble wrap, cork, aerogel, composite containing aerogel, expanded volcanic rock, e.g., the commercial product known as, Perlite™, glass or plastic thin-walled micro-spheres, a vacuum insulation sleeve comprising one or more reflective heat shields and an annular vacuum space, or other high performance, low thermal conductance materials. The outer shield 84 may be made of insulating material so that the insulation 140 and outer shield are the same component. The outer shield 84 and thermal insulation 140 may be individually or together molded onto the sleeve 20. The reflective shield 110 may be a separate component, or it may be incorporated into the thermal insulation material, and example of such being a commercial product known as Reflectix®.

Shown in FIG. 12 is an elevation view of a low heat-loss rate waterer with an integrated, shielded, freeze-resistant nipple valve device 5 with a heat pipe, clamped sleeve, mounting and feed-through connection, and outer shield. In this embodiment, the outer enclosure is a plastic bucket 300 with a wire bail handle comprising parts 302 and 304 and a length of chain 306 that provide a means of mounting the waterer by hanging. The reservoir container 50 is a plastic bucket that is removable and set inside the outer enclosure. Both the outer enclosure and the reservoir container have removable lids 310 and 360. Thermal insulation comprising one or more annular layers, e.g., 405 and 410 line the interior surface of the outer enclosure 300 and one or more reflective heat shields, e.g., 415, 432, and 448 line most of the surfaces of the thermal insulation, e.g., 410, 430, and 444, which are adjacent to spaces between the outer enclosure and the reservoir container. One or more layers of thermal insulation 430 cover the bottom interior of the outer enclosure 300. One or more layers of thermal insulation, e.g., 440, 442, and 440 cover the lid of the reservoir container. In one preferred embodiment, at least one layer extends to cover the annular space 216 between the thermal insulation 410 and the wall of the reservoir container 350. Insulating spacers 433 may provide support between thermal insulation 430 and reservoir container 50 to provide for a greater vertical thickness of air gap 214. The outer enclosure and reservoir container have orifices so that an electrical immersion heater, an example of which is an immersible aquarium heater, can be placed inside the reservoir container and its power cord passed through orifices, for example but not as a limitation, a notch 472 in lid 310 that may align with a notch in outer enclosure 300 and an orifice with a cap 470, so that connection to an electrical power source that is external to the waterer can be made. Optionally, the lid of the reservoir container 360 may have an orifice with a removable plug 468 so that the reservoir container may be filled, or the water level or temperature can be checked without removing the reservoir container from the outer enclosure.

Figure 13:
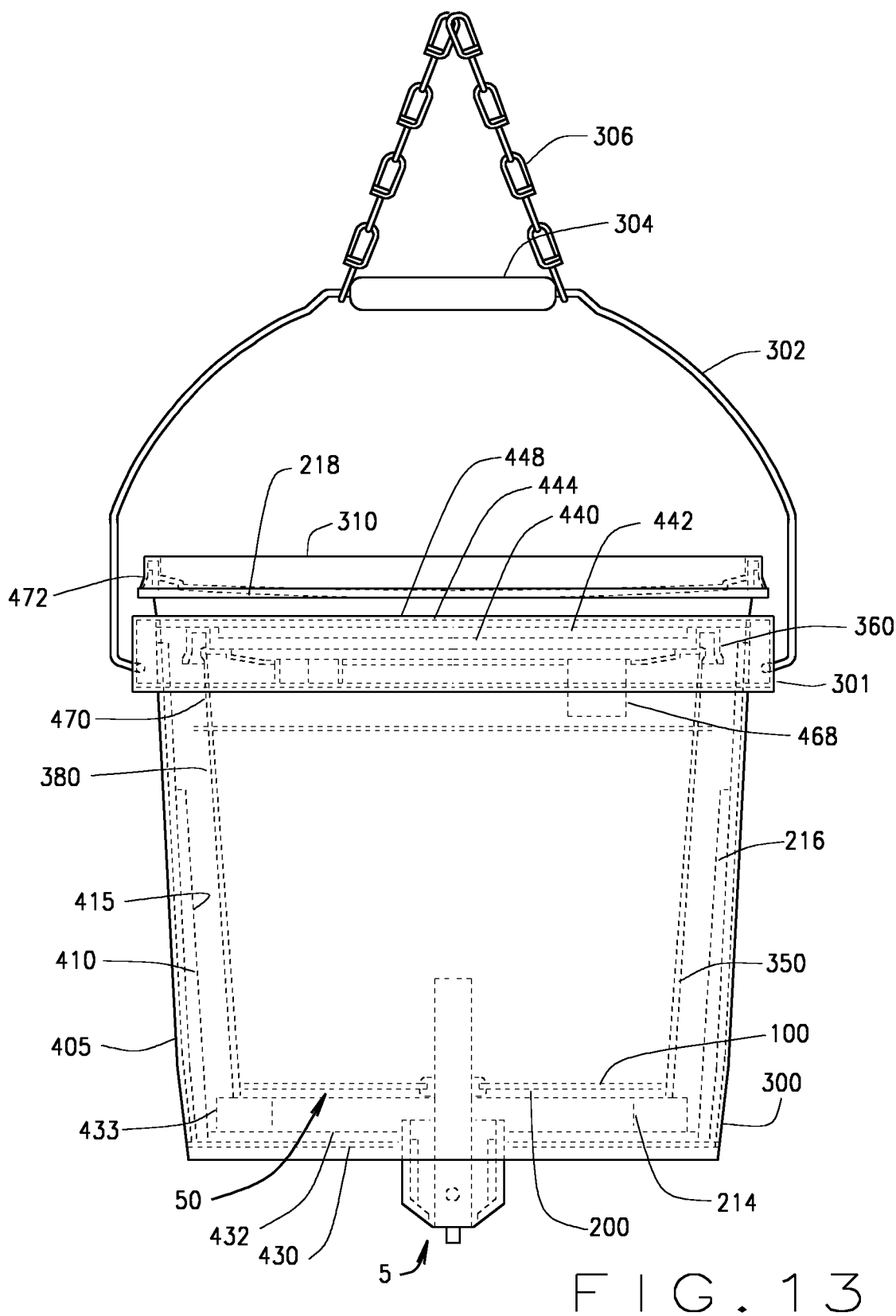
FIG. 13 describes a side view of a reveal of an embodiment of a low heat-loss rate waterer with an integrated, shielded, freeze-resistant nipple valve device with a heat pipe, a sleeve, a mounting and feed-through connection, and an outer shield, wherein the principal interior parts are shown as dashed lines.

Shown in FIG. 13 is a cross-section view of a low heat-loss rate waterer with an integrated, shielded, freeze-resistant nipple valve device with a heat pipe, clamped sleeve, mounting and feed-through connection, and outer shield. In this embodiment, the outer enclosure is a plastic bucket with a wire bail handle and a length of chain that provide a means of mounting the waterer by hanging. The reservoir container is a plastic bucket that is removable and set inside the outer enclosure. Both the outer enclosure and the reservoir container have removable lids. Insulation and one or more reflective heat shields line most of the inner surface of the outer enclosure. One or more layers of insulation cover the reservoir container. The outer enclosure and reservoir container have orifices so that an electrical immersion heater, an example of which is an immersible aquarium heater, can be placed inside the reservoir container and its power cord passed through orifices so that connection to an electrical power source that is external to the waterer can be made. Optionally, the lid of the reservoir container may have an orifice with a removable plug so that the reservoir container may be filled, or the water level or temperature can be checked without removing the reservoir container from the outer enclosure.

Figure 14:
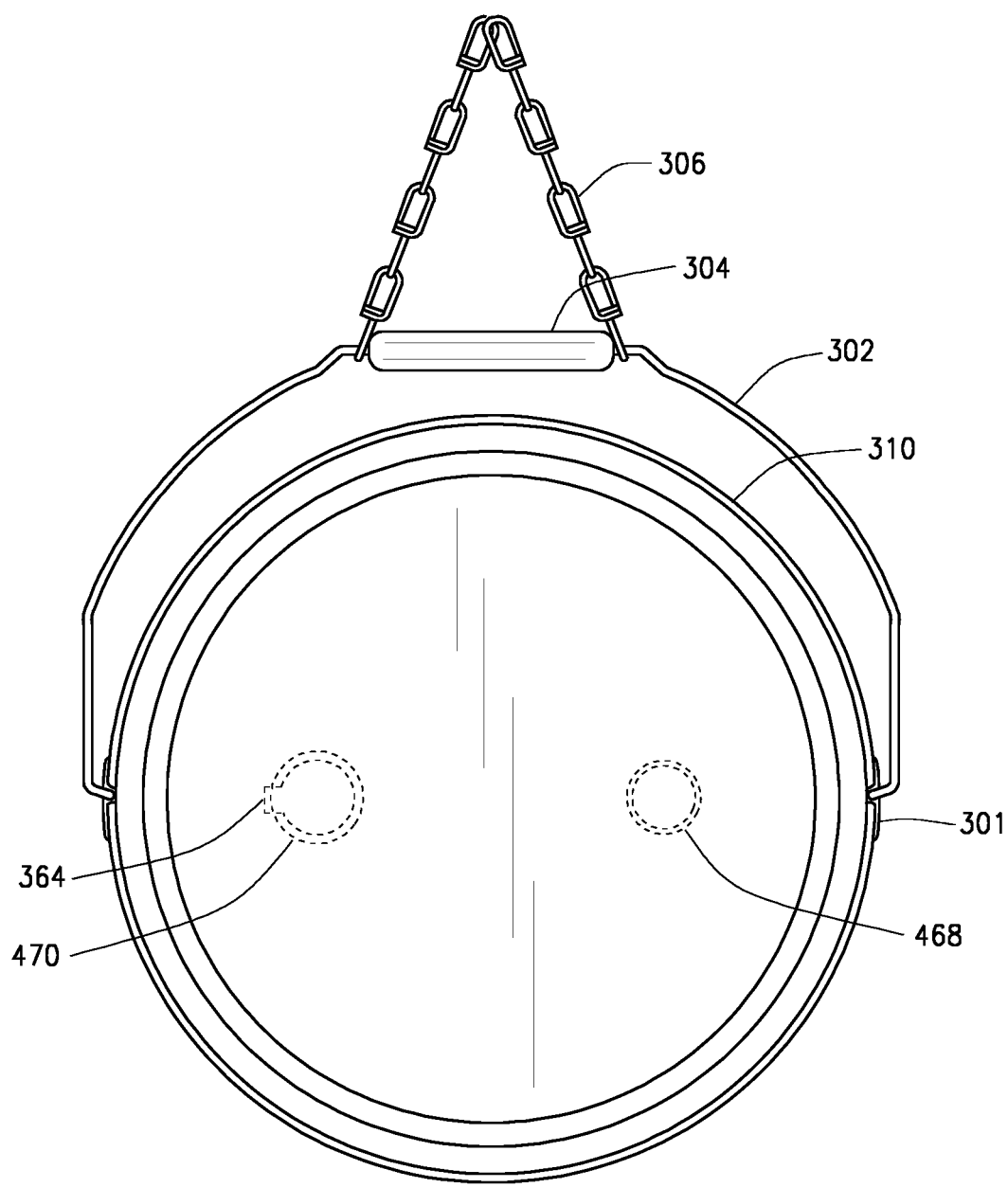
FIG. 14 describes a top view of an embodiment of a low heat-loss rate waterer with an integrated, shielded, freeze-resistant nipple valve device with a heat pipe, a sleeve, a mounting and feed-through connection, and an outer shield.

Shown in FIG. 14 is a top plan view of a low heat-loss rate waterer with an integrated, shielded, freeze-resistant nipple valve device with a heat pipe, clamped sleeve, mounting and feed-through connection, and outer shield. In this view, the wire bail handle comprising parts 302 and 304 and mounting chain 306 are shown rotated 90 degrees from the vertical. The wire bail is attached to protrusions 301 on the wall of the outer enclosure 300. Also shown are the heater power cord orifice 364 that has a notch and a cap 470 and the removable plug 468 and its respective orifice in the lid of the reservoir container; these orifices being shown as 'hidden' features denoted by dashed lines.

Figure 15:
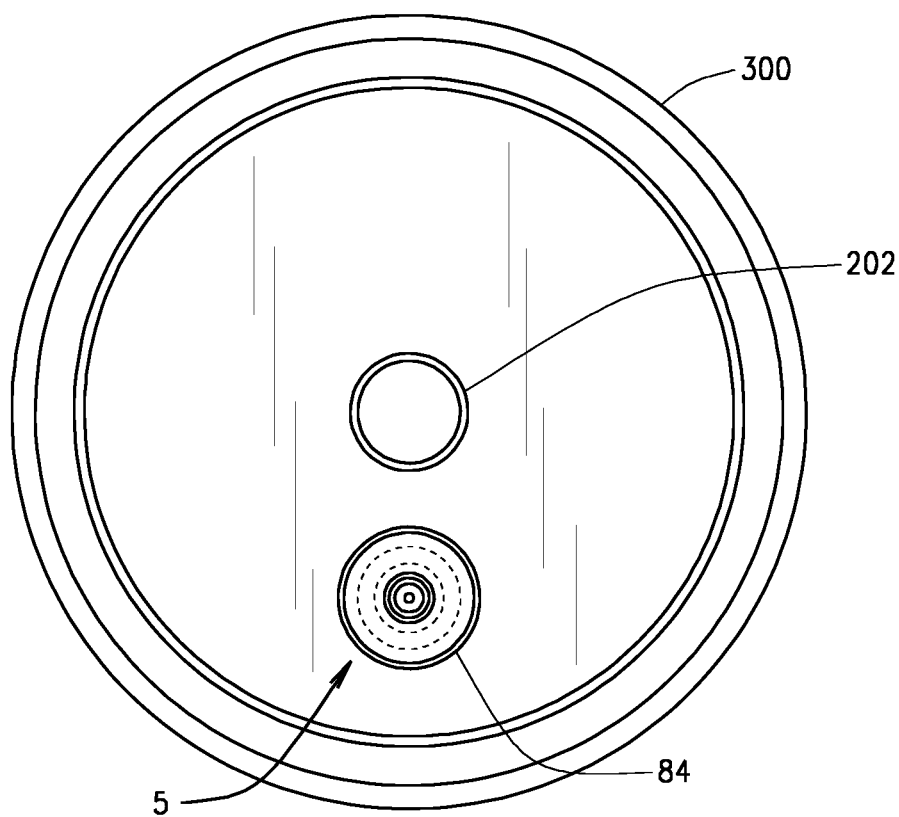
FIG. 15 describes a bottom view of an embodiment of a low heat-loss rate waterer with an integrated, shielded, freeze-resistant nipple valve device 5 with a heat pipe, a sleeve, a mounting and feed-through connection, and an outer shield 84.

Shown in FIG. 15 is a bottom plan view of a low heat-loss rate waterer with an integrated, shielded, freeze-resistant nipple valve device 5 with a heat pipe, clamped sleeve, mounting and feed-through connection, and outer shield 84. Also shown is a raised annulus 202 that is a common feature of commercially available plastic buckets that may serve as the outer enclosure 300. Not shown is the wire bail handle that is also a common feature of such buckets.

Figure 16:
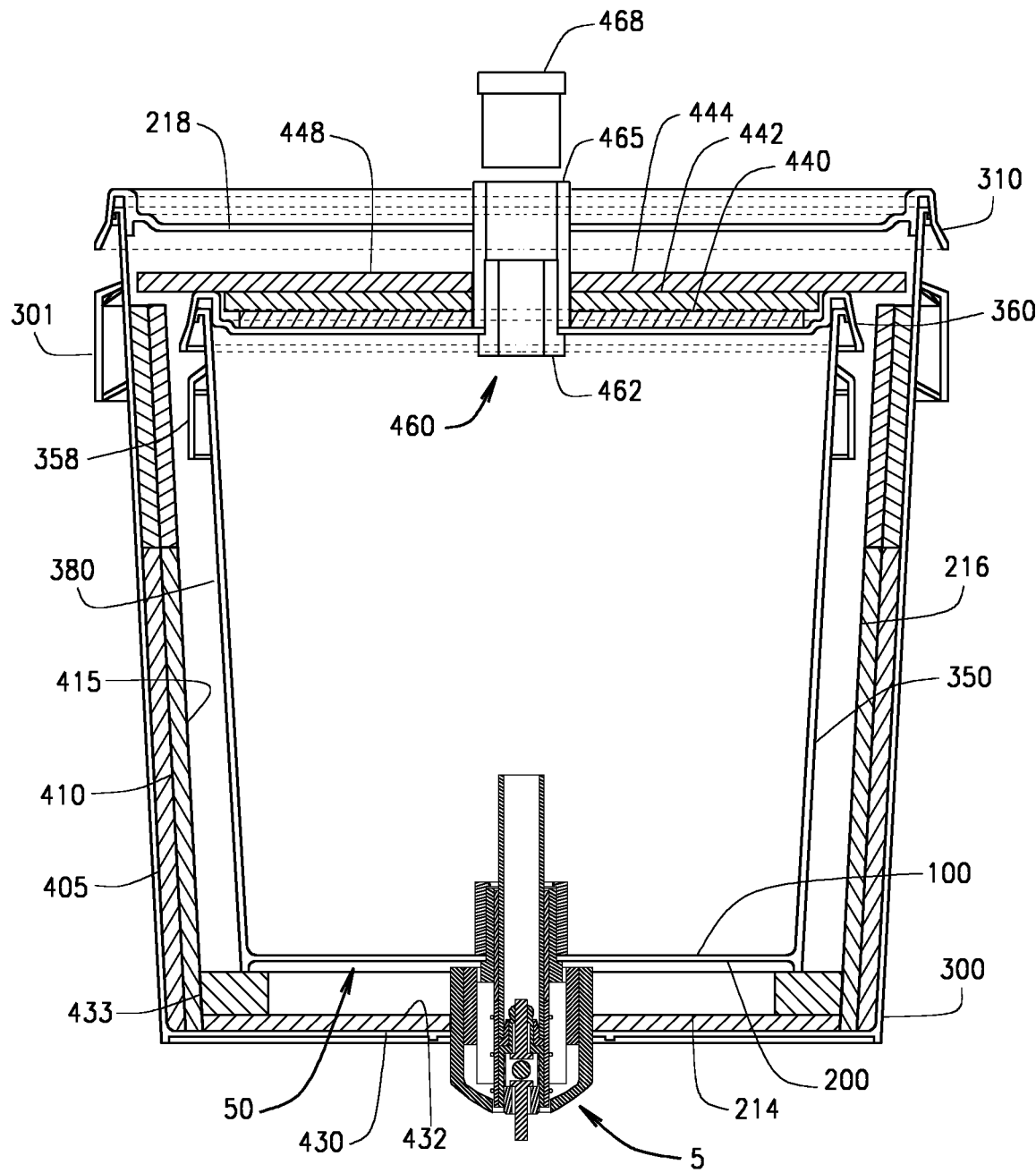
FIG. 16 illustrates a sectional view of an embodiment of a low heat-loss rate waterer with an integrated insulated, shielded, freeze-resistant nipple valve device with a heat pipe, a sleeve, a mounting and feed-through connection, and an outer shield.

A low heat-loss rate waterer with an integrated insulated, shielded, nipple valve device 5 with a heat pipe, mounting and feed-through connection to a reservoir container 50 is shown in FIG. 16. In the embodiment shown, an optional feed-through is provided that is mounted on the lid of the reservoir container and a plugged or capped tubulation that penetrates an orifice in the lid of the outer enclosure so that the reservoir container may be filled, or the water level or temperature checked without removing the lids of the outer enclosure or the reservoir container.

In one preferred embodiment, container 50 is a 'food-grade' plastic bucket with thin wall 350 and a removable lid 360. The plastic bucket may optionally have reinforcements 358 for the attachment of a bail handle. The reservoir container 50 is removable and mounted inside an outer bucket 300 so that air spaces 214, 216, and 218 are defined below, on the side, and above container 50. In one preferred embodiment, outer bucket 300 is a 'food-grade' plastic bucket with a removable lid 310. In one more-preferred embodiment, the container 50, outer bucket 300, and lids 360 and 310 are made of high density polyethylene (HDPE) and are 'food-grade'.

The reservoir container 50 is mounted on low thermal conductance supports 433. In one preferred embodiment, these supports may comprise an annular ring or pieces thereof or conveniently shaped slabs of insulation with thermal conductivity less than about 0.2 W/m-K, examples of which are plastic foam insulation such as Styrofoam sheet, cork, or fiber materials. In another preferred embodiment, the supports 433 are two or more thin walled rigid plastic shapes, an example of which is a cylinder of PVC pipe that is attached, for example by a screw, to the bottom wall of outer bucket 300 and may be optionally covered in reflective heat shield film or foil that is attached by adhesive. In one preferred embodiment, the container 50 rests on the supports 433. Optional low thermal conductance spacers may be situated in the air gap space 216 to locate reservoir container 50 at a desired radial position within the outer bucket 300 may be attached to either the reservoir container or the outer bucket.

The use of insulation material to partially fill the spaces between the reservoir container 50 and the outer bucket 300 in addition to the air gaps 214, 216, and 218 results in smaller heat flux from the reservoir container to the exterior of the outer bucket. In one preferred embodiment, one or more layers of insulation material 405, 410 with thermal conductivity less than about 0.07 W/m-K covers most of the interior side wall of the outer bucket 300. In one more-preferred embodiment, one or more layers of insulation material 440, 442, 444 cover the top lid 360 of the reservoir container 50. In one still more preferred embodiment, a layer of insulation material 430 covers the bottom of the interior of outer bucket 300.

The thicknesses of the insulation layers and the air gap spaces are selected to obtain a sufficiently small heat flux loss from the reservoir container. In one preferred embodiment, the reservoir container 50 is a 2-gallon bucket and the outer bucket 300 is a 5-gallon bucket. In another preferred embodiment, the reservoir container 50 is a one-gallon bucket and the outer bucket 300 is a 2-gallon bucket. Such buckets are available as 'food grade' HDPE buckets. In one preferred embodiment, the layers of insulation material inside the side wall of the outer bucket comprise a thickness in the range of about 0.75 to about 1.5 cm. This insulation may comprise one or more layers. In FIG. 12, as one preferred embodiment, two layers, each of about 0.5 cm thickness are shown. Suitable insulation materials have been described above. In one more-preferred embodiment, the insulation material comprises polyethylene foam sheets, each of thickness about 0.5 cm per layer. In one preferred embodiment, the insulation above the lid 360 of the reservoir container comprises a thickness in the range of about 1.0 cm to about 2 cm and may comprise one or more layers of insulation material. In one more-preferred embodiment, the insulation material comprises polyethylene foam sheets, each of thickness about 0.5 cm per layer. In one preferred embodiment, at least one layer of insulation material is below the reservoir container 50 within the outer bucket 300 and comprises a thickness in the range of about 0.5 cm to about 1.0 cm. The insulation material may be inserted into the outer bucket and not fixed to the outer bucket, or it may be attached by fasteners or low conductivity material, an example of such being plastic screws, for example nylon screws, or it may be attached by adhesive. In one preferred embodiment, the adhesive is a spray adhesive.

In one preferred embodiment, a heat reflective shield is located on one of the surfaces defining each of the air gap spaces 214, 216, and 218. The reflective heat shield may be located on the surfaces of the air gap spaces that are closest to the reservoir bucket 50 or to the outer bucket 300. In one preferred embodiment, a reflective heat shield 415 is attached to the inner surface of the side wall insulation 410, a reflective heat shield 432 is attached to the inner surface of the bottom insulation layer 430, and a reflective heat shield 448 is attached to the outer surface of the top insulation layer 448. In one preferred embodiment, the foil or film is aluminum with an emissivity less than 0.10, i.e., $\varepsilon \leq 0.10$. In one preferred embodiment, the aluminum foil has a thickness in the range of 0.0005 to 0.003 inches (about 12 to 75 micrometers). In one more-preferred embodiment, the reflective heat shields 415, 432, and 448 comprise aluminized polyester, such as aluminized Mylar®, in which the plastic film thickness is in the range of 0.001 to 0.010 inches (about 25 to 250 micrometers), and the metallization film has a thickness in the range of about 0.3 to 25 micrometers.

In another more preferred embodiment, one or more reflective heat shields are incorporated into the thermal insulation. A commercial product comprising such is known as Reflectix®. One or more layers of such insulation having incorporated heat shield(s) may comprise the thermal insulation elements 430, 405, 410, 440, 442, 444, and 433 and reflective heat shield elements 432, 415, and 448 within the outer enclosure. Such insulation having incorporated reflective heat shields may also comprise the thermal insulation 140 and heat shield 110 within the freeze-resistant nipple device 5.

Optionally, a fill tube assembly 460 may be provided so that the reservoir container 50 can be filled without removal of the lids 360 and 310. Such a fill tube assembly comprises a feed-through at the reservoir container lid 360, and may comprise two parts, a male part 462 and a female part 465. In one preferred embodiment, the male part 462 is a Schedule 40 PVC pipe plug that has been drilled to provide a through hole, and the female part 465 is a Schedule 40 PVC pipe coupling. In one more-preferred embodiment, the male part 462 and female part 465 are of the slip fit type and are cemented together to firmly capture the lid 360, and a removable slip type Schedule 40 pipe plug is used to close the feed-through. Optionally, the feed-through may be sealed to the lid by RTV silicone cement, or by an intervening gasket, or by an elastomer grommet, or any of other common methods known in the art.

To avoid a reduced pressure head in the interior 380 of the reservoir container 50 when lid 360 has an air tight seal to the container 50, a pressure relief hole in lid 360 or in the side wall 350 of the reservoir container is necessary. Such a pressure relief hole may comprise a hole in lid 360, which may also be used as a feed-through hole for a power cord for an immersible heater, for example of the aquarium type. A non-air-tight cap may be used to 'plug' the hole to keep contamination and particulate out of the reservoir container. The pressure relief hole may also comprise one or more holes for attaching spacers to wall 350. Further, if the lid 310 forms an air-tight seal to outer bucket 300, then a pressure relief hole in lid 310 or outer bucket 300 is necessary. Such a pressure relief hole may comprise the hole in the bottom of the outer bucket through which the nipple device 5 protrudes, or it may comprise the hole in the lid 310 through which the fill tube assembly 460 protrudes, or it may be another hole in lid 310 through which a heater power cord passes and which may have a non-air-tight 'plug' to keep contamination and particulate out of the outer bucket.

In one preferred embodiment, the reservoir container 50 may have protrusions 358 that are found on some plastic buckets for mounting a wire bail handle, and a wire bail handle is not used and a cord or string or similar means is attached to the protrusions to provide a means of lifting the reservoir container out of and placing the reservoir container into the outer enclosure.

Mounting the waterer may be accomplished by any of several means that places the exposed surface 32 of the nipple valve at a height above the ground or floor that is convenient for the bird's actuation and use of the nipple valve. Examples of means of mounting include, but not as limitations, hanging from a hook, a shepherd's crook, a cable, a chain, fence posts, placement on a shelf, on stacked objects, on a bent rod support such as commonly used for supporting a potted plant, and by attaching support members or legs to the outer enclosure 300. In one preferred embodiment, the waterer is suspended by a wire bail handle comprising 302 and 304, which is attached to outer bucket 300 at protrusion 301. Such wire handles are common features of HDPE 'food grade' buckets. Rope, cord, chain, or other means may also be used to suspend the waterer. In one more-preferred embodiment, the waterer is suspended by a wire bail handle comprising 302 and 304 and a chain 306. In one preferred embodiment, the waterer is mounted on a post that is partially embedded or driven into the ground or that is attached to a structure. An example of such a post is a metal u-tube fence post that is commercially available. A mounting support, such as a bolt may be attached to the post so that the waterer can sit on the protruding bolt of a support piece attached thereto. A chain, string, cord, rope, or the like may be used to hold the waterer against the vertical post. For posts that are not sufficiently stiff to avoid unacceptable torsion motion, one or more additional posts may be used to provide torsion stability. In one preferred embodiment, the waterer is placed on a shelf or stand that places the exposed surface 32 of the nipple valve at a desired height.

The heat flux from the reservoir container may be estimated by the formalism of Eqns. 1-13. With an initial temperature $T_{init}$, it is expected that the temperature in the reservoir $T_r$ will have a time dependence given by $$T_r = T_0 + \frac{P_h}{b} + \left[T_{init} - T_0 - \frac{P_h}{b}\right]\exp\left\{\frac{-t}{\tau_0}\right\}, \quad (17)$$

where $P_h$ is the power of a heater in the reservoir container, $$b = \frac{dQ_{total}}{d(T_r - T_0)},$$

is the slope of the heat loss as a function of temperature difference between the reservoir container interior and the exterior ambient temperature, and $\tau_0 = \rho C_p V/b$ is the characteristic temperature decay time and where $\rho$ is the density of water, $C_p$ is the specific heat of water, and V is the volume of water in the reservoir container. The parameter b can be calculated by a fit of a linear function to the heat loss $Q_{total} = Q_{side} + Q_{top} + Q_{bottom} + Q_{nipple}$ where each of first three of these terms is the result of convective and radiative heat transfer in series with net transfer that is mainly by conduction through the insulation layers. The heat loss at the nipple assembly $Q_{nipple}$, has been described above. In a conservative estimate of $T_r$, the exterior surface of the outer bucket may be treated as being at the exterior ambient temperature $T_0$.

Figure 17:
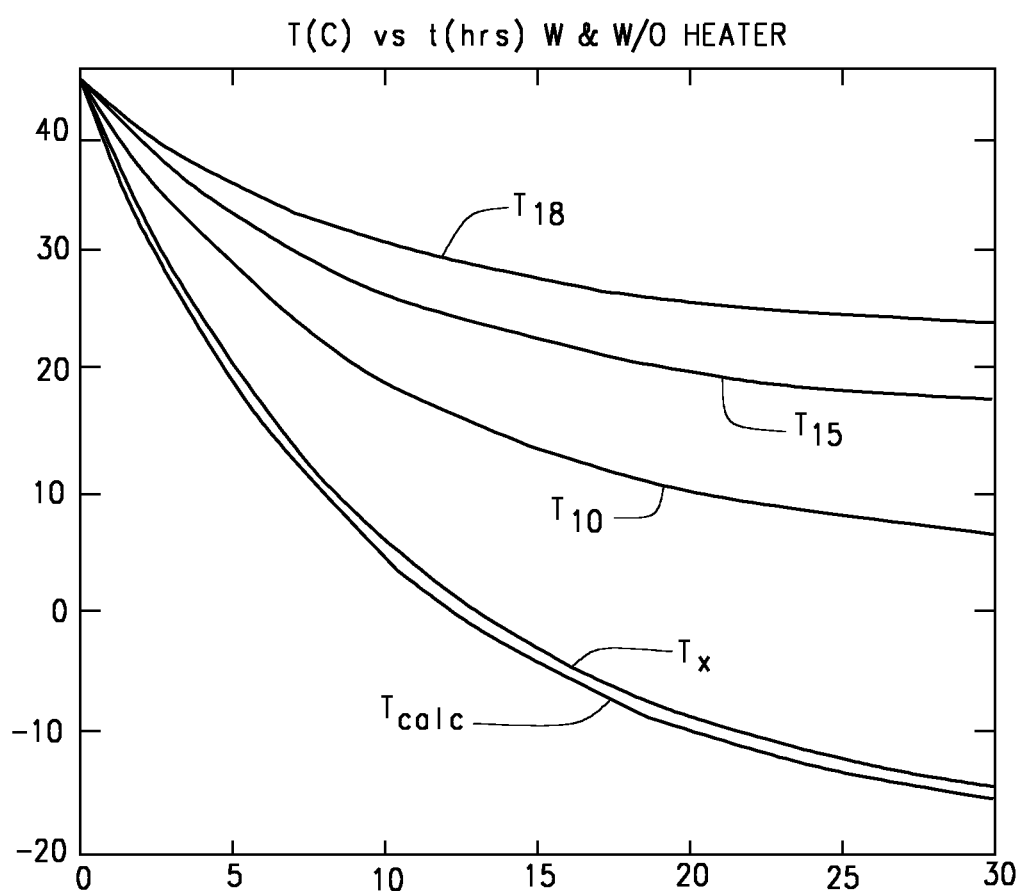
FIG. 17 illustrates a chart of the calculated water temperature T (i.e., the reservoir temperature inside of a 2 gallon outer bucket embodiment of the waterer shown in FIGS. 12-15) as a function of time, t where the upper three curves, T vs. t are shown with a heater inside the inner bucket at various power levels and where the lower two curves, T vs t are shown without a heater inside the inner bucket at calculated and experimental power levels.

Shown in FIG. 17 are the calculated water temperature T (° C.), i.e., the reservoir temperature (denoted as $T_r$ in the above equations), as a function of time, t (hours), for an embodiment comprising a one gallon reservoir container 50 that is enclosed by a 2 gallon outer bucket as the outer enclosure 300 as in the embodiments of the waterer shown in FIGS. 12-15. Two cases are compared, one with an internal immersion heater in the interior 380 of the reservoir container 50, the other without a heater. In both cases, the initial temperature $T = T_{init} = 43.24°$ C. (110° F.); the water volume is 1 gallon (3.8 liters); the exterior ambient temperature is $T_0 = -17.9°$ C. (0° F.), and the wind speed $v_w$ is about 8 mph. For the case with an internal immersion heater, three curves are shown in the figure. The uppermost corresponds to a heater power of $P_h = 18$W. The second curve from the top corresponds to $P_h = 15$ W; the next lower curve, third curve from the top, corresponds to $P_h = 10$ W, which may be considered to be at the upper end of the range of low power heaters that is equal to about 10 W/gallon of reservoir. In these calculated curves, the heater power is turned on at t=0, and the curves asymptote to a steady state with water temperature $T = 23.3°$ C. (74° F.), 16.4° C. (62° F.), 5.0° C. (41° F.), which correspond to $P_h = 18$, 15, and 10 W, respectively. In experiments with an immersed heater in winter conditions comparable to the calculations, e.g., daytime high ambient temperature $T_0$ of about $-18°$ C. (0° F.) and a daily low (early morning) temperature of $T_0 = -21.7°$ C. ($-7°$ F.) and wind speed $v_w$ of about 23 mph with gusts to 31 mph, the water temperature asymptotes to about 23° C. (about 74° F.). In this case, because the heater is an aquarium heater and has an internal thermostat that has a fixed set point of about 25.4° C. (78° F.), the water temperature is experimentally observed to decay according to the unheated case until the set point temperature is reached, then the water temperature slowly cools to the asymptotic quasi-steady state of about 23° C. (about 74° F.) for which it is presumed that the heating power, $P_h = 16.4$ W (which may be considered to be in the range of medium power heaters), produced by the heater equals the power lost to the environment by the waterer. The experimental results are in reasonable agreement with the calculations in light of the approximations of the model and the non-steady ambient conditions. It appears that the variance of power loss between model and experiment is <10%.

In the case without an internal immersion heater, the calculated reservoir water temperature is shown as the lowest curve (dot-dashed) in the figure, and a curve fit to the experimental data is shown as a curve (dot-dashed) slightly above the bottom curve. Typically, the experimental curve is within a few degrees of the calculation. It is seen that after a time t of about 9.5-10 hours, the experimentally measured water temperature T is between 5° C. (41° F.) and about 11°

C. (51° F.); the temperature depending on the wind speed during the cooling time. The T=11° C. temperature resulted in calm conditions (wind nearly 0 mph), an ambient temperature $T_0$ of about 9° C. 48.5° F.) results with wind speed $v_w$ about 9 mph, and the ambient temperature of 5° C. results with wind speed about 23 mph with gusts as great as 31 mph. In the latter conditions (windy), the nipple valve 30 is found to freeze when the reservoir water temperature is less than or equal to about 10° C. In contrast, the nipple is not frozen and provides liquid water when the reservoir water temperature is ≥6.5° C. with wind speed about 6-9 mph, and water temperature ≥about 5° C. in lighter wind.

Thus, it is found that such a waterer can deliver liquid water via the freeze-resistant nipple device 5 for a time $t_f$ of more than about 10 hours after an initial fill with warm (43° C., 110° F.) water in moderately windy ambient conditions with temperature about −18° C. (0° F.). With the use of a wind shield or placement in a lee wind condition to reduce the wind exposure of the exposed nipple surface 32, it may be reasonably expected that liquid water can be provided for more than 12 hours. In the case wherein an immersion heater is used, provision of warm liquid water has been demonstrated in ambient conditions of T=−21.7° F.) (−7° F.) and wind speed of about 23 mph with gusts to 31 mph with $P_h$ of about 16.5 W Calculations show that with $P_h$ of about 10 W (which corresponds to 10 W/gallon for the one gallon reservoir of this example), a sufficient reservoir water temperature (e.g., about 10° F.) is maintained in extreme cold conditions (<−18° C. (0° F.) and low wind speed or in a wind protected situation) so that in spite of the temperature drop along the heat pipe 10 and clamped sleeve 20 to the exposed surface 32 of the nipple, liquid water is provided by the nipple valve.

In further tests of the waterer, it is found that without an immersion heater, the waterer can be filled with warm water less than 105 degrees F. and will provide liquid water via the freeze-resistant nipple valve assembly for at least 8 hours when the waterer is used in an ambient outside temperature of greater than or equal to 0 degrees F. The waterer with an immersion heater of about 15 to 17 Watts (which corresponds to 15 to 17 W/gallon for the one gallon reservoir of this example) can maintain water in the container at a temperature in the range of 50 to 80 degrees F., that is about 10° C. to about 27° C., and deliver water at the exposed face of the nipple valve(s) at a temperature greater than 40 degrees F. when the waterer is used in an ambient outside temperature greater than −10 degrees F. The waterer can be filled with cool water in the range of 32 to 40 degrees F. and will provide water with temperature less than 90 degrees F. via the freeze-resistant nipple valve assembly for at least 8 hours when the waterer is used in an ambient outside temperature of less than or equal to 110 degrees F.

In another preferred embodiment wherein the reservoir container 50 is a 2 gallon bucket and the outer bucket 300 is a 5 gallon bucket, the calculation predicts in the case where $P_h$=0 (no heater) and ambient conditions at temperature equal to −18° C. (0° F.) and wind ≤about 8 mph, that $T_r$ decays to 0° C. in about $t_f$=10 hours. In the case with an immersion heater with $P_h$=25 W, $T_r$ is about 12° C. after about 24 hours.

Other embodiments may be obtained in light of the teachings herein. For example, the heat pipe 10 may be extended so as to comprise the clamped sleeve and to replace the plastic or stainless steel body, in whole or in part, and be clamped onto or press fit onto the annulus with exposed surface 32 so to conduct heat to the valve seat. In another embodiment, the heat pipe 10 may extend and be clamped or press fit onto a thin polymer layer on the annulus with exposed surface 32. In still another embodiment, the heat pipe 10 may be extended and be integral with the annulus with exposed surface 32.

Figure 18:
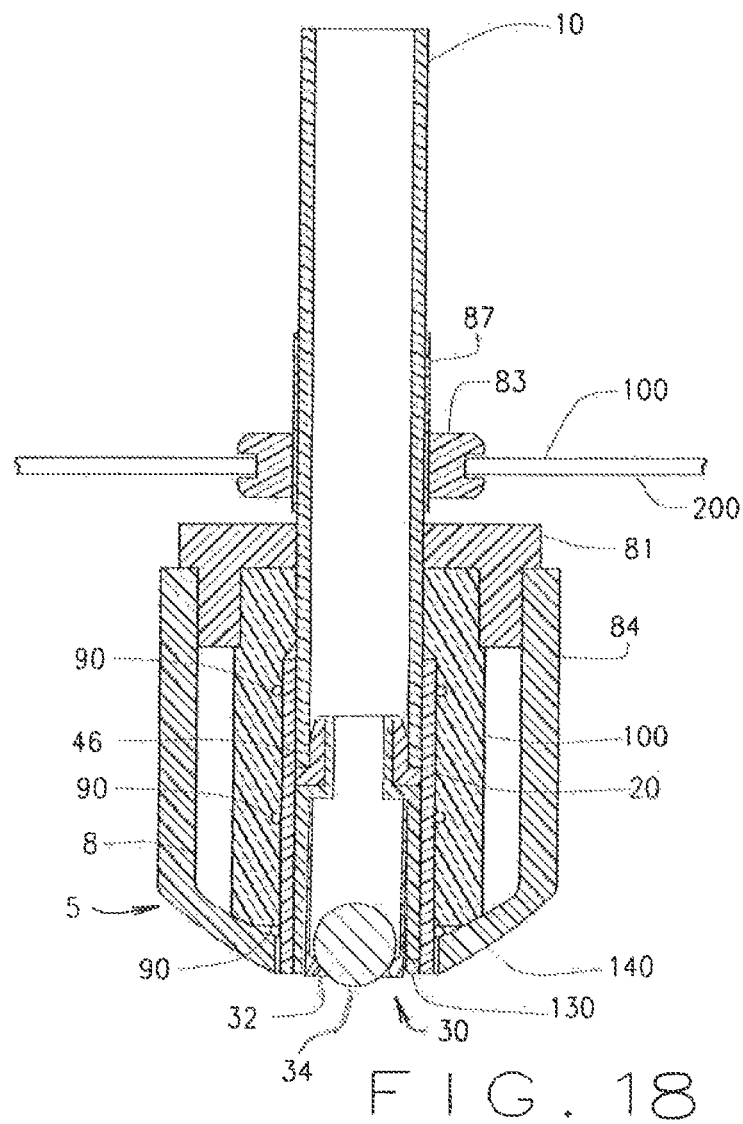
FIG. 18 provides a sectional view on a vertical plane of an alternate embodiment of a freeze-resistant nipple valve device with an actuator closed by a ball.

FIG. 18 provides a sectional view on a vertical plane of an alternate embodiment of a freeze-resistant nipple valve device with an actuator closed by a ball. The nipple valve 30 has its exposed surface 32 slightly below the outer shield 84 as shown. The exposed surface has a slightly beveled interior, here shown in cross section, the receives a ball 34 that serves as an actuator. An animal, bird, or poultry presses upon the ball and lifts it upwardly so that water or other liquid passes the ball for the animal, bird, or poultry to drink. When the animal, bird, or poultry leaves the ball, the pressure of water or other liquid within the heat pipe 10 presses the ball against the exposed surface, ceasing flow of water or other liquid from the invention.

The preceding description refers to various embodiments. Within those embodiments, the Applicants foresee a watertight seal made from an elastomer grommet, as at 83. The elastomer grommet includes one made of silicone rubber or other elastomer approved by the US Food and Drug Administration for contact with food and water. In a further alternate embodiment, the container as at 50, or outer bucket as at 300, has a lid as at 310, 360, proximate its handle, that is, generally opposite an installed nipple valve device, 30. The lid in this embodiment has an opening or tubular protrusion through which a user may fill the container. In a further alternate embodiment, the invention has its container, or outer bucket, constructed of high density polyethylene, HDPE, approved by the US Food and Drug Administration as a material safe for food contact and all water contact surfaces of the invention have a construction of materials suitable for potable water.

Access by the animals, e.g., birds or small mammals, to the nipple or ball actuator of the waterer valve may be limited by the situation of the mounting of the system using the freeze-resistant watering nipple device. Typically, nipple valves contain weights or springs to improve the effectiveness of the seal and reduce leakage when the valve is not being actuated by an animal or bird. Many such valves are intended to be mounted in with their longitudinal axis being vertical or approximately so. Ball valves are often intended to be mounted at an angle to the vertical that is can range from zero to about 60 degrees; the selection of the angle is often dependent on the type of animal for which the waterer is intended as suitable drinking posture varies by type of animal.

The number of birds or small mammals that can be served daily by a waterer depends, in part, on the reservoir or supply capacity, access of an individual animal to a watering valve, the size of the animals, and the behavior of watering individuals within a group. Typically, over the course of a day, if the reservoir or supply capacity is adequate, one nipple valve or ball valve can provide water to up to 20 birds or about a dozen or so small mammals if the animals have adequate access to the watering valve.

Embodiments that can provide better access include one or more bends in the heat pipe and surrounding outer shield containing insulation. For bucket-type waters having a reservoir container within an outer bucket wherein the reservoir container is not removable, and for waterers wherein the reservoir container is integral with the insulation and outer surface, and for waterers wherein the reservoir container is not generally removed for filling, one or more freeze resistant watering nipple devices may be mounted in the bottom or on the side of the waterer with the heat pipe of each nipple device penetrating the insulation surrounding the reservoir container. However, such embodiments generally comprise a heat pipe of greater length and the valve seat and exposed exit surface of the nipple or ball valve will be further from the reservoir container or supply pipe than configurations wherein the freeze-resistant watering nipple device is attached to the bottom of a reservoir container or supply pipe. A bucket-type waterer having an internal reservoir may also be called a thermally insulated container.

Watering systems wherein the supply pipe comprises a manifold with more than one nipple valve device commonly have configurations in which the nipple valves are mounted vertically and perpendicular to the longitudinal axis of the manifold pipe. The nipple valve may be attached directly to the manifold pipe, or it may be attached to a pipe or tube connecting it to the manifold pipe. The nipple devices are commonly attached via an elastomer compression sealed joint or a threaded joint that may also have sealing compound or sealing tape, e.g., polytetrafluoroethylene PTFE thread sealing tape. In systems with watering ball valves, the valves are commonly located at the end of a tube attached to the manifold pipe wherein the tube may be vertical, or have a bend, or be attached to the manifold pipe at an angle to the vertical.

Watering systems with one or more manifold supply pipes are common in indoor poultry and small mammal operations. In one common embodiment, the manifold supply pipe is supported or hung by a vertical support structure. In another embodiment, the manifold pipe may be mounted by struts to a nearby wall, partition, or structural elements of the building housing the poultry or animal operation. Similar arrangements may be used to mount an outdoor watering system. In such configurations, use of connecting tubes or pipes that have one or more bends between the nipple or ball valves and the manifold supply pipe can provide improved access to the watering valves by the animals.

In watering systems with one or more manifold supply pipes used in conditions where freezing and sub-freezing temperatures may occur, a heat source is necessary to maintain the water or liquid above the freezing temperature. For energy efficiency and to reduce the heating power required of the heater, it is incumbent to surround the manifold supply pipe and any connected tubes or pipes with thermal insulation to reduce heat loss. Such insulation may comprise any materials having low thermal conductivity, examples of which include foam rubber, polyurethane foam, polyethylene bubble, which may have a thin reflective layer, for example, an aluminum layer, paint, or coating, to reduce radiative transport. The insulation may be enclosed within a protective tube, pipe, or plastic wrap for mechanical protection, to shield the insulation material from sunlight, e.g., ultraviolet light, and as protection from precipitation and animal detritus. Generally, the radial thickness of the insulation will be about or more than one inch. This form of manifold supply pipe may also be called a thermally insulated supply pipe. Because of the insulation surrounding the manifold supply pipe, direct attachment of the nipple or ball valve to the manifold supply pipe is not practical. In such systems, the use of freeze-resistant nipple valve or ball valve devices is also efficacious to maintain the watering function of the system when the ambient temperature is at or below the freezing temperature of the water or liquid. However, in such systems, especially if there are one or more bends in the heat pipe connecting the manifold supply pipe with the nipple or ball valve, or if the heat pipe and outer shield containing insulation are straight but have greater length for penetration of the insulation around the manifold pipe and for improved access, the thermal path length between the manifold supply pipe and the valve seat and exposed exit surface of the valve will be greater than is typical of the bucket waterers with freeze-resistant watering nipple devices having straight heat pipes as described above.

As a consequence of the greater length of the heat pipe, the freeze-resistant watering nipple device may be more susceptible to freezing and potentially more likely to rupture or be damaged if the water or liquid within the heat pipe, nipple or ball valve, or reservoir container or supply pipe freeze. When the freeze-resistant watering nipple device is used with a bucket reservoir within an outer bucket, and the freeze-resistant watering nipple device is mounted at the bottom of the outer bucket and has a straight and comparatively short heat pipe as shown in FIGS. 12-16, the water in the reservoir is generally warmer than the water in the body of the valve, the water in the reservoir also has a large thermal capacity and a relatively large free surface as the upper surface of the water volume. If the reservoir is unheated and its temperature drops sufficiently or if its heater has insufficient power to maintain the reservoir temperature high enough so that the valve temperature is above freezing, then, most commonly, the valve freezes before the reservoir freezes. The surface of freezing progresses upwards through the water column in the body of the valve and along the heat pipe. Once the freezing front reaches the reservoir and the reservoir water or liquid temperature drops to the freezing point in the vicinity of the heat pipe, then the freezing front will propagate into the water or liquid in the reservoir as heat is conducted away by the heat pipe and frozen liquid within it. An ogival ice mass will form about the heat pipe protrusion into the reservoir. If no heat is introduced and the ambient temperature outside the bucket is at freezing or below freezing, the water or liquid in the reservoir will eventually freeze.

In the above described scenario, if the solid, frozen phase has lower density that the liquid phase, as with water, then, as the freezing front propagates, liquid is pushed toward the reservoir, so, there is little potential for pressure to increase and rupture the valve body or heat pipe. Once the freezing front propagates into the reservoir, the large free surface of the water or liquid reduces the likelihood of damaging pressure buildup.

The freezing of a watering system with a manifold supply pipe may proceed as described above, however, because of the smaller thermal reserve in the manifold supply pipe in comparison with the reservoir of a bucket waterer, in the event that the power of the heater for the manifold supply pipe system is inadequate or the heater or electrical power fails, then, the initial location of freezing may be at the valve, in the heat pipe, or in the manifold supply pipe. In these situations, expansion of frozen portions within pipes or tubes may lead to pressure increases that can well exceed the rupture strength of the pipes or tubes.

Still further, the time for the frozen contents to thaw can be very long. Application of heat to outside of the outer shield may be relatively ineffective in a well-insulated system. So, for both a reservoir container system and a manifold supply pipe system, a preferred method of thawing a frozen system first supplies heat to thaw the contents of the reservoir or to the contents of the manifold supply pipe. Commonly, this may be accomplished by a variety of means that are well known in the art, an example being an immersion heater. As or after the reservoir or supply pipe is thawed, then, the watering nipple devices are warmed. Because of the insulation surrounding the freeze resistant watering nipple device, the application of heat to the outer surface of the outer shield will not lead to rapid thawing. Although an immersion heater or heater outside of, but in contact with, the heat pipe or the thermally conducting sleeve can be placed in each watering nipple device, such configurations will generally be more complicated than the approach described below.

The instant invention provides a means for rapid thawing that is comparatively simple. In this approach, the material and dimensions of the heat pipe are selected so that the thermal conductance of the heat pipe is sufficiently large, and the reservoir or supply pipe temperature $T_r$ is elevated sufficiently, so that once the reservoir or supply pipe have been thawed and heated well above the freezing temperature, a substantial amount of heat will flow into the heat pipe for thawing the ice therein and also thaw the ice in the nipple valve. Further, it is found, surprisingly, that complete thawing of the watering device is not necessary to restore operation of the watering nipple device. Still further, the good thermal conductance of the heat pipe of the instant invention that provides rapid thawing also results in the efficacious delivery of relatively cooler water to the nipple or ball valve when the reservoir or supply pipe temperature is substantially cooler than the ambient temperature in hot weather.

The heat pipe parameters, e.g., those that determine thermal conductance, which, in normal operation in freezing and sub-freezing ambient temperatures, are sufficient to maintain a desired small temperature difference between reservoir or supply pipe and the exposed nipple exit surface $\Delta T_{rms}$, may not suffice for adequate thermal conductance to achieve thawing as rapidly as desired. Also, the maximum reservoir or supply pipe temperature $T_r$, acceptable for watering the animals when the watering nipple valve device is not frozen may not be adequate for rapid thawing when the device is frozen. So, for rapid thawing, an elevated $T_r$ will be necessary. Furthermore, as the amount of heat that must be supplied for the latent heat of fusion $L_m$ to obtain phase transition, i.e., melting, the time for thawing also depends on the volume of water or liquid to be melted.

The heat pipe as described herein conducts heat from the reservoir or supply pipe to the thermally conducting sleeve and body and valve seat of the watering valve. In some embodiments, examples of which have been described above, the heat pipe may also convey water or liquid from the reservoir or supply pipe to the nipple or ball valve. However, in other embodiments the water may be conveyed by a pipe or conduit within or outside of the heat pipe. In some embodiments, the heat pipe may comprise more than one segment in length, wherein a segment may be a pipe or tube, i.e., a heat pipe tube, which conducts heat and conveys water or liquid or contains a conduit that conveys water or liquid, or a segment may comprise a thermally conducting member that comprises a bar, rod, strip, or tube, or a bundle of such parts, which is within a conduit that conveys water or liquid. The segments of the heat pipe may be joined by any of several means, examples of which are threads, compression, soldering, welding, brazing, or fasteners, so long as the joints comprise tight thermal contact for effective conduction of heat.

In the following, a thermally conducting rod (herein referred to as a "heat conducting rod") is used as an exemplar of the thermally conducting member that comprises a bar, rod, strip, tube, or bundle thereof. It is to be understood that the cross-section shape of the thermally conducting member comprising a segment of the heat pipe may be round, rectangular, square, annular, or other shape. Further, the cross-section shape and/or the transverse dimensions of the heat conducting member may change as a function of distance along its length. Still further, it may also be comprised of joined segments, each of different or varying cross-section shape.

Some of the principal parameters that relate to the thermal conductance of the heat pipe are the cross-section area $A_p=\pi(D_2^2-D_1^2)/4$, length L, and thermal conductivity k of the heat pipe in each segment. Also important to the efficacy of the heat pipe to transport heat and maintain an acceptably small difference in temperature $\Delta T_{ms}=T_r-T_{ns}$ between the reservoir or supply pipe and the nipple valve seat are the thermal conductivity of the insulation surrounding the heat pipe and water conduit, which may be one and the same in a segment, the thickness of the surrounding insulation, the temperature of the water or liquid in the reservoir or supply pipe $T_r$, and the ambient temperature $T_a$ near the exposed exit surface and actuator of the nipple or ball valve.

Selection of these parameters has been informed by Equations (1)-(13) as shown above. These equations provide a good estimate of the longitudinal and transverse heat transport by use of a lumped circuit estimate in various segments of the heat pipe when the length of the heat pipe that is outside the reservoir or supply pipe is less than a few (e.g., about three) times the outer diameter of the outer shield. However, as the length of the heat pipe increases, the temperature variation along the heat pipe and $\Delta T_{rms}$ may be greater. The, selection of the principal parameters guided by estimates that include the longitudinal variation in temperature may be important.

Calculations that include the longitudinal variation of temperature along the heat pipe to guide the selection of parameters may be performed by computer thermal transport simulation, but to inform parameter selection, mathematical solution of the heat diffusion equation with simplifying assumptions about geometry and boundary conditions can suffice.

In one such calculation with simplifying assumptions, the heat flow may be considered to be mainly longitudinal along the heat pipe, which is taken to be a straight cylindrical tube of inner radius $a=D_1/2$, outer radius $b=D_2/2$, perimeter $p=2\pi b$, length L, and thermal conductivity k. Assume the temperature at one end is $T_r$, the temperature at the other end is $T_L$, the temperature along the heat pipe T(x) is a function of the distance x along the heat pipe from the reservoir or supply pipe, and the transverse heat conductance per length is $$H = k_{ins} / \left( b \ln\left(\frac{b_{ins}}{b}\right) \right),$$

where $b_{ins}$ is the outer radius of the insulation around the heat pipe. Let $\mu^2=Hp/kA_p$. Then, T(x) is given by, $$T(x) = \frac{(T_r \sinh(\mu(L-x)) + T_L \sinh(\mu x))}{\sinh(\mu L)}, \tag{18}$$

and $T_L$ is estimated as, $$T_L = T_r \left[ \cosh(\mu L) + \frac{\pi b^2 \xi H_L \sinh(\mu L)}{A_p k \mu} \right]^{-1}. \tag{19}$$

In Eq. (19), an approximate boundary condition has been used wherein the heat flux at the end of the heat pipe is matched to the heat flux loss by convection $Q_n$ (with convection coefficient $H_L$) at the exposed exit surface of the nipple or ball valve along with a 'correction factor' $\xi$ to account for the end loss via the surrounding insulation and outer shield. Typically, $\xi \infty 2$ or 3.

For example, consider a cylindrical heat conducting rod of radius $a_{rod}$=6.35 mm (i.e., for a rod, b=$a_{rod}$ and a=0) and L=0.20 m length. On end is held at $T_r-T_0$=30 K. If the heat conducting rod is surrounded by insulation with $k_{ins}$=0.03 W/m-K with outer radius $b_{ins}$=0.0254 m and $$H_L = 18 \frac{W}{m^2 - K},$$

then, $T_L$>0 requires k>69 W/m-K. For an annular tube with the same outer radius and a 1.5 mm wall, k>161 W/m-K is required. For comparison, the thermal conductivity of aluminum is about k≈200 W/m-K.

The heat pipe and water conduit parameters also affect the characteristic thermal diffusion times and melting front propagation velocity. So, to obtain thawing and return to watering operation of the system within a desired amount of time, it is necessary to have ample heat conduction along the heat pipe and to constrain the volume of water or liquid in the conduit. To melt the water or liquid, sufficient heat must be provided to obtain the change in temperature to the melting temperature $T_m$ and to provide the latent heat of fusion $L_m$.

An analytic 'closed-form' mathematical solution to the thawing of ice in a finite-length conduit is not available as the problem is a two-dimensional Stefan problem. A one-dimensional approximation generally is not useful because the melting front is not localized axially or quasi-planar. Because of the substantially greater thermal conductivity of the heat pipe, the melting front, i.e., the interface between liquid and solid phases propagates axially away from the reservoir or supply pipe end of the heat pipe and radially inward in a heat pipe tube or radially outward from a heat conducting rod within a conduit. As the thawing progresses in a tube, a growing sheath of liquid water surrounds an axially tapered cylinder of ice. As the thawing progresses in a conduit containing a heat conducting rod, a sheath of liquid water grows in radial thickness around the rod as a surrounding annulus of ice shrinks in radial thickness, generally, its inner radius increasing fastest at the end that is closest to the reservoir or supply. The thickness of the annulus may also vary if the heat conducting rod is not centered in the conduit or if the rod and conduit are curved.

To illustrate how the heat pipe can result in faster thawing, we can compare the characteristic thermal diffusion, i.e., transport, times and estimate the characteristic melting front propagation times. The characteristic thermal diffusion times in the axial and radial directions are given by, $$\tau_x \approx L^2/(4\kappa), \quad (20a)$$

$$\tau_r \approx \bar{a}^2/(4\kappa), \quad (20b)$$

where $\bar{a}$=a for a heat pipe tube or $\bar{a}^2 = \bar{a}_{cond}^2 - a_{rod}^2$ for a heat pipe rod contained in a conduit of inner radius $a_{cond}$, and $\kappa$ is the thermal diffusivity, e.g., $\kappa_w \times 10^{-7}$ m$^2$/s is the thermal diffusivity for water, $\kappa_{ice} \times 10^{-6}$ m$^2$/s is the thermal diffusivity for ice, and $\kappa_{Al} \approx 8.2 \times 10^{-5}$ m$^2$/s is the thermal diffusivity for aluminum. When L=0.2 m, $\tau_x \approx 7473$ s∞125 minutes for ice, and $\tau_x \infty 121.5$ s2.0 minutes for aluminum. When a≈4.76 mm, $\tau T_r \approx 68.8$ s for ice, and $\tau_r \approx 709$ s≈11.8 minutes for water. For mainly axial melting front propagation, the contents of the conduit between the reservoir or supply pipe and the front (herein called 'behind the front') is liquid, and the contents ahead of the front is solid, i.e., ice. In an ideal one-dimensional situation, because the ice is at the melting/freezing temperature $T_m$, there is no or little heat transport in the region ahead of the front. In practice, however, the high thermal conductivity of the heat pipe and its much shorter $\tau_x$ have the result that melting occurs along all of the length of the heat pipe in a matter of minutes, once the that pipe has delivered sufficient heat to bring the temperature of the ice that is proximate to the heat pipe to $T_m$.

As the sheath of water grows, the temperature of the heat pipe will increase. The radial melting front propagation position can be estimated as, $$R_s(t) = 2\lambda\sqrt{k_w t}, \quad (21)$$

And the characteristic time for melting is, $$\tau_m = a^2/(4\lambda^2 78_w), \quad (22)$$

where$\kappa K_w$ is the thermal diffusivity of water, and $\lambda$ is estimated:

$$\lambda \approx St/\sqrt{\pi}, \quad (23)$$

and the Stefan number is $$St = (T_{ave} - T_m)/(C_w L_m) \approx (T_r - T_m)/2 C_w L_m). \quad (24)$$

and $T_{ave}$ is the time-averaged root-mean square of the temperature difference above $T_m$ of an axial portion of the heat pipe that is of interest, e.g., the end near the sleeve and nipple valve body. In Eqn. (24), $C_w$ is the heat capacity of water. By Eqns. (22-24), when $T_r - T_m$=50° C., St≈0.627, and λ=0.35, so, once the axial portion of the heat pipe that is of interest has reached $T_m$, the characteristic time for the melting $T_m$ at the nipple valve end of the heat pipe is estimated to be $\tau_m \approx 8\tau_r \approx 688$ s≈11.4 minutes, when a==4.76 mm.

The time to obtain complete melting within the conduit can be estimated from the ratio of the energy needed, which is the energy for phase transition and to raise the ice to $T_m$, and the rate at which the heat pipe can deliver energy to the contents of the conduit and nipple valve body. The energy needed for phase transition is the product of the volume of ice $V_{ice} = \pi a^2 L$ for a cylindrical heat pipe tube, or $V_{ice} \approx \pi (a_{cond}^2 - a_{rod}^2)L$ for an annular volume between a heat conducting rod and the inner surface of an enclosing conduit, $a_{cond}$ being the inner radius of the conduit and $a_{rod}$ being the outer radius of the rod, the density of ice $\rho_{ice}$, and the latent heat of fusion $L_m$. Accordingly, the energy E required to warm the ice to $T_m$ and melt is estimated as:

$$E \approx V_{ice}\rho_{ice}(L_m + c_{ice}(T_m - T_{init})). \quad (25)$$

where $T_{init}$ is the initial temperature of the ice and heat pipe at the beginning of the thawing process and $c_{ice} \approx 1943$ kJ/kg. For a heat pipe tube with a=4.76 mm, b=6.35 mm, and L=0.20 m, $V_{ice}$=14.2 ml, and if $T_{init}$=−19° C., then E≈4.8 kJ. If the rate of heat delivered to the nipple valve end of the heat pipe is $$P = \frac{A_p k(T_r - T_{ave})}{L} \approx A_p k(T_r - T_m)/(2L), \quad (26)$$

then, for an aluminum heat pipe with the dimensions given above, and $T_r - T_m$=50° C., then, P≈1.39 W. Using Eqns. (25) and (26), the time is estimated as $\tau_m \approx E/P \approx 58$ minutes. It is also seen from these equations that minimizing the volume of water, selecting a sufficiently large $A_p$ and k, and using a greater $T_r$ results in faster thawing.

Experimental tests have been conducted with a heat pipe comprising an aluminum tube with a=5.35 mm and b=6.35 mm, and an overall length of 30 cm of which 6 cm protrudes into a reservoir bucket and the remainder, a length, L=23.5 cm, hangs below the bucket. Surrounding the heat pipe is insulation comprising a one cm radial thickness of polyethylene bubble insulation having an aluminum foil layer that is, in turn, surrounded by foam rubber insulation with $B_{ins}$=2.75 cm. In the tests, a nipple valve and clamped sleeve are attached, or a rubber stopper plugs the bottom end of the heat pipe. Thermocouples are located at the bottom end of the heat pipe, about 8 cm above the bottom, and about 15.5 cm above the bottom. The heat pipe is filled with water and placed in a freezer with ambient temperature about –20° C. The apparatus is removed from the freezer and the reservoir bucket is filled with about 3 liters of hot water with $T_r$=50° C. at which time $T_{init}$≈–19° C. The thawing tests and measurements are in a room with ambient temperature that is approximately 22° C.

Typically, an approximately linear rise in temperature to $T_m$ is seen at each thermocouple position. The uppermost thermocouple shows the fastest rise $T_m$ in about 100 s after which time, the temperature rises linearly with a slope of about 1.4° C./min. The middle thermocouple reaches $T_m$ in about 6 minutes and then stays at a plateau near freezing for about 6 minutes. The thermocouple at the bottom end reaches $T_m$ in about 10 minutes and then stays at a plateau near freezing for about 10 minutes, then the temperature rises at one to two degrees pe minute. At this point in time the nipple valve can deliver water. In tests with a rubber stopper plug, removal of the stopper at this point in time reveals a taper of ice, typically about 8 to 15 cm in length within the heat pipe.

Comparison of the plateau duration is consistent with the characteristic time calculated by Eqns. (22)-(24). Because the thawing tests are conducted with ambient temperature near room temperature, the estimate of complete melting time by Eqns. (25) and (26) must be adjusted by the heat gain through the insulation that surrounds the heat pipe. The power of this heat gain becomes comparable to the rate at which heat is delivered to the bottom end of the heat pipe once the bottom end has reached $T_m$, which is consistent with the shorter observed duration of the plateau at the bottom end of the heat pipe.

Tests were also conducted with a heat pipe comprising an aluminum rod with $a_{rod}$=3.18 mm and L=0.20 m. The heat conducting rod was threaded (with ¼-20 UNC×½" long threads) at each end and screwed into the aluminum tubes with 1.27 cm diameter and about 3.8 cm length. As a conduit, a vinyl elastomer tube with 1.27 cm inner diameter and 1.5 mm thickness wall contained the heat conducting rod and was clamped onto one of the aluminum tubes at each end. A 2.5 mm diameter×2 cm deep axial hole was drilled into the upper end of the heat conducting rod; an intercepting transverse through hole with 1.5 mm diameter was drilled near the bottom of the axial hole. These holes provided a means of filling the elastomer tube Insulation as described above was placed around the conduit and temperature at the lower heat pipe tube was monitored with a thermocouple. The conduit and heat pipe tube at the top end are filled with water and placed in a freezer with ambient temperature about –20° C. The apparatus is removed from the freezer and the reservoir bucket is filled with about 3 liters of hot water with $T_r$=50° C. at which time $T_{init}$≈–19° C. The thawing tests and measurements are in a room with ambient temperature that is approximately 22° C.

The temperature measured at the lower heat pipe tube showed a rise to $T_m$ in about 16 minutes. Then, a plateau in temperature with duration of about 29 minutes is observed. At this time, the ice in the vicinity of the heat conducting rod and the lower heat pipe tube is melted and an annulus of ice has formed. After this time, melting proceeds and a steady temperature rise is seen, which is consistent with the heat delivered by the heat conducting rod and the heat transported from the warm ambient air through the insulation that surrounds the heat pipe and conduit. The estimate of the time for complete melting without heat gain through the insulation from the warm ambient air in the room is given by Eqns. (25) and (26) as $\tau T_m \approx E/P \approx 139$ minutes.

For comparison, tests were conducted with a conduit comprising a vinyl elastomer tube that did not contain a heat conducting rod. The elastomer tube has a 1.27 cm inner diameter and 1.5 mm thickness wall, an aluminum plug at its bottom end, an aluminum tube with 1.27 cm outer diameter and an axial hole that is drilled and tapped for ¼-20 UNC threads. The distance between the bottom surface of the upper aluminum heat pipe tube and the top of the aluminum plug at the bottom end is about 21 cm. The elastomer tube comprises two pieces, each 10.25 cm in length. Joining the two pieces is a 3 cm length of aluminum tube having a 1.27 cm outer diameter and a 1 mm thick wall. The elastomer tubes are sealed to the aluminum parts with hose clamps. A thermocouple is on the aluminum tube between the two pieces of the elastomer tube and on the aluminum plug at the bottom end. The conduit and heat pipe tube at the top end are filled with water and placed in a freezer with ambient temperature about –20° C. The apparatus is removed from the freezer and the reservoir bucket is filled with about 3 liters of hot water with $T_r$=50° C. at which time $T_{init}$≈–19° C. The thawing tests and measurements are in a room with ambient temperature that is approximately 22° C.

The temperature measured at the middle of the elastomer tube showed a rise to $T_m$ in about 28 minutes. Then, a plateau in temperature with a duration of about 3 hours is observed. The total time is consistent with the warming and melting time estimated as $T_m \approx E/P$, where the heating power P for melting is mainly by transport of heat from the warm ambient air through the insulation surrounding the elastomer tube. Temperature measured at the bottom end of the elastomer tube showed a rise to $T_m$ in about 24 minutes. Then, a plateau of about 10 minutes duration is observed, which is followed by a slow steady temperature rise. This is consistent with the ice melting in the vicinity of the bottom end plug because of heat gain through the surrounding insulation, and the melting front then propagating away from the end. In this case where there is no heat pipe within the elastomer tube conduit, if the ambient temperature is at or below freezing, sufficient melting to restore operation of the waterer may not occur at all.

Embodiments are presented that give improved access by the animals to the exposed exit surface and actuator of the nipple or ball valve, that are resistant to damage if the water or liquid contained within freezes, and that can be thawed efficaciously by heat conducted from the reservoir or manifold supply pipe.

Figure 19:
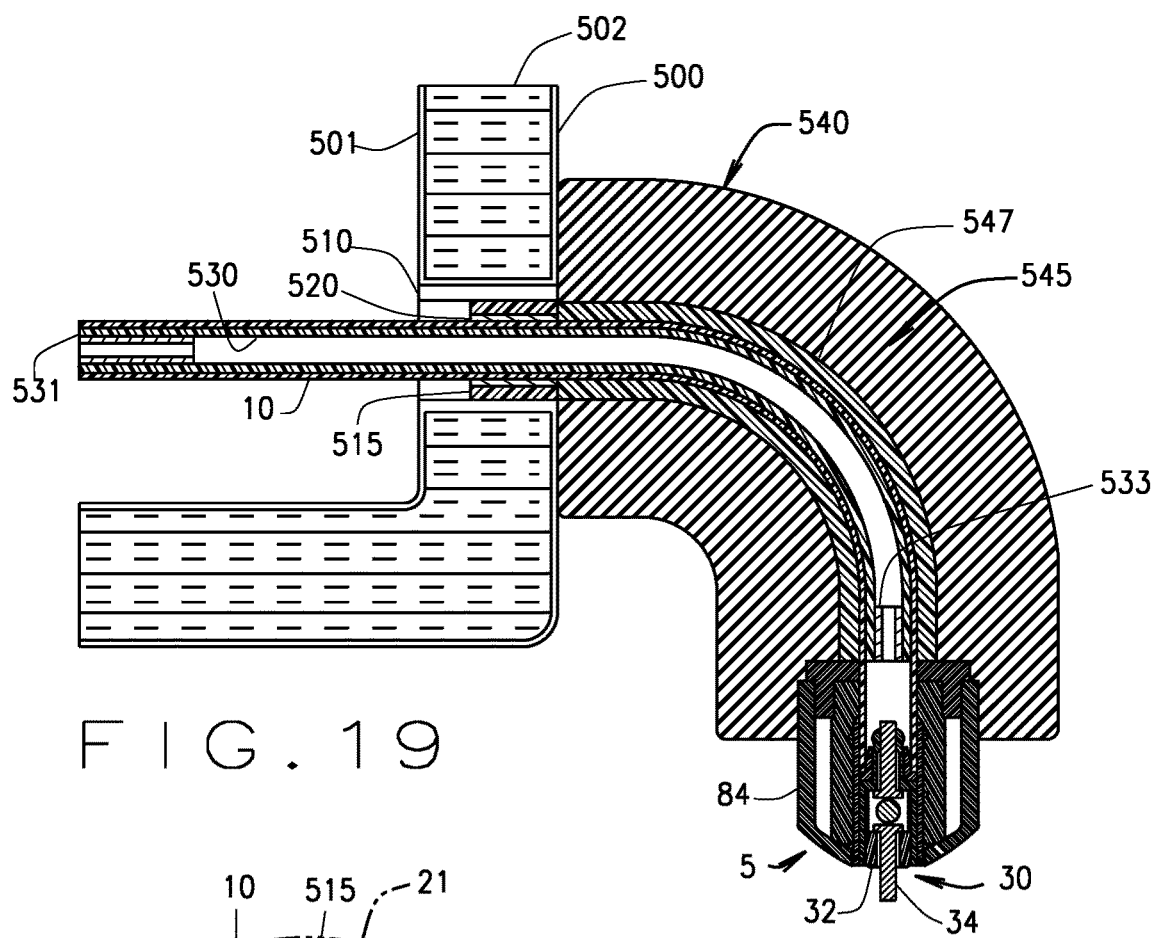
FIG. 19 shows a sectional view on a vertical cut plane through a container previously shown in FIG. 12 of an embodiment of a freeze-resistant nipple valve device with a curved het pipe and upper outer shield containing insulation, and which attaches at the outer surface of side wall of a 'bucket' waterer with reservoir container integral with bucket insulation and integral with the outer side wall surface. This figure shows a portion of the bottom wall and side wall of the 'bucket' waterer.

Shown in FIG. 19 is an embodiment of a freeze-resistant watering nipple device with a curved heat pipe 10 and upper outer shield 540 containing insulation 545 and mounted by attachment at the outer surface of side wall 500 of a 'bucket' waterer with reservoir container 501 that is integral with bucket insulation 502 that is integral with the outer side wall surface. The heat pipe protrudes into the reservoir. In preferred embodiments, the heat pipe has an outer diameter, $D_2$ in the range of 0.25 to 0.75 inches, a length outside of side wall 500, which is less than about 10 inches, and protrudes into the reservoir by about 0.5 to 4 inches. The heat pipe may have different dimensions for its different segments so long as the transitions between segments make tight thermal contact for good conductance along the heat pipe.

The upper outer shield 540 is a thermal shield that encloses insulation 545 within a protective tube, pipe, polymer coating, foil, or plastic wrap for mechanical protection, to shield the insulation material from sunlight, e.g., ultraviolet light, and as protection from precipitation and animal detritus. The upper outer shield is a component of or joined to the outer shield 84 that has been described above. The outer shield encloses an insulating volume comprising low thermal conductivity insulating material and/or an air gap space that has a reflective shield on at least one of its defining surfaces. As a thermal shield, the outer shield is itself made of low thermal conductivity material of which polymers are examples, and the outer shield is a barrier to infiltration of cold or hot air and water that can compromise the low thermal conductivity of the insulation 545 contained therein. Moreover, in one preferred embodiment, the outer shield is made of or is wrapped, painted, coated, or covered by low thermal emissivity or reflective material. Such an outer surface is especially useful to prevent overheating the water or liquid in the conduit when the freeze-resistant watering device is subject to direct sunlight in hot weather. The outer shield also encloses the heat pipe and the body of the nipple or ball valve, but the outer shield then exposes the actuator and the exit surface for use by the animals, birds, or poultry. Meanwhile, the heat pipe and surrounding outer shield containing insulation have one or more bends in their path. Though the figures show and suggest one ninety-degree bend, other numbers of bends and other angles of bend may occur. In one embodiment, a bend has an angle of 45 degrees.

The radius of curvature may as large or small as is convenient for manufacture and assembly. The angle through which the heat pipe bends may be selected as needed to position the nipple of ball valve at the intended angle to the vertical. In some embodiments, the heat pipe comprises straight segments that are coupled together with couplers that fix the joining segments at desired angles. Such couplers must make tight thermal contact with the segments so that the good conductance of the heat pipe is maintained.

In preferred embodiments, the heat pipe material is selected from metal, metal alloys, ceramics, and composite materials that have thermal conductivity k is greater than about 40 W/m-K. In more preferred embodiments, the heat pipe mainly comprises aluminum or copper, or alloys thereof. The heat pipe may be treated, coated or covered by a thin jacket to resist corrosion. Examples of such treatments and coating include anodized aluminum, polymer sleeves, enamel coatings, or metal plating or cladding. Preferably, when the water or liquid within the heat pipe is frozen and the water or liquid in the container or supply pipe has a temperature of at least 37° C., the invention causes sufficient thawing within one hour for restored watering capability of its nipple or ball valve.

In some embodiments, the attachment of the heat pipe 10 at its lower end to the nipple valve 30 is, for example, via an elastomer annular gasket 46, or into a threaded hole at the bottom of the heat pipe, as described above. The thermal connection of the heat pipe to the clamped sleeve 20 has also been described above. For recollection, the heat pipe attaches to the container or the supply pipe by a threaded fitting, a threaded joint, or an elastomer compression joint. In some preferred embodiments, as described above, the clamped sleeve compresses a heat conducting ring 130 having an axial slot 132 that makes tight thermal contact to transmit heat from the sleeve to the nipple valve seat. In other embodiments, the sleeve 20 may be integral with the heat pipe 10. In such embodiments, the seal between the top of the nipple valve and the interior of the heat pipe is situated at a distance from the end of the integrated heat pipe and sleeve so that the end of the sleeve is adjacent to the bottom end of the nipple valve. The sleeve may have one or more axial slots 22 so that the sleeve can be clamped to the body of the nipple valve and to the optional heat conducting ring 132, as described above. In other embodiments, when an elastomer annular gasket 46 is used to seal the nipple valve to the interior of the heat pipe, the body of the nipple valve may be threaded and a lower portion of the interior of the sleeve may be threaded so that when the nipple valve is threaded into the sleeve and tightened, good thermal contact is obtained for good thermal conductance.

The heat pipe has a water tight seal to the bucket. In a preferred embodiment, the water-tight seal is a compression seal 520 with an elastomer sleeve, O-ring, or gasket that is compressed between the outer surface of the heat pipe and the inner surface of a tubular sleeve 515 that is fixed in a hole 515 that penetrates the side wall of the bucket.

In a preferred embodiment, the insulation 545 is selected from polymer foam, examples of which are polyurethane foam and polyethylene foam, rubber, foam rubber, silicone rubber, perlite, polyethylene bubble wrap, cork, and other commonly available insulation materials with thermal conductivity <0.07 W/m-K. In a more preferred embodiment, insulation 545 is elected from materials with thermal conductivity <0.05 W/m-K. The insulation may include one or more air gaps. A reflective metal foil or coating may be included in the insulation material or be situated on a surface of an air gap, the purpose of the reflective foil or coating being the reduction in radiative thermal transport. In a more preferred embodiment, the insulation includes one or more layers 547 of polyethylene bubble insulation having a metal foil and situated proximate to and around the heat pipe.

A resilient, compressive tubing 530 may be situated inside the heat pipe 10 to reduce the likelihood of rupture if the water or liquid freezes inside the heat pipe. In a preferred embodiment, this tubing comprises elastomer, rubber, or polymer composite material having a modulus of elasticity that is much less than that of the material of the heat pipe. In a more preferred embodiment, the tubing is made of vinyl plastic (polyvinyl chloride, PVC), silicone rubber, fluorinated ethylene propylene (FEP), or other polymers that are compatible with potable water or liquids, and the tubing material has a Shore Durometer hardness of between 30 A and 65 A. In a still more preferred embodiment, the tubing 530 extends more than 80% of the length of the heat pipe and has a cross-section area that is greater than 20% of the cross-section area of the interior of the heat pipe. In a preferred embodiment, the compressive tube outer diameter is sufficiently less than the inner diameter of the heat pipe so that the compressive tube can be readily inserted or removed from the heat pipe. Further, a tubular sleeve 531 may be inserted into either or both ends of the compressive tubing so that the end of the tube does not collapse or partially block the opening. The tubular sleeve is made of rigid material such as metal, plastic or ceramic that is resistant to corrosion or degradation by water. Examples of suitable materials include high density polyethylene, low density polyethylene, nylon, PVC, epoxy, stainless steel, aluminum, brass, and alumina. The insert may have threads or other outer surface treatment or be tapered to reduce expulsion of the tubular sleeve in the event the water or liquid freezes.

Figure 20:
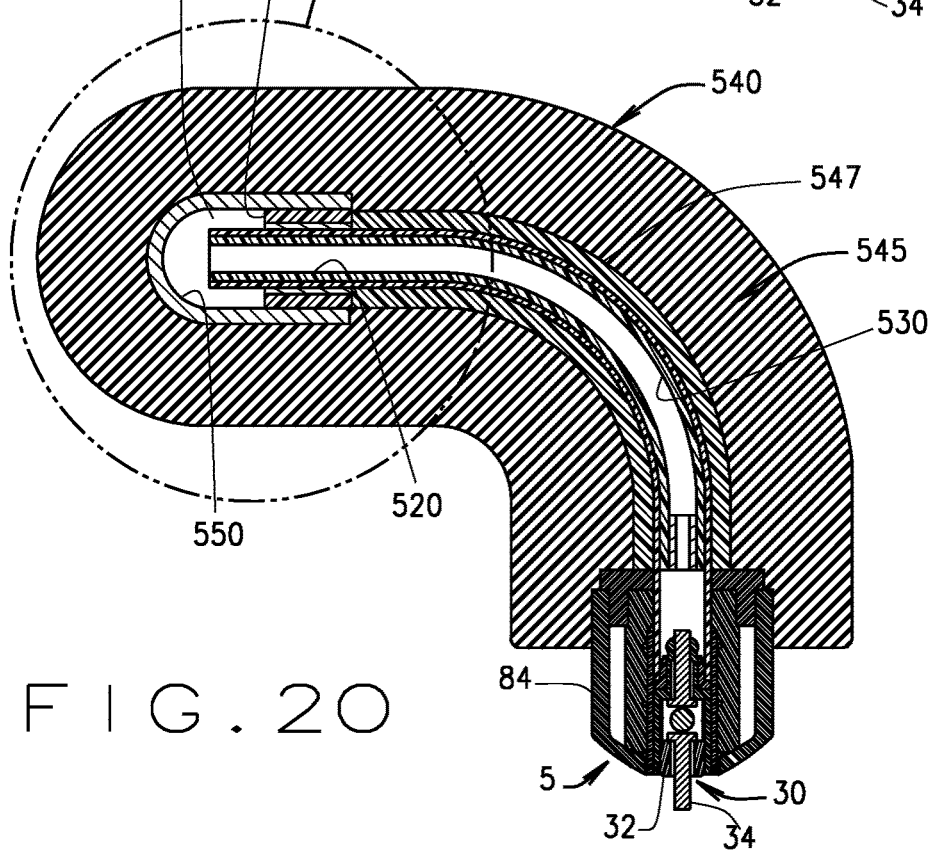
FIG. 20 illustrates a sectional view on a cut plane of bilateral symmetry of the invention of an embodiment of a freeze-resistant watering nipple device with a curved heat pipe and upper outer shield containing insulation and attaching to a tee connected to a manifold supply pipe.

Shown in FIG. 20 is an embodiment of a freeze-resistant watering nipple device with a curved heat pipe 10 and upper outer shield 540 containing insulation 545 and mounted by attachment to a tee that is connected to a manifold supply pipe 550. The heat pipe 10 protrudes into the tee of the manifold supply pipe. In preferred embodiments, the heat pipe has an outer diameter, $D_2$ in the range of 0.25 to 0.75 inches, a length outside of the seal 520 at the tee, which is less than about 15 inches, and protrudes into the tee by more than about 0.5 and may protrude past the central axis of the manifold supply pipe. The heat pipe may have different dimensions for its different segments so long as the transitions between segments make tight thermal contact for good conductance along the heat pipe. As described above, in some embodiments, the heat pipe comprises straight segments that are coupled together with couplers that fix the joining segments at desired angles. The insulation 545 contained within the upper outer shield 540 has been described above. In a preferred embodiment, the insulation is polymer foam or foam rubber around a layer 547 of polyethylene bubble insulation with embedded aluminum foil or an aluminized polyester (e.g., aluminized Mylar®) film wrap. An option air gap between the layers of insulation and/or between the polyethylene bubble insulation and the heat pipe tube may improve the effectiveness of the insulation and it may make for easier assembly. In a preferred embodiment, the upper outer shield is made of PVC pipe wrap that has a thickness in the range of 0.015 to 0.040 inches and is formed into cylinders, tees, or elbows with axial slits so the forms can be wrapped around the insulation with an overlap along the slit edge. The overlap is sealable with adhesive or with PVC cement. Seams and joints can be sealed with adhesive, silicone rubber, or PVC cement. In the preferred embodiment, upper outer shield 540 is part of outer shield 84 as a joined component or made integral to outer shield 84. The embodiment shown in the figure also has a resilient, compressive tube 530 inside the heat pipe. In preferred embodiments, tubular sleeves 531 as shown in FIG. 19 and described above are inserted into the ends of the compressive tube to keep the ends open. The heat pipe is sealed to the tee 550 of the manifold supply pipe bucket by a water-tight seal.

An embodiment having a compression seal is shown in FIG. 21. In a preferred embodiment, the water-tight seal is a compression seal 520 with an elastomer sleeve, O-ring, or gasket that is compressed between the outer surface of the heat pipe and the inner surface of a tubular sleeve 515 that is joined to the tee. In a preferred embodiment, the manifold supply pipe tee and the tubular sleeve 515 are made of PVC. In a more preferred embodiment, the tee is a standard Schedule 40 PVC pipe component for potable water. In a still more preferred embodiment, the arm of the tee to which the heat pipe is attached has a slip joint or threaded joint for ½ inch Schedule 40 PVC pipe. For a compression seal in one preferred embodiment, the heat pipe 10 outer diameter is 0.5 inches, the tubular sleeve 515 is a length of ½ inch PVC Schedule 40 pipe at least 0.75 inches long, the elastomer seal is a piece of silicone rubber tubing with 0.50 inch inner diameter, a $\frac{1}{16}$ inch wall, a length of at least $\frac{3}{8}$ inch, and a Shore Durometer hardness of 35 A to 65 A. For a threaded seal in a preferred embodiment, the tubular sleeve 515 is absent and a threaded pipe plug that fits the threaded female opening of the tee is modified to have a hole through which the heat pipe can pass with a hand tight slip fit. The heat pipe penetrates the hole in the pipe modified plug and cemented to the plug with cyanoacrylate glue, silicone rubber glue, or other cement to form a water-tight seal. The threads of the modified plug are wrapped with PTFE thread sealing tape. The freeze-resistant nipple watering device is sealed to the tee by threading the device and its attached modified pipe plug into the tee. For tee arms that are sizes other than Schedule 40½ inch, standard PVC pipe components may be used to adapt from one pipe size to another.

Shown in FIG. 22 is an embodiment wherein the heat pipe comprises a tube 560 that protrudes into a manifold supply pipe tee 550 and that is attached to a rod 563 and then is attached to a tube 565 to which the heat conducting sleeve and nipple or ball valve of the freeze-resistant watering nipple device attach. The heat conducting sleeve has tight thermal contact with the body of the nipple or ball valve and with the heat pipe. The rod segment of the heat pipe is situated within an elastomer tube 570. The tube 570 within the heat pipe conveys water or other liquid to the animals, birds, or poultry. Moreover, the tube 570 can expand or compress without rupture of the heat pipe or itself the tube. This expansion and compression tolerance of the tube accommodates the change in volume resulting from the freezing or thawing of the water or the other liquid within the tube and adjacent heat pipe. In a preferred embodiment, the polymer or plastic tube is clamped at its upper end by a compression clamp 576 for a water-tight seal to the tubular segment of the heat pipe 560, and the lower end of the plastic tube is clamped to the lower heat pipe tube 565 by compression clamp 575. The compression clamps may be any of common commercially available hose and tube clamps. In preferred embodiments, the compression clamps are made of stainless steel wire wrapped around the plastic tubing and with twisted ends to tighten the wire hoop and obtain compression, or the clamps are made of stainless steel bands, examples of which are commercially available compression rings such as crimp clamps for PEX tubing and screw-type hose clamps.

In the embodiment shown in FIG. 22, the insulation 545 is as described above. In the figure, an air gap is shown between the insulation and the elastomer tube 570. This gap may be filled with insulation, but such insulation must be compressive sufficiently to accommodate the expansion of the elastomer tube when the water or liquid within the tube freezes.

To permit water or liquid to flow from the manifold supple pipe tee, through the upper heat pipe tube 560 and into the annular space between the heat conducting rod 563 and the inner wall of the elastomer tube 570, holes 564 or channels are necessary at least in either the upper end of the heat conducting rod or in the upper heat pipe tube.

Figure 23:
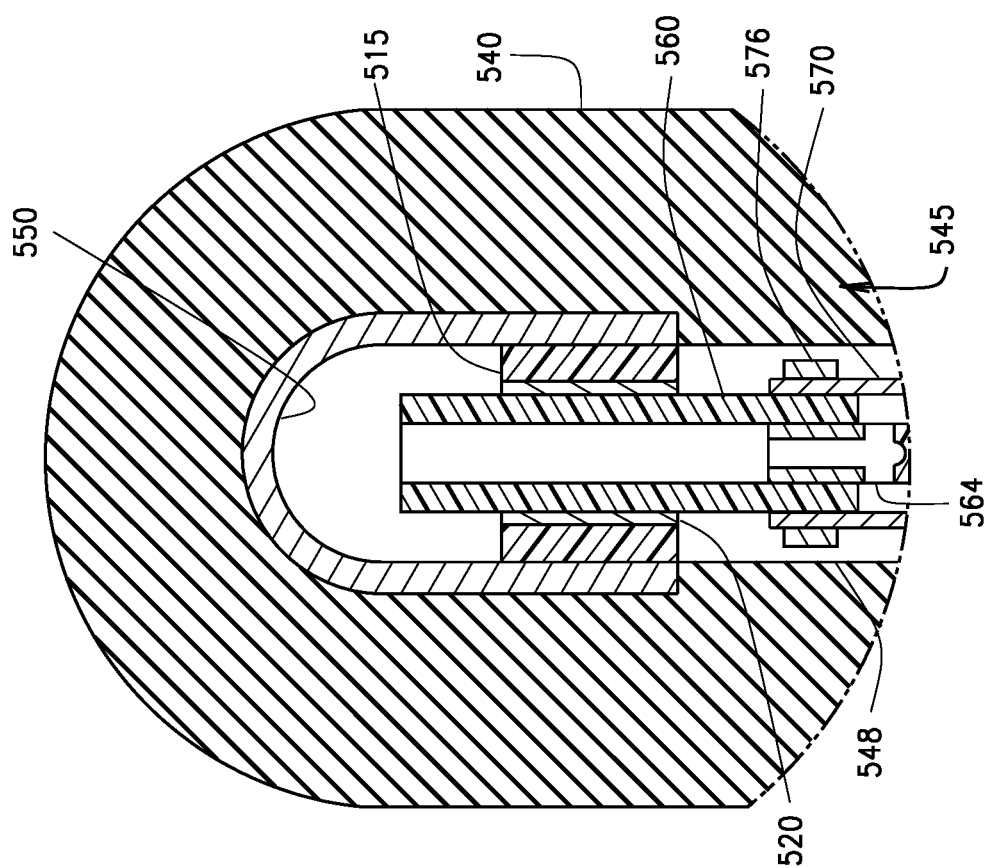
FIG. 23 shows a detail on a cut plane of bilateral symmetry of the invention of the upper portion of the embodiment shown in FIG. 22 with holes in the upper end of the heat pipe rod adjacent to where it attaches by a threaded joint to the upper heat pipe tube and the holes convey water or liquid from the upper heat pipe tube to the annular space between the heat pipe rod and the enclosing elastomer tube.

An embodiment with such holes is shown in FIG. 23. Similarly, holes 564 or channels are necessary at least in either the lower end of the heat conducting rod or in in the lower heat pipe tube 565.

Figure 24:
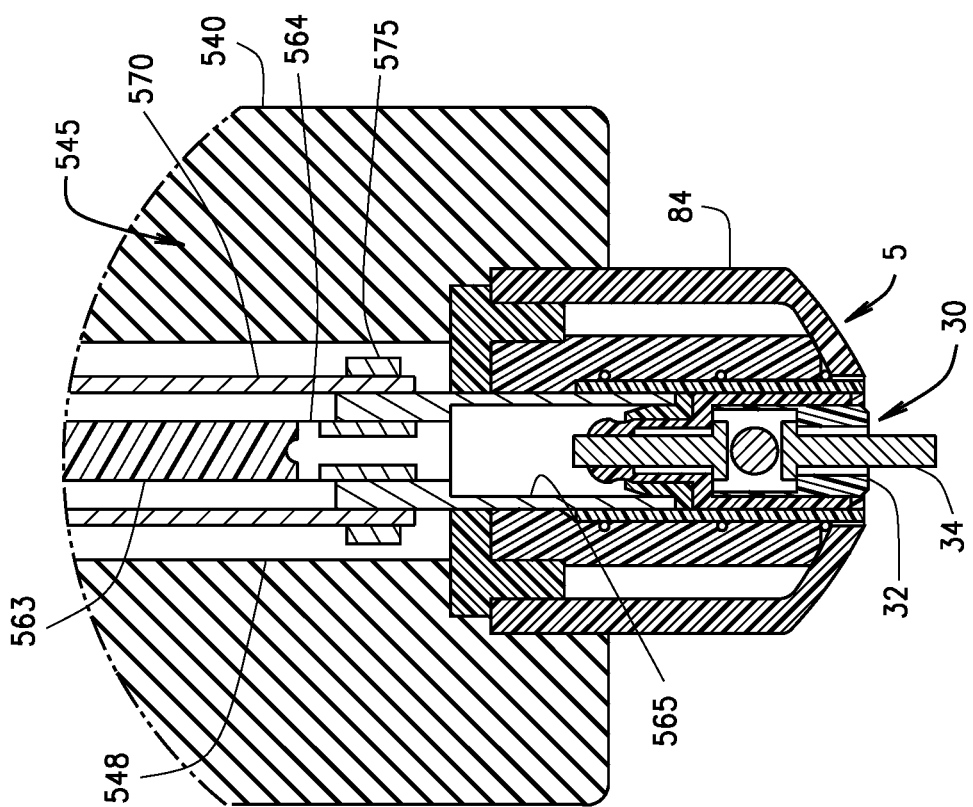
FIG. 24 shows a detail on a cut plane of bilateral symmetry of the invention of the lower portion of the embodiment shown in FIG. 22 with holes in the lower end of the heat pipe rod adjacent to where it attaches by a threaded joint to the lower heat pipe tube and the holes convey water or liquid from the annular space between the heat pipe rod and the enclosing elastomer tube and the lower heat pipe tube that conveys the water or liquid to the nipple or ball valve.

An embodiment with such holes is shown in FIG. 24. In a preferred embodiment, the holes comprise an axial hole in each end of the heat conducting rod 563 and a transverse hole that intercepts each axial hole so that water or liquid can flow into and exit the elastomer tube 570 with sufficient flow rate to maintain a filled water volume in the conduit and valve without clogging by debris or flocculent that may be present in the water or liquid supply. As most nipple and ball valves are used with small head pressure, the flow rate can be estimated as a gravity-fed system. In a preferred embodiment, each axial hole is at least 0.04 inches in diameter and 0.5 inches long, and each transverse hole is at least 0.04 inches in diameter. In a more preferred embodiment, the hole diameters are at least 0.06 inches. In a preferred embodiment, the upper and lower heat pipe tubes have an outer diameter of 0.5 inches, wall thickness is at least 0.04 inches, and inner diameters of at least 0.2 inches in the portion of their length where the joint is made with the heat conducting rod 563.

The heat conducting rod may be attached by any means that has tight thermal contact for good thermal conductance. Generally, the thermal contact area of the attachment should be larger than the cross section of the heat conducting rod. In preferred embodiments, the thermal contact surface area is at least twice the cross-section area of the heat conducting rod. The heat conducting rod must also be attached with sufficient tensile strength to withstand the longitudinal force resulting from the expansion of ice within the elastomer tube 570. It is notable that the expansion of the ice within the elastomer tube is mostly in the transverse direction, so, the longitudinal force typically is of the order of tens of pounds or less. Because of this longitudinal force, the elastomer tube 570 must also be held with sufficient clamping force to withstand the expansion of ice contained within it. In some embodiments, the attachment is by a clamped compression joint in which the heat conducting rod is held within a heat pipe tube, e.g., 560 or 563, wherein the tube has one or more slots at the joint. The slots permit transverse flexure of the tube for tight compressive contact with the heat conducting rod. To obtain both compression of the joint and sealing the elastomer tube to the heat pipe tube, two clamps can be used, one to hold and seal the elastomer tube, and one to compress the slotted portion of the heat pipe tube to hold the heat conducting rod.

In a preferred embodiment, the joints are threaded joints of standard size. As space permits, the threads may be unified national coarse (UNC) or unified national fine (UNF) threads. In preferred embodiments, the heat pipe comprises material as described above, and the heat conducting rod has a diameter of at least 0.25 inches. In an embodiment where the rod has a diameter of 0.25 inches, the ends may be threaded for ¼-20 UNC threads.

The elastomer tube is made of potable water compatible polymer, examples of which are silicone rubber, natural rubber, other synthetic rubbers, PVC (such as commercially available TYGON® brand from Saint-Gobain Performance Plastics Corp. of Solon, Ohio), and FEP. In a preferred embodiment, the elastomer tube material has a hardness of Shore Durometer in the range of 40 A to 65 A. In a preferred embodiment, the elastomer tube has an inner diameter of 0.5 inches and a wall thickness of ⅛ inches. Tubes of other sizes and wall thicknesses may be used so long as the tube has sufficient elasticity to accommodate without rupture the expansion of its contents when freezing occur. However, it is generally desirable that the annular gap between the heat conducting rod 563 and the elastomer tube 570 be kept small so that the volume of ice that must be thawed is small enough so that acceptable thawing times can be obtained. In preferred embodiments, the annular gap is in the range of about 0.06 inches and about 0.2 inches. In a more preferred embodiment, the annular gap is in the range of about 0.06 to about 0.125 inches.

Figure 25:
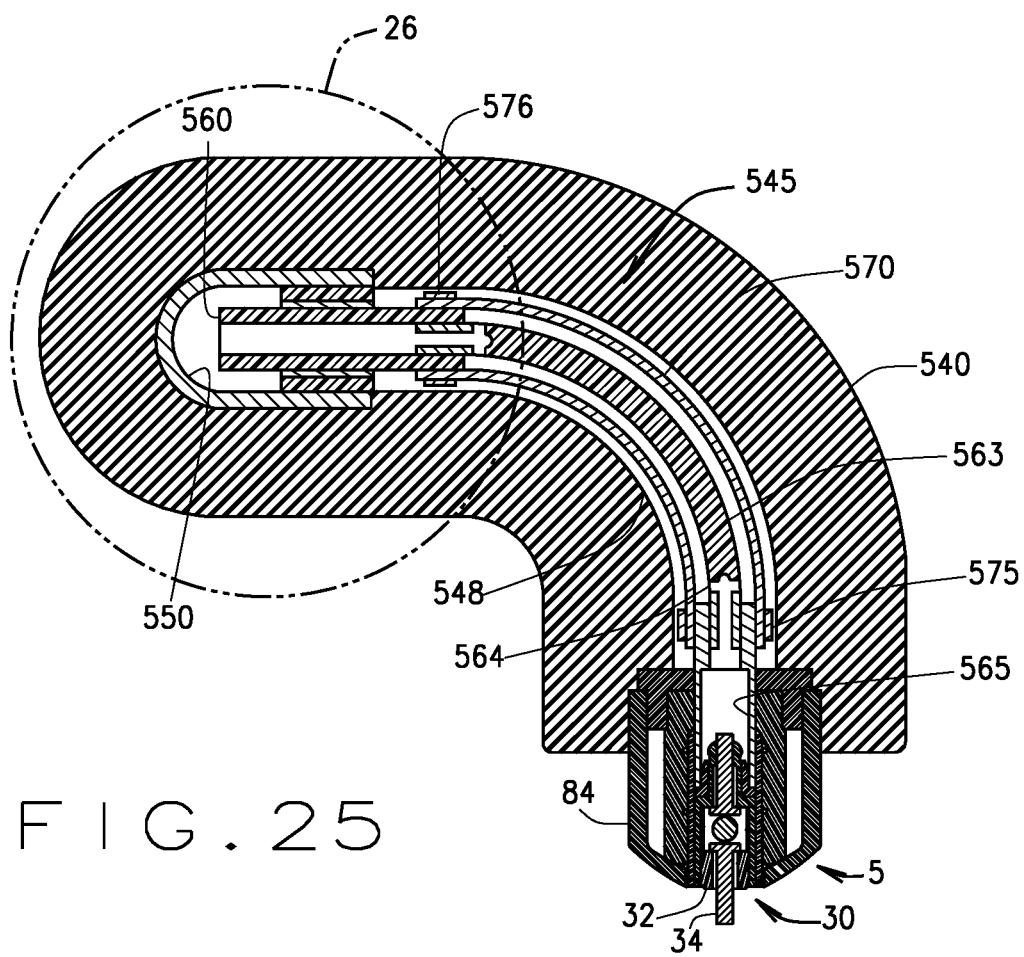
FIG. 25 provides a sectional view on a cut plane of bilateral symmetry of the invention of an embodiment wherein the heat pipe and upper outer shield containing insulation are curved and a portion of the heat pipe is a rod, the rod segment of the heat pipe is situated within an elastomer tube that comprises a conduit for the water or liquid to be delivered to the nipple or ball valve, and the heat pipe rod is curved while the upper heat pipe tube and lower heat pipe tube are straight cylinders; and, FIG. 26 shows a detail on a cut plane of bilateral symmetry of the invention of the upper portion of the embodiment shown in FIG. 25 with a compressed elastomer sleeve making a water-tight seal between the outer surface of the heat pipe and the inner surface of a tubular sleeve that is joined to the tee of the manifold supply pipe, with holes in the upper end of the heat pipe rod adjacent to where it attaches by a threaded joint to the lower heat pipe tube, and the holes convey water or liquid from the upper heat pipe tube to the annular space between the heat pipe rod and the enclosing elastomer tube.
Figure 26:
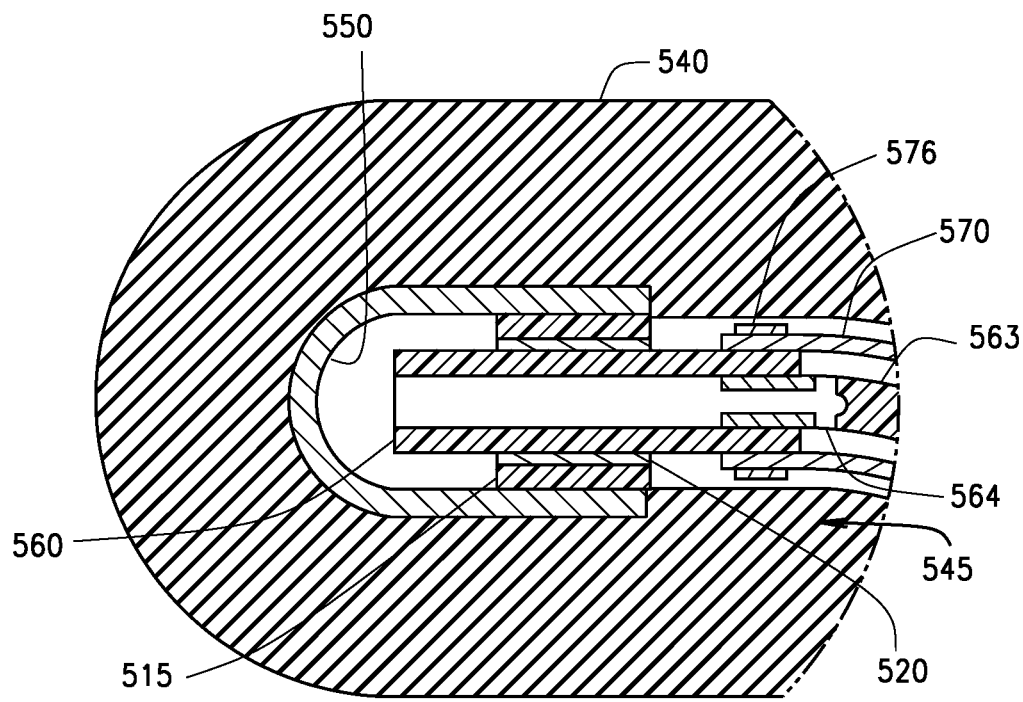

Shown in FIGS. 25 and 26 is an embodiment wherein the heat pipe and upper outer shield containing insulation are curved. In the embodiment shown, the heat conducting rod 563 is curved and the upper heat pipe tube 560 and lower heat pipe tube 565 are straight cylinders. However, in some embodiments, the heat pipe tubes and/or the rod may be curved.

The heat conducting rod 563 described above may have a variety of cross section shapes. It may also comprise a bundle of rods, bars, wires, tubes, or other shapes so long as together they provide ample heat conductance. Accordingly, they may be joined at the ends or at points along their length or the heat rod may have various segments with one or more couplers having tight thermal contact for good thermal conductance. The heat pipe bundle must attach to the upper and lower heat pipe tubes with tight thermal contact for good conductance.

Still other embodiments may be obtained in light of the teachings herein. For example, shown in FIGS. 20-26 are embodiments of a freeze-resistant watering nipple device that is mounted by attachment to the tee that is connected to a manifold supply pipe, but it should be understood that the freeze-resistant watering nipple devices can also be mounted by attachment to a reservoir container, such as attachment to a bucket waterer as described above.

From the aforementioned description, a freeze-resistant watering device has been described. The freeze-resistant watering device is uniquely capable of providing water, or other liquid, at a temperature below ambient temperature in a hot environment and of providing water, or other liquid, a temperature above freezing in a cold environment while the water, or other liquid, has a temperature tolerable to the drinking birds, poultry, or animals. The freeze-resistant watering device and its various components may be manufactured from many materials, including but not limited to, those previously listed, polymers, elastomers, copper, aluminum, stainless steel, ferrous and non-ferrous metals, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation. Moreover, in the following claims, the terms "first," "second," "third" and the like -when they appear- are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A watering system for providing drinking water or liquid from a thermally insulated container or thermally insulated supply pipe to animals, birds, and poultry, said watering system comprising:
   at least one freeze-resistant nipple valve device, each comprising:
      a first heat pipe tube in contact with the water or liquid in the container, said first heat pipe tube having a water-tight connection to the container or supply pipe and said first heat pipe tube having a protrusion into the container or supply pipe;
      a nipple or ball valve having a body, an actuator, and an exit surface;
      a second heat pipe tube attached by water-tight seal to said body of said nipple or ball valve, wherein said second heat pipe tube includes a heat conducting portion in tight thermal contact with said body of said nipple or ball valve and with said second heat pipe tube;
      a heat conducting rod having two ends, one end in tight thermal attachment with said first heat pipe tube, and the other end in tight thermal attachment to said second heat pipe tube;
      an elastomer tube for conveying the water or liquid from said first heat pipe tube to said second heat pipe tube;
      an outer shield enclosing said second heat pipe and said body of said nipple or ball valve;
      an upper outer shield containing thermal insulation and enclosing said first heat pipe tube and said elastomer tube; and,
      wherein said heat conducting rod is situated inside said elastomer tube and said rod has at least one orifice at each end to allow the water or liquid to flow between said first heat pipe tube and said second heat pipe tube, and said outer shield exposes said actuator and said exit surface for use by the animals, birds, or poultry.

2. The watering system of claim 1 wherein said elastomer tube, said heat conducting rod, and said upper outer shield containing insulation have one or more bends.

3. The watering system of claim 1 wherein the attachment of said heat conducting rod, the connection of said first heat pipe tube, the seal of said second heat pipe tube, the contact of said heat conducting portion, and the contact of said body of the nipple or ball valve have sufficient strength to resist separation when the water or liquid within said conduit freezes.

4. The watering system of claim 1 wherein said elastomer tube comprises an elastomer of sufficient elasticity to expand without rupture when the water or liquid contained therein freezes.

5. The watering system of claim 1 wherein said heat conducting portion is a clamped sleeve integral with said second heat pipe tube.

6. The watering system of claim 2 wherein said heat conducting rod and said upper outer shield containing insulation have one or more bends with angles of 45 degrees or more.

7. A freeze-resistant watering device, said device attached to a container or supply pipe having water or liquid therein, said device comprising:
   a heat pipe in contact with the water or liquid in the container or supply pipe, said heat pipe having a water-tight connection to the container or supply pipe, said heat pipe protruding into the container or supply pipe, and comprising:
      a heat pipe tube having one or more segments, and
      a heat conducting rod having two ends;
   a nipple or ball valve having a body, an actuator, and an exit surface, said nipple or ball valve attached by water-tight seal to said segment that is a heat pipe tube;
   at least one elastomer tube for conveying the water or liquid from the container or supply pipe to the said nipple or ball valve, said elastomer tube containing said heat conducting rod;
   said heat pipe having an integral heat conducting portion in tight thermal contact with said body of said nipple or ball valve and with said heat pipe tube;
   an outer shield enclosing said body of said nipple or ball valve;
   an upper outer shield containing thermal insulation and enclosing said heat pipe and, said elastomer tube, and said body of said nipple or ball valve;
   wherein said segments of the heat pipe are in tight thermal contact to provide the conduction of heat from the container or supply pipe to said heat conducting portion;
   wherein each said heat conducting rod has at least one orifice at each end to allow the water or liquid to flow through it;
   wherein said elastomer tube has a water-tight seal to each adjacent said segment in contact with the water or liquid in the container or supply pipe; and,
   wherein said outer shield exposes said actuator and said exit surface for use by the animals, birds, or poultry.

8. The freeze-resistant watering device of claim 7 wherein said elastomer tube comprises elastomer of sufficient elasticity to expand without rupture when the water or liquid contained therein freezes.

9. The freeze-resistant watering device of claim 7 wherein one or more of said elastomer tube, said heat pipe, and said upper outer shield containing insulation have one or more bends.

10. The freeze-resistant watering device of claim 7 wherein said heat conducting rod comprises a bar, a strip, a tube, or a bundle thereof.

* * * * *